United States Patent
Yoshihara et al.

(10) Patent No.: US 8,354,162 B2
(45) Date of Patent: Jan. 15, 2013

(54) CURABLE RESIN COMPOSITION FOR ANTI-GLARE LAYER, AND ANTI-GLARE FILM

(75) Inventors: Toshio Yoshihara, Tokyo-to (JP); Akinobu Ushiyama, Tokyo-to (JP); Ai Shinkai, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 597 days.

(21) Appl. No.: 12/532,680

(22) PCT Filed: Mar. 25, 2008

(86) PCT No.: PCT/JP2008/055601
§ 371 (c)(1),
(2), (4) Date: Dec. 16, 2009

(87) PCT Pub. No.: WO2008/123257
PCT Pub. Date: Oct. 16, 2008

(65) Prior Publication Data
US 2010/0112296 A1    May 6, 2010

(30) Foreign Application Priority Data

Mar. 29, 2007 (JP) ............... 2007-088434
Aug. 10, 2007 (JP) ............... 2007-209787
Oct. 15, 2007 (JP) ............... 2007-267897

(51) Int. Cl.
*B32B 3/00* (2006.01)
*B32B 5/16* (2006.01)

(52) U.S. Cl. ............ 428/172; 428/156; 428/323

(58) Field of Classification Search ............ 428/141, 428/143, 156, 172, 323, 328, 329, 330, 331
See application file for complete search history.

(56) References Cited

U.S. PATENT DOCUMENTS 6,696,140 B2 * 2/2004 Suzuki .................. 428/212
7,709,084 B2 * 5/2010 Saito et al. ............ 428/323

FOREIGN PATENT DOCUMENTS

| | | | |
|---|---|---|---|
| JP | 2001-091707 A | 4/2001 |
| JP | 2003-004904 A | 1/2003 |
| JP | 2003-183592 A | 7/2003 |
| JP | 2003-292826 A | 10/2003 |
| JP | 2004-002508 A | 1/2004 |
| JP | 2006-103070 A | 4/2006 |
| JP | 2006-235198 A | 9/2006 |
| JP | 2006-267839 A | 10/2006 |
| JP | 2006-299248 A | 11/2006 |

* cited by examiner

*Primary Examiner* — Catherine A Simone
(74) *Attorney, Agent, or Firm* — Ladas & Parry LLP

(57) ABSTRACT

An anti-glare film having the following: an anti-glare layer which is provided on a transparent substrate film, has a concavo-convex shape on the outermost surface thereof, and has at least a concavo-convex layer formed by curing a curable resin composition, which composition has optically-transparent fine particles A that have an average particle diameter of 1 μm or more and 10 μm or less, reactive inorganic fine particles B that have an average particle diameter of 30 nm or more and 100 nm or less and reactive functional groups b on the surface thereof, and a binder component C that has reactive functional groups c; a skin layer which has a small number of the reactive inorganic fine particles B in an interface on the side opposite to the transparent substrate film side and in the vicinity of the interface; and a region which is situated nearer the transparent substrate film than the skin layer, in which the fine particles B are uniformly dispersed.

21 Claims, 7 Drawing Sheets

CURABLE RESIN COMPOSITION FOR ANTI-GLARE LAYER, AND ANTI-GLARE FILM

TECHNICAL FIELD

The present invention relates to an anti-glare film that is disposed on the front face of a display (image display device) such as a liquid crystal display (LCD), a cathode-ray tube (CRT) and a plasma display panel (PDP), and is used for the purpose of preventing external light reflection and making images easily visible, etc.

BACKGROUND ART

In the displays as mentioned above, to prevent externally applied light from reflection on the display surface, an anti-glare film comprising a substrate of transparent film and having fine concavoconvexes on the surface thereof is provided on the display surface.

There are several types of such an anti-glare film: a type in which an anti-glare layer having a concavo-convex shape on the surface thereof is formed by applying a resin composition containing particles having a large particle diameter or aggregated particles onto the surface of a transparent substrate; a type in which an anti-glare layer having a concavo-convex shape on the surface thereof is formed by curing a curable resin composition that comprises none of said particles and forming a phase-separated structure by spinodal decomposition; a type in which an anti-glare layer having a concavo-convex shape on the surface thereof is formed by laminating a film that has concavoconvexes on the surface thereof to transfer the shape of the concavoconvexes (Patent literature 1); and so on.

Patent literature 1: Japanese Patent Application Laid-Open No. 2006-103070

Meanwhile, it is demanded that abrasion resistance be imparted to the image display surface of an image display device in the above-mentioned displays or the like so that the image display surface is not scratched upon handling. To meet the demand, the abrasion resistance of the image display surface of an image display device is generally increased by using a hard coat (HC) film in which a hard coat layer is formed on a substrate film, or/and an optical laminate which is imparted with optical functions such as low reflectivity and anti-glare properties.

SUMMARY OF INVENTION

Technical Problem

In the production of the above anti-glare film or optical laminate, it is difficult to directly attach the substrate-side surface of the anti-glare film or optical laminate to a polarizer with an adhesive (including pressure-sensitive adhesive). Therefore, a chemical surface treatment (saponification treatment) with alkali is required on the substrate surface.

There is a problem with conventional anti-glare films or optical laminates: when they are immersed in alkali solution, inorganic fine particles are eluted or detached into the alkali solution from an interface on the side opposite to the transparent substrate side of the anti-glare layer of the films or laminates and the vicinity of the interface. Accordingly, in conventional anti-glare films or optical laminates, to protect the anti-glare layer from alkali solution, a protective film is provided on the surface of the anti-glare layer provided on the transparent substrate, followed by a saponification treatment.

In general, inorganic fine particles are contained in the anti-glare layer to increase the hardness (abrasion resistance) of the anti-glare film. As the content of the inorganic fine particles increases, the hardness of the anti-glare film also increases. However, there is a problem in which the amount of the inorganic fine particles that are present on the interface on the side opposite to the transparent substrate side of the anti-glare layer and the vicinity of the interface also increases, resulting in an increase in the amount of the inorganic fine particles that are eluted or detached into an alkali solution in the saponification treatment.

However, to decrease the production cost, there is an increasing demand for an anti-glare film or optical laminate that can resist saponification treatment with no protective film.

The present invention has been achieved to solve the above problem. The object of the present invention is to provide a resin composition for forming the anti-glare layer of an anti-glare film that has excellent resistance to saponification while having high abrasion resistance and anti-glare properties, and is also to provide such an anti-glare film.

Solution to Problem

The curable resin composition for an anti-glare layer of the present invention comprises:

(1) optically-transparent fine particles A having an average particle diameter of 1 μm or more and 10 μm or less;

(2) reactive inorganic fine particles B having an average particle diameter of 30 nm or more and 100 nm or less, wherein at least part of the particle surface is covered with an organic component, and each particle has reactive functional groups b introduced onto the surface covered by the organic component; and (3) a curable binder system comprising a binder component C and having curing reactivity in the system, wherein the binder component C has reactive functional groups c having cross-linking reactivity with the reactive functional groups b of the reactive inorganic fine particles B, wherein the haze value of a cured product of the curable resin composition for an anti-glare layer meets the relationships given by the following formulae I to III:

$$|Hz(hW_B+W_C)-Hz(W_B+W_C)| < |Hz(hW_B+W_C+W_A)-Hz(W_B+W_C+W_A)| \quad (I)$$

$$|Hz(hW_B)-Hz(W_B)| < 2 \quad (II)$$

$$|Hz(hW_B+W_C)-Hz(W_B+W_C)| < 2 \quad (III)$$

wherein each of $Hz(W_B)$, $Hz(hW_B)$, $Hz(W_B+W_C)$, $Hz(hW_B+W_C)$, $Hz(W_B+W_C+W_A)$ and $Hz(hW_B+W_C+W_A)$ refers to the haze value of each composition; each W in the parentheses refers to the weight of the reactive inorganic fine particles B, binder component C or optically-transparent fine particles A in each composition; and h is a constant of 1 or more.

When the curable resin composition for an anti-glare layer of the present invention is formed into a cured film, the optically-transparent fine particles A form concavoconvexes on a surface of the film, thereby imparting anti-glare properties to the cured film.

Because of having high hardness, the reactive inorganic fine particles B are hardly crushed by pressure from outside (external pressure) and have excellent resistance to pressure. Furthermore, the inorganic fine particles B have the reactive functional groups b that have cross-linking reactivity with the reactive functional groups c of the binder component C, so that the inorganic fine particles B can be cross-linked to the binder component C. Accordingly, the cured film produced by curing the curable resin composition for an anti-glare layer of the present invention is imparted with high hardness because it contains the inorganic fine particles B with high hardness. In addition, because many cross-links are formed between the inorganic fine particles B and the binder component C, the strength of the cured film is increased, and excellent abrasion resistance is imparted to the film, therefore.

The cured film produced by curing the curable resin composition for an anti-glare layer of the present invention is imparted with appropriate anti-glare properties when it meets the relationships given by the above formulae I to III.

According to the present invention, the haze value of the cured product of the curable resin composition for an anti-glare layer is preferably from 5 to 20%.

In the curable resin composition for an anti-glare layer of the present invention, the content of the reactive inorganic fine particles B is preferably from 5 to 20 parts by weight with respect to the total amount of 100 parts by weight of the reactive inorganic fine particles B and the constituents of the curable binder system, so that sufficient abrasion resistance can be imparted to the film obtained by curing the curable resin composition for an anti-glare layer, while suppressing the content of the reactive inorganic fine particles B.

In the curable resin composition for an anti-glare layer of the present invention, the content of the optically-transparent fine particles A is preferably 1 part by weight or more and 5 parts by weight or less with respect to the total amount of 100 parts by weight of the reactive inorganic fine particles B and the constituents of the curable binder system.

In the curable resin composition for an anti-glare layer of the present invention, from the viewpoint of increasing the hardness of the cured film, the organic component covering the reactive inorganic fine particles B is preferably contained in an amount of $1.00 \times 10^{-5}$ g/m$^2$ or more per unit area of the inorganic fine particles to be covered.

In the curable resin composition for an anti-glare layer of the present invention, the reactive functional groups b of the reactive inorganic fine particles B and the reactive functional groups c of the binder component C are preferably polymerizable unsaturated groups, so that the reactive functional groups b can be easily cross-linked to the reactive functional groups c, thereby obtaining an anti-glare film with high abrasion resistance.

In the curable resin composition for an anti-glare layer of the present invention, the reactive inorganic fine particles B are preferably obtained by dispersing inorganic fine particles in water and/or an organic solvent serving as a dispersion medium, in the presence of one or more kinds of surface modification compounds which have a molecular weight of 500 or more and are selected from the group consisting of a saturated or unsaturated carboxylic acid, an acid anhydride, acid chloride, ester and acid amide corresponding to the carboxylic acid, an amino acid, an imine, a nitrile, an isonitrile, an epoxy compound, an amine, a β-dicarbonyl compound, silane and a metallic compound having a functional group, so that the strength of the film can be increased even with a small content of the organic component.

In the curable resin composition for an anti-glare layer of the present invention, the surface modification compound is preferably a compound having at least one kind of hydrogen bond-forming groups, so that the organic component can be efficiently surface-modified.

In the curable resin composition for an anti-glare layer of the present invention, at least one kind of the surface modification compounds preferably has at least one kind of polymerizable unsaturated groups that will be the reactive functional groups b. In this case, the reactive functional groups b introduced to the reactive inorganic fine particles B can be easily cross-linked to the reactive functional groups c of the binder component C, thereby increasing the hardness of the cured film.

In the curable resin composition for an anti-glare layer of the present invention, from the viewpoint of obtaining a sharp particle size distribution of the reactive inorganic fine particles B and thereby increasing the monodispersity of the reactive inorganic fine particles B, the reactive inorganic fine particles B are preferably obtained by ejecting, into water through a hydrophilic porous membrane, a monomer composition in which inorganic fine particles having a particle diameter of 30 nm or more and 100 nm or less are dispersed in a hydrophobic vinyl monomer to prepare an aqueous dispersion comprising droplets of the monomer in which the inorganic fine particles are dispersed, and polymerizing the aqueous dispersion.

In the curable resin composition for an anti-glare layer of the present invention, from the viewpoint of increasing the dispersibility in the organic component and the film strength, the reactive inorganic fine particles B are preferably obtained by bonding metal oxide fine particles to a compound containing the reactive functional group b that will be introduced onto the surface of the inorganic fine particles to be covered, a group represented by the following chemical formula (1), and a silanol group or a group that is able to become a silanol group by hydrolysis:

Chemical formula (1)

wherein $Q^1$ is NH, O (oxygen atom) or S (sulfur atom); and $Q^2$ is O or S.

In the curable resin composition for an anti-glare layer of the present invention, the binder component C is preferably a compound having three or more reactive functional groups c.

In the curable resin composition for an anti-glare layer of the present invention, the optically-transparent fine particles A and the reactive inorganic fine particles B preferably comprise silica.

The anti-glare film of the present invention is an anti-glare film comprising a transparent substrate film and an anti-glare layer which has a concavo-convex shape on the outermost surface thereof and is provided on the observer-side surface of the transparent substrate film, wherein the anti-glare layer comprises a single concavo-convex layer or has a laminated structure that comprises two or more layers including a concavo-convex layer and a surface shape modifying layer disposed on the observer side of the concavo-convex layer;

wherein the concavo-convex layer comprises a cured product of any of the curable resin compositions for an anti-glare layer of the present invention, and has a haze value that meets the relationships given by the following formulae I to III;

wherein the concavo-convex layer has a skin layer in the surface region thereof, which region including an interface on the side opposite to the transparent substrate film side of the concavo-convex layer and the vicinity of the interface, and the skin layer has a smaller average particle number of the reactive inorganic fine particles B than the region situated nearer the transparent substrate film in relation to the surface region; and wherein the average particle number of the reactive inorganic fine particles B per unit area of the cross-section of the skin layer in thickness direction is 80% or less of the average particle number of the reactive inorganic fine particles B per unit area of the cross-section of the concavo-convex layer in thickness direction:

$|Hz(hW_B+W_C)-Hz(W_B+W_C)|<|Hz(hW_B+W_C+W_A)-Hz(W_B+W_C+W_A)|$ (I)

$|Hz(hW_B)-Hz(W_B)|<2$ (II)

$|Hz(hW_B+W_C)-Hz(W_B+W_C)|<2$ (III)

wherein each of Hz($W_B$), Hz($hW_B$), Hz($W_B+W_C$), Hz($hW_B+W_C$), Hz($W_B+W_C+W_A$) and Hz($hW_B+W_C+W_A$)

refers to the haze value of each composition; each W in the parentheses refers to the weight of the reactive inorganic fine particles B, binder component C or optically-transparent fine particles A in each composition; and h is a constant of 1 or more.

The optically-transparent fine particles A form concavoconvexes on a surface of the anti-glare layer, thereby imparting anti-glare properties to the anti-glare layer.

Because of having high hardness, the reactive inorganic fine particles B are hardly crushed by pressure from outside (external pressure) and have excellent resistance to pressure. Furthermore, the inorganic fine particles B have the reactive functional groups b that have cross-linking reactivity with the reactive functional groups c of the binder component C, so that the inorganic fine particles B can be cross-linked to the binder component C. Accordingly, the anti-glare layer of the present invention is imparted with high hardness because it contains the inorganic fine particles B with high hardness. In addition, because many cross-links are formed between the inorganic fine particles B and the binder component C, the strength of the cured film is increased, and excellent abrasion resistance is imparted to the film, therefore.

The cured film produced by curing the curable resin composition for an anti-glare layer of the present invention is imparted with appropriate anti-glare properties when it meets the relationships given by the above formulae I to III.

In the concavo-convex layer of the present invention, the average particle number of the reactive inorganic fine particles B per unit area of the cross-section of the skin layer in thickness direction is as small as 80% or less of the average particle number of the inorganic fine particles B per unit area of the cross-section of the concavo-convex layer in thickness direction. Because the skin layer has a smaller average particle number of the reactive inorganic fine particles B, there is a decrease in the number of the inorganic fine particles B, part of which particles being protruded through the interface on the side opposite to the transparent substrate film side of the concavo-convex layer. Accordingly, there is a decrease in the number of the inorganic fine particles B that are, in the saponification treatment of the concavo-convex layer, eluted or detached into an alkali solution from the interface of the concavo-convex layer. As a result, the anti-glare film of the present invention can be imparted with excellent resistance to saponification.

It is not clear why the concavo-convex layer has such a skin layer; however, the reason is supposed to be that the diffusion coefficient of the inorganic fine particles B is reduced by setting the particle diameter of the reactive inorganic fine particles B to 30 nm or more and 100 nm or less as mentioned above; therefore, the inorganic fine particles B are enabled to stay easily on the transparent substrate film side of the concavo-convex layer, rather than the interface on the side opposite to the transparent substrate film side of the concavo-convex layer.

In a preferred embodiment of the anti-glare film of the present invention, the thickness of the skin layer, which is from the interface on the side opposite to the transparent substrate film side of the skin layer, can be five times the average particle diameter of the reactive inorganic fine particles B.

In a preferred embodiment of the anti-glare film of the present invention, it is possible that the average interparticle distance between the reactive inorganic fine particles B is 30 nm or more in the region situated nearer the transparent substrate film in relation to the skin layer, and the reactive inorganic fine particles B are uniformly dispersed in at least part of the region, which part is adjacent to the transparent substrate film.

In the anti-glare film of the present invention, the optically-transparent fine particles A and the reactive inorganic fine particles B preferably comprise silica. Because of this, the internal scattering property (internal haze) of the concavo-convex layer can be suppressed, thereby producing an anti-glare film with less impact on a decrease in contrast.

In the anti-glare film of the present invention, from the viewpoint of increasing the hardness of the cured film, the organic component covering the reactive inorganic fine particles B is preferably contained in an amount of $1.00 \times 10^{-3}$ g/m$^2$ or more per unit area of the inorganic fine particles to be covered.

In the anti-glare film of the present invention, the reactive inorganic fine particles B are preferably obtained by dispersing inorganic fine particles in water and/or an organic solvent serving as a dispersion medium, in the presence of one or more kinds of surface modification compounds which have a molecular weight of 500 or more and are selected from the group consisting of a saturated or unsaturated carboxylic acid, an acid anhydride, acid chloride, ester and acid amide corresponding to the carboxylic acid, an amino acid, an imine, a nitrile, an isonitrile, an epoxy compound, an amine, a β-dicarbonyl compound, silane and a metallic compound having a functional group, so that the strength of the film can be increased even with a small content of the organic component.

In the anti-glare film of the present invention, the surface modification compound is preferably a compound having at least one kind of hydrogen bond-forming groups, so that the organic component can be efficiently surface-modified.

In the anti-glare film of the present invention, at least one kind of the surface modification compounds preferably has at least one kind of polymerizable unsaturated groups that will be the reactive functional groups b. In this case, the reactive functional groups b introduced to the reactive inorganic fine particles B can be easily cross-linked to the reactive functional groups c of the binder component C, thereby increasing the hardness of the cured film.

In the anti-glare film of the present invention, from the viewpoint of obtaining a sharp particle size distribution of the reactive inorganic fine particles B and thereby increasing the monodispersity of the reactive inorganic fine particles B, the reactive inorganic fine particles B are preferably obtained by ejecting, into water through a hydrophilic porous membrane, a monomer composition in which inorganic fine particles having a particle diameter of 30 nm or more and 100 nm or less are dispersed in a hydrophobic vinyl monomer to prepare an aqueous dispersion comprising droplets of the monomer in which the inorganic fine particles are dispersed, and polymerizing the aqueous dispersion.

In the anti-glare film of the present invention, from the viewpoint of increasing the dispersibility in the organic component and the film strength, the reactive inorganic fine particles B are preferably obtained by bonding metal oxide fine particles to a compound containing the reactive functional group b that will be introduced onto the surface of the inorganic fine particles to be covered, a group represented by the following chemical formula (1), and a silanol group or a group that is able to become a silanol group by hydrolysis:

$$-Q^1-C(=Q^2)-NH- \qquad \text{Chemical formula (1)}$$

wherein $Q^1$ is NH, O (oxygen atom) or S (sulfur atom); and $Q^2$ is O or S.

In the anti-glare film of the present invention, the content of the reactive inorganic fine particles B is preferably 1 part by weight or more and 30 parts by weight or less with respect to the total amount of 100 parts by weight of the reactive inorganic fine particles B and the constituents of the curable binder system in the concavo-convex layer, so that sufficient abrasion resistance can be imparted to the anti-glare film while suppressing the content of the reactive inorganic fine particles B.

In the anti-glare film of the present invention, the binder component C is preferably a compound having three or more reactive functional groups c.

In the anti-glare film of the present invention, the transparent substrate film preferably and mainly comprises a cellulose acylate, a cycloolefin polymer, an acrylate polymer or a polyester.

In a preferred embodiment of the anti-glare film of the present invention, the anti-glare layer can show a hardness of 3H or more on the pencil hardness test defined in JIS K5600-5-4 (1999) conducted with a load of 500 g.

Because it is possible to suppress a decrease in the image contrast of the anti-glare film in a dark environment with keeping the external scattering property (external haze) of the same, the content of the optically-transparent fine particles A is preferably 1 part by weight or more and 5 parts by weight or less with respect to the total amount of 100 parts by weight of the reactive inorganic fine particles B and the constituents of the curable binder system in the concavo-convex layer; moreover, in the anti-glare layer of the present invention, the layer thickness of convex portions of the concavo-convex layer is preferably equal to or less than the average particle diameter of the optically-transparent fine particles A+1.5 μm, and the layer thickness of concave portions of the concavo-convex layer is preferably smaller than the average particle diameter of the optically-transparent fine particles A.

In a preferred embodiment of the anti-glare film of the present invention, the anti-glare layer can have a steel wool resistance at which the anti-glare layer has no scratches on a steel wool test with a load of 500 g or less.

In a preferred embodiment of the anti-glare film of the present invention, the thickness of the concavo-convex layer can be 0.5 μm or more and 13 μm or less.

ADVANTAGEOUS EFFECTS OF INVENTION

The anti-glare film of the present invention comprises inorganic fine particles having reactive functional groups. The reactive inorganic fine particles are cross-linked to a binder component to increase the film strength. Therefore, the anti-glare film can keep the film strength even in the case of making the thickness of the anti-glare layer thinner than that of the anti-glare layer of an anti-glare film comprising inorganic fine particles having no reactive functional groups. Because of making the thickness of the anti-glare layer thinner and the resulting decrease in the content of the optically-transparent fine particles, it is allowed for the anti-glare film of the present invention to suppress a decrease in the image contrast in a dark environment with keeping the external scattering property (external haze). In addition, because of making the thickness of the anti-glare layer thinner and the resulting decrease in the content of the optically-transparent fine particles, it is allowed for the anti-glare film of the present invention to decrease the internal haze with keeping a minimum external haze that is needed to exhibit the anti-glare properties. The anti-glare film of the present invention with such a small internal haze is very effective in suppressing a decrease in the front contrast of a display panel provided with the anti-glare film. Especially, the front contrast increasing effect attributed to the decrease in internal haze is more effective when the anti-glare film is used in a display panel with a narrow viewing angle, than in a display panel with a wide viewing angle. Also in the anti-glare film of the present invention, the concavo-convex layer has a skin layer in the surface region thereof, which layer having a small particle number of the reactive inorganic fine particles B, and which region including an interface on the side opposite to the transparent substrate film side of the concavo-convex layer and the vicinity of the interface. Accordingly, the anti-glare film produced by using the anti-glare layer comprising the concavo-convex layer can decrease the number of the inorganic fine particles B that are eluted or detached into an alkali solution from the concavo-convex layer in a saponification treatment, thereby increasing the resistance to saponification. Furthermore, the anti-glare film also has a region on the transparent substrate film side of the concavo-convex layer from the skin layer, where the reactive inorganic fine particles B are evenly present, so that the abrasion resistance can be increased while suppressing the content of the reactive inorganic fine particles B. Therefore, no protective film is required in the saponification treatment of the anti-glare film, so that the number of processes and the cost of materials can be reduced.

REFERENCE SIGNS LIST

Figure 1:
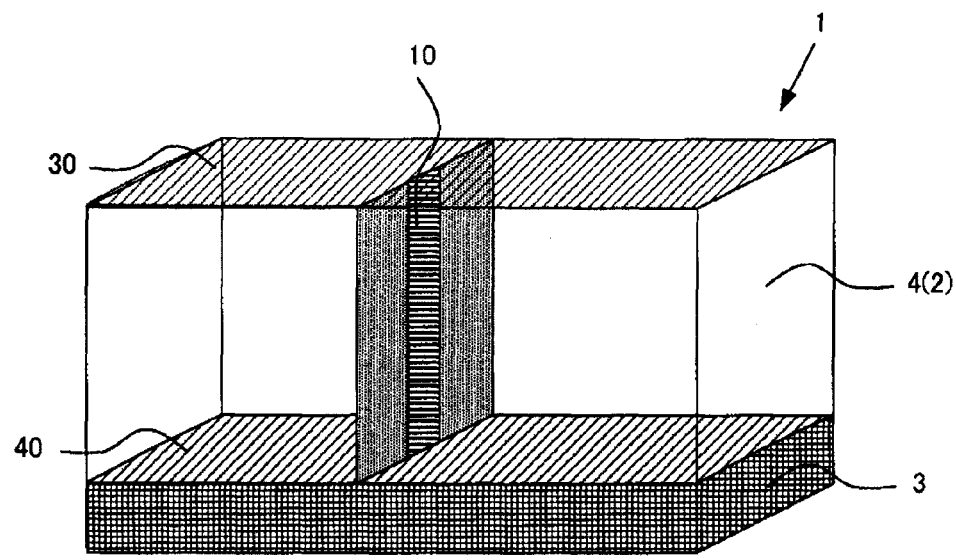
FIG. 1 is a perspective view schematically showing an example of the cross-section of the anti-glare film of the present invention in layer thickness direction and the 1 μm-wide region on the cross-section.

| | |
|---|---|
| 1. | Anti-glare film |
| 2. | Anti-glare layer |
| 3. | Transparent substrate film |
| 4. | Concavo-convex layer |
| 5. | Surface shape modifying layer |
| 6. | Low refractive index layer |
| 10. | P Region |
| 20. | Reactive inorganic fine particles B |
| 30. | Interface on the side opposite to the transparent substrate film side of the anti-glare layer |
| 40. | Interface on the transparent substrate film side of the anti-glare layer |
| 50. | Skin layer |
| 60. | Region where the reactive inorganic fine particles B are uniformly distributed having an average particle distance of 30 nm or more |
| 70. | Observer |
| 101. | X axis |
| 102. | Y axis |
| 103. | Z axis |
| 104. | Azimuthal angle 45° |
| 105. | Polar angle |
| 110. | Display panel to which the anti-glare film is attached |

DESCRIPTION OF EMBODIMENTS

The curable resin composition for an anti-glare layer of the present invention comprises:

(1) optically-transparent fine particles A having an average particle diameter of 1 μm or more and 10 μm or less;

(2) reactive inorganic fine particles B having an average particle diameter of 30 nm or more and 100 nm or less, wherein at least part of the particle surface is covered with an organic component, and each particle has reactive functional groups b introduced onto the surface covered by the organic component; and (3) a curable binder system comprising a binder component C and having curing reactivity in the system, wherein the binder component C has reactive functional groups c having cross-linking reactivity with the reactive functional groups b of the reactive inorganic fine particles B, wherein the haze value of a cured product of the curable resin composition for an anti-glare layer meets the relationships given by the following formulae I to III:

$$|Hz(hW_B+W_C)-Hz(W_B+W_C)| < |Hz(hW_B+W_C+W_A)-Hz(W_B+W_C+W_A)| \quad (I)$$

$$|Hz(hW_B)-Hz(W_B)| < 2 \quad (II)$$

$$|Hz(hW_B+W_C)-Hz(W_B+W_C)| < 2 \quad (III)$$

wherein each of $Hz(W_B)$, $Hz(hW_B)$, $Hz(W_B+W_C)$, $Hz(hW_B+W_C)$, $Hz(W_B+W_C+W_A)$ and $Hz(hW_B+W_C+W_A)$ refers to the haze value of each composition; each W in the parentheses refers to the weight of the reactive inorganic fine particles B, binder component C or optically-transparent fine particles A in each composition; and h is a constant of 1 or more.

In the present invention, the average particle diameter of the optically-transparent fine particles A refers to the average of particle diameters of the optically-transparent fine particles A if the particles are monodispersed particles (particles with a single shape). If the particles are irregularly shaped particles having a broad particle size distribution, the average particle diameter refers to the particle diameter of the most common particles found by particle size distribution measurement in the optically-transparent fine particles A. In many cases, the particle diameter of the optically-transparent fine particles A can be measured by the Coulter counter method. Besides this method, measurement can be made by laser diffractometry or scanning electron microscope (SEM) photography.

In the case of particles other than the optically-transparent fine particles A, that is, the reactive inorganic fine particles B, unless otherwise noted, the average particle diameter refers to the 50% particle diameter (d50 median diameter) which is obtained when the particles in a solution are measured by dynamic light scattering and the particle size distribution thus obtained is expressed by a cumulative distribution. The average particle diameter may be measured by means of Microtrac particle size analyzer or Nanotrac particle size analyzer manufactured by Nikkiso Co., Ltd.

The optically-transparent fine particles A and the reactive inorganic fine particles B may be aggregated particles. If they are aggregated particles, the secondary particle diameter of the particles is only needed to be in the above range.

The curable resin composition for an anti-glare layer of the present invention can provide an anti-glare film with high abrasion resistance because the reactive functional groups b of the reactive inorganic fine particles B contained in the curable binder system are cross-linked to the reactive functional groups c of the binder component C contained in the same. Accordingly, because it is possible to decrease the content of the inorganic fine particles, the reactive inorganic fine particles B may be used in an anti-glare film with high transparency and clearness.

The reactive inorganic fine particles B exhibit no anti-glare properties when they are not mixed with the optically-transparent fine particles A having an average-particle diameter of 1 μm or more. In particular, because mixing the optically-transparent fine particles A with the reactive inorganic fine particles B allows not only the optically-transparent fine particles A but also the reactive inorganic fine particles B to exhibit their anti-glare properties, the reactive inorganic fine particles B can be further imparted with a function of serving as an anti-glare properties modifier. Therefore, by adding the reactive inorganic fine particles B, it is possible to form an anti-glare film with high abrasion resistance and anti-glare properties, while suppressing the content of the optically-transparent fine particles A.

According to the curable resin composition for an anti-glare layer, the haze value of the curable resin composition increases when the reactive inorganic fine particles B are additionally incorporated in a composition prepared by dispersing the optically-transparent fine particles A in the curable binder system. The haze value of a composition prepared by dispersing the reactive inorganic fine particles B in the curable binder system is independent of the weight of the reactive inorganic fine particles B and almost constant. Because of this, it is found that in the system containing no optically-transparent fine particles A, the reactive inorganic fine particles B serve to increase the hardness of the film due to their dispersibility, with keeping the transparency of the film and having no decrease in the contrast. On the other hand, in the system containing the optically-transparent fine particles A, the reactive inorganic fine particles B are found to be a material that has a function of increasing the abrasion resistance of the film and also a function of controlling the anti-glare properties of the same.

Furthermore, the reactive inorganic fine particles B are allowed to exhibit anti-glare properties that cannot be obtained only by themselves as a new function, by incorporating the optically-transparent fine particles A having an average particle diameter of 1 μm or more and 10 μm or less and the reactive inorganic fine particles B having an average particle diameter of 30 nm or more and 100 nm or less in the curable resin composition for an anti-glare layer of the present invention. The following reason can be given for this.

That is, it is supposed that this is because the optically-transparent fine particles A and reactive inorganic fine particles B dispersed in the curable binder system function, so that the reactive inorganic fine particles B are attached to the optically-transparent fine particles A to form aggregate particles.

In the present invention, as described above, high abrasion resistance can be obtained by selecting the reactive inorganic fine particles B having a specific average particle diameter; moreover, anti-glare properties can be further exhibited by a synergistic effect with the optically-transparent fine particles A. Therefore, it is considered possible to form an anti-glare film with high abrasion resistance and anti-glare properties by using the curable resin composition for an anti-glare layer, with reducing the content of the optically-transparent fine particles A.

The anti-glare film of the present invention is an anti-glare film comprising a transparent substrate film and an anti-glare layer which has a concavo-convex shape on the outermost surface thereof and is provided on the observer-side surface of the transparent substrate film, wherein the anti-glare layer comprises a single concavo-convex layer or has a laminated structure that comprises two or more layers including a concavo-convex layer and a surface shape modifying layer disposed on the observer side of the concavo-convex layer;

wherein the concavo-convex layer comprises a cured product of any of the curable resin compositions for an anti-glare layer of the present invention, and has a haze value that meets the relationships given by the following formulae I to III;

wherein the concavo-convex layer has a skin layer in the surface region thereof, which region including an interface on the side opposite to the transparent substrate film side of the concavo-convex layer and the vicinity of the interface, and the skin layer has a smaller average particle number of the reactive inorganic fine particles B than the region situated nearer the transparent substrate film in relation to the surface region; and wherein the average particle number of the reactive inorganic fine particles B per unit area of the cross-section of the skin layer in thickness direction is 80% or less of the average particle number of the reactive inorganic fine particles B per unit area of the cross-section of the concavo-convex layer in thickness direction:

$$|Hz(hW_B+W_C)-Hz(W_B+W_C)|<|Hz(hW_B+W_C+W_A)-Hz(W_B+W_C+W_A)| \quad (I)$$

$$|Hz(hW_B)-Hz(W_B)|<2 \quad (II)$$

$$|Hz(hW_B+W_C)-Hz(W_B+W_C)|<2 \quad (III)$$

wherein each of $Hz(W_B)$, $Hz(hW_B)$, $Hz(W_B+W_C)$, $Hz(hW_B+W_C)$, $Hz(W_B+W_C+W_A)$ and $Hz(hW_B+W_C+W_A)$ refers to the haze value of each composition; each W in the parentheses refers to the weight of the reactive inorganic fine particles B, binder component C or optically-transparent fine particles A in each composition; and h is a constant of 1 or more.

The optically-transparent fine particles A form concavo-convexes on a surface of the anti-glare layer to impart anti-glare properties to the layer.

In the present invention, the average particle diameter of the optically-transparent fine particles A is 1 μm or more and 10 μm or less. If the average particle diameter is less than 1 μm, it is difficult to impart a concavo-convex shape of a size that makes it possible to exhibit sufficient anti-glare properties to the surface of the anti-glare layer, even if such a concavo-convex shape can be imparted, it is necessary to greatly increase the added amount of the optically-transparent fine particles A, which leads to deterioration in the properties of the anti-glare layer (contrast, etc.) If the average particle diameter exceeds 10 μm, the surface shape of the anti-glare layer is roughen and may cause deterioration in the surface quality, or the surface haze (external haze) is increased and may increase whiteness.

Because of having high hardness, the reactive inorganic fine particles B are hardly crushed by pressure from outside (external pressure) and have excellent resistance to pressure. Furthermore, the inorganic fine particles B have the reactive functional groups b that have cross-linking reactivity with the reactive functional groups c of the binder component C, so that the inorganic fine particles B can be cross-linked to the binder component C. Accordingly, the anti-glare layer of the present invention is imparted with high hardness because it contains the inorganic fine particles B with high hardness. In addition, because many cross-links are formed between the inorganic fine particles B and the binder component C, the strength of the cured film is increased, and excellent abrasion resistance is imparted to the film, therefore.

The average particle diameter of the reactive inorganic fine particles B of the present invention is nm or more and 100 nm or less. By setting the average particle diameter to 30 nm or more, abrasion resistance is imparted to the anti-glare layer, and the diffusion coefficient of the inorganic fine particles B is decreased. The above-mentioned skin layer can be obtained therefore, resulting in an increase in saponification resistance of the anti-glare layer. Also, by setting the average particle diameter to 100 nm or less, the number of cross-links in a matrix can be increased with respect to the content, thereby obtaining a concavo-convex layer with high hardness.

As the inorganic fine particles that will be core particles of the optically-transparent fine particles A and reactive inorganic fine particles B of the present invention, it is preferable to use solid particles having no void or porous structure inside the particles rather than using hollow particles having a void or porous structure inside. Because of having a void or porous structure inside, hollow particles have a lower hardness than that of solid particles, so that they are easily crushed by external pressure. Furthermore, hollow particles have a smaller apparent specific gravity (mass per unit volume obtained by averaging the mass of a volume of a particle including a void in the particle) than that of solid particles, so that the number of hollow particles that are present in the interface on the side opposite to the transparent substrate side of the concavo-convex layer, is likely to increase. Accordingly, it is preferable to use solid particles with high hardness and larger specific gravity than that of hollow particles as the inorganic fine particles that will be core particles of the optically-transparent fine particles A and reactive inorganic fine particles B.

In the case where the anti-glare layer comprises a concavo-convex layer only, the curable resin composition for an anti-glare layer of the present invention is used as a curable resin composition for a concavo-convex layer. If the anti-glare layer comprises a concavo-convex layer and a surface shape modifying layer, the curable resin composition for an anti-glare layer is used to form the concavo-convex layer, and the surface shape modifying layer is separately formed by curing a curable resin composition for a surface shape modifying layer that will be described below.

In the concavo-convex layer formed by curing the curable resin composition for an anti-glare layer, the average particle number per unit area of the cross-section of the concavo-convex layer in thickness direction is obtained by, using a SEM or TEM photograph, dividing the number of the reactive inorganic fine particles B that are present in a cross-section (1 μm-wide region) of the concavo-convex layer by the area of the cross-section (1 μm-wide region) of the concavo-convex layer. Similarly, in the skin layer of the concavo-convex layer formed by curing the curable resin composition for an anti-glare layer, the average particle number per unit area of the cross-section of the skin layer in thickness direction is obtained by dividing the number of the reactive inorganic fine particles B present in a cross-section (1 μm-wide region) of the skin layer by the area of the cross-section (1 μm-wide region) of the skin layer, using a SEM photograph.

Figure 2:
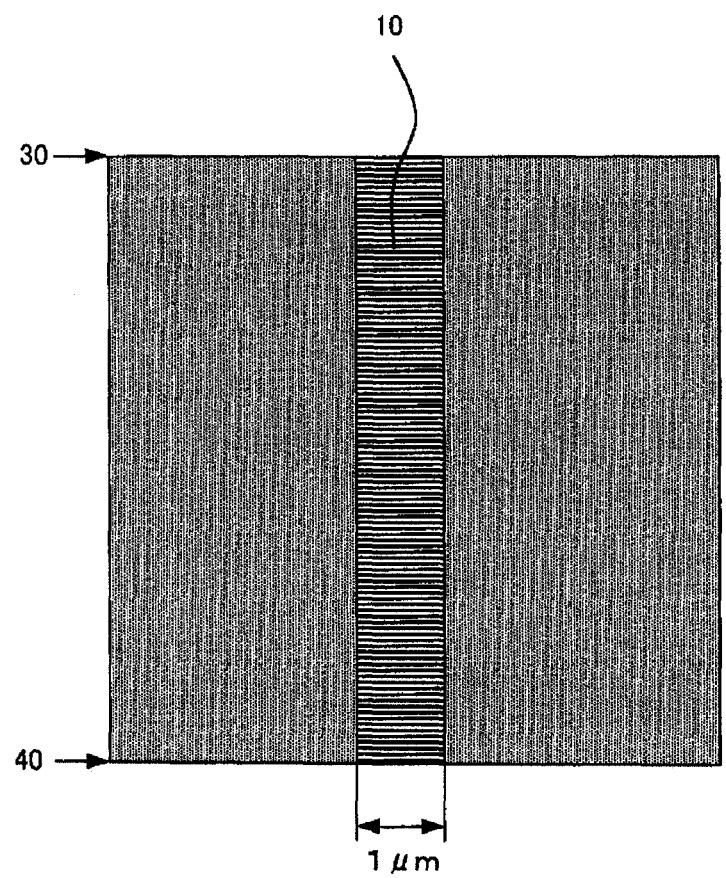
FIG. 2 is a view schematically showing an example of the cross-section of the anti-glare film of the present invention in layer thickness direction and the 1 μm-wide region on the cross-section.
Figure 3:
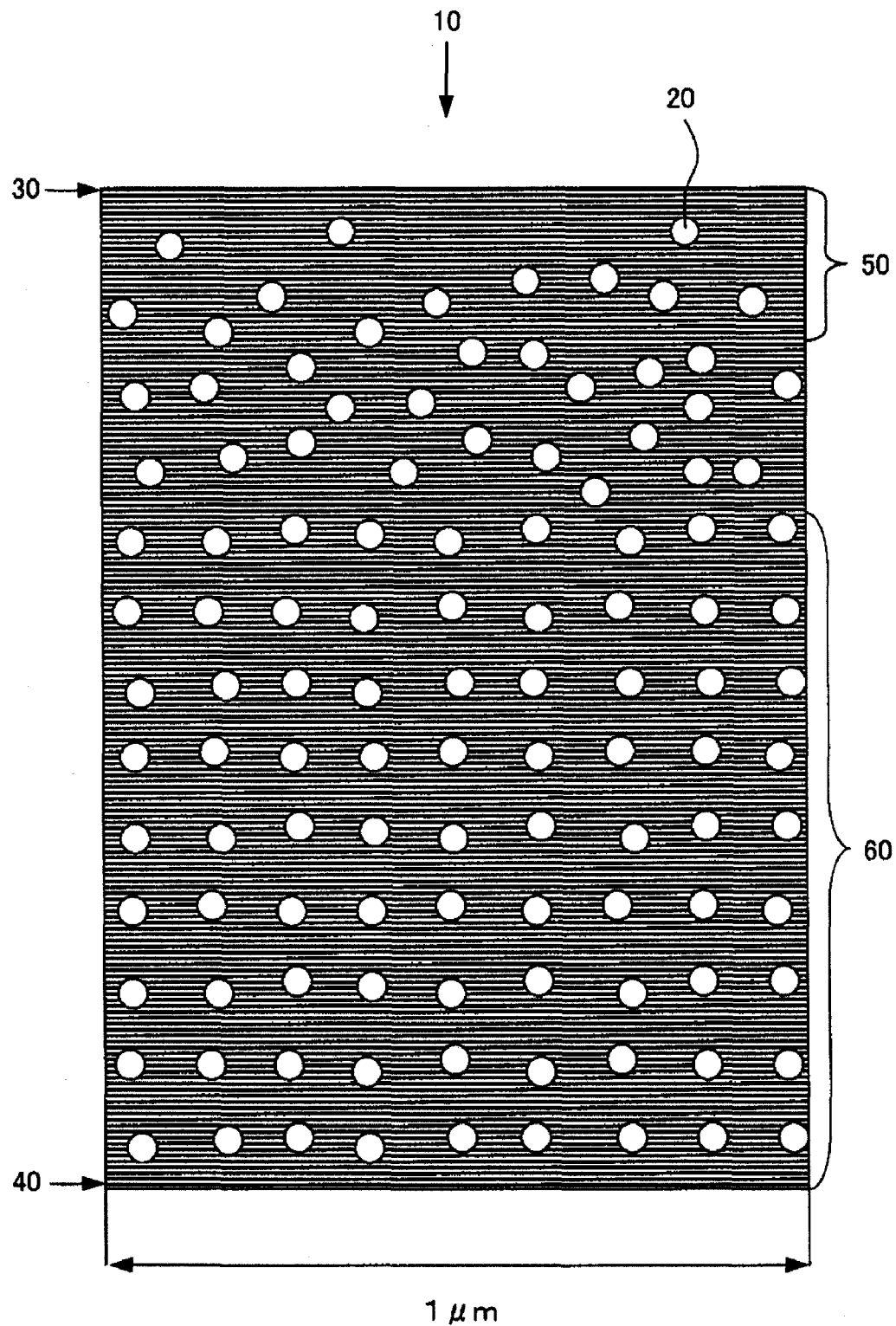
FIG. 3 is a view schematically showing an example of the distribution state of reactive inorganic fine particles B in the 1 μm-wide region on the cross-section of the anti-glare film of the present invention in layer thickness direction.

FIG. 1 is a perspective view schematically showing, in an anti-glare film 1 having an anti-glare layer 2 provided on a transparent substrate film 3, an example of the cross-section of the anti-glare layer 2 in layer thickness direction and a 1 μm-wide P region on the cross-section. The anti-glare layer 2 has interfaces 30 and 40, wherein the interface 30 is on the side opposite to the transparent substrate film 3 side of the anti-glare layer 2, and the interface 40 is on the transparent substrate film 3 side of the anti-glare layer 2. FIG. 2 is a view schematically showing an example of the cross-section of FIG. 1 and the 1 μm-wide P region 10 on the cross-section, which are viewed from a direction perpendicular to the cross-section. FIG. 3 is a view schematically showing an example of the distribution of particles in the P region 10. In FIG. 3, the average particle number of the inorganic fine particles B 20 per unit area is smaller in a part (a skin layer 50) of the P region 10, which has a thickness that is five times the average particle diameter and which thickness is from the interface on the side opposite to the transparent substrate film 3 side, than in the region situated nearer the transparent substrate film 3 in relation to the skin layer 50, and the average particle number of the inorganic fine particles B 20 per unit area of said part (the skin layer 50) is 80% or less of that of the P region 10. The P region 10 has a region 60 where the inorganic fine particles B are uniformly dispersed with an average interparticle distance of 30 nm or more on the transparent substrate film 30 side thereof from the skin layer 50. In FIG. 1 and so on, for ease of understanding of the details of the invention, the scale of the figures is more drastically enlarged in the thickness direction (vertical direction), than in the planar direction (horizontal direction).

In the concavo-convex layer of the present invention, the average particle number of the reactive inorganic fine particles B per unit area of the cross-section of the skin layer in thickness direction is as small as 80% or less of the average particle number of the inorganic fine particles B per unit area of the cross-section of the concavo-convex layer in thickness direction. Because the skin layer has a smaller average particle number of the reactive inorganic fine particles B than the region situated nearer the transparent substrate film in relation to the surface region, there is a decrease in the number of the inorganic fine particles B, part of which particles being protruded through the interface on the side opposite to the transparent substrate film side of the concavo-convex layer. Accordingly, there is a decrease in the number of the inorganic fine particles B that are, in the saponification treatment of the concavo-convex layer, eluted or detached into an alkali solution from the interface of the concavo-convex layer. As a result, the anti-glare film of the present invention can be imparted with excellent resistance to saponification.

It is not clear why the concavo-convex layer has such a skin layer; however, the reason is supposed to be that the diffusion coefficient of the inorganic fine particles B is reduced by setting the particle diameter of the reactive inorganic fine particles B to 30 nm or more and 100 nm or less as mentioned above; therefore, the inorganic fine particles B are enabled to stay easily on the transparent substrate film side of the concavo-convex layer, rather than the interface on the side opposite to the transparent substrate film side of the concavo-convex layer.

In a preferred embodiment of the anti-glare film of the present invention, the thickness of the skin layer, which is from the interface on the side opposite to the transparent substrate film side of the skin layer, can be five times the average particle diameter of the reactive inorganic fine particles B.

In a preferred embodiment of the anti-glare film of the present invention, it is possible that the average interparticle distance between the reactive inorganic fine particles B is 30 nm or more in the region situated nearer the transparent substrate film in relation to the skin layer, and the reactive inorganic fine particles B are uniformly dispersed in at least part of the region, which part is adjacent to the transparent substrate film.

In the concavo-convex layer of the present invention, it is preferable that the region where the average interparticle distance between the reactive inorganic fine particles B is 30 nm or more and the inorganic fine particles B are uniformly dispersed in the region situated nearer the transparent substrate film in relation to the skin layer, accounts for up to two-thirds of the region between the interface on the transparent substrate film side of the concavo-convex layer and the interface on the side opposite to the transparent substrate film side of the concavo-convex layer, so that sufficient abrasion resistance can be imparted to the anti-glare layer while suppressing the amount of the reactive inorganic fine particles B.

In the saponification treatment of the anti-glare film, normally, the top few nanometers of the anti-glare layer surface comprising the curable resin composition is dissolved in an alkali solution. At this time, if the reactive inorganic fine particles B are partially protruded through the interface on the side opposite to the transparent substrate film side of the anti-glare layer, because the curable resin composition around the protruded inorganic fine particles B is dissolved in an alkali solution, a slight gap is formed between the inorganic fine particles B and the curable resin composition around the particles, thereby allowing the inorganic fine particles B to be easily eluted or detached from the surface of the anti-glare layer.

In contrast, by providing the above-mentioned skin layer to the concavo-convex layer, the number of the reactive inorganic fine particles B that are present on the interface on the side opposite to the transparent substrate film side of the concavo-convex layer and in the vicinity of the interface, that is, the number of the inorganic fine particles B that are eluted or detached from the surface of the anti-glare layer can be decreased. Furthermore, because the concavo-convex layer has the above-mentioned region where the inorganic fine particles B are uniformly dispersed on the transparent substrate film side of the concavo-convex layer from the skin layer, sufficient abrasion resistance can be imparted to the anti-glare layer while suppressing the content of the reactive inorganic fine particles B contained in the anti-glare layer.

Accordingly, the anti-glare film of the present invention shows excellent saponification resistance and no longer requires a protective film in the saponification treatment, so that the number of processes and the cost of materials can be reduced.

In a preferred embodiment of the anti-glare film of the present invention, the anti-glare layer can show a hardness of 3H or more on the pencil hardness test defined in JIS K5600-5-4 (1999) conducted with a load of 500 g.

In a preferred embodiment of the anti-glare film of the present invention, the anti-glare layer can have a steel wool resistance at which the anti-glare layer has no scratches on a steel wool test with a load of 500 g or less.

Hereinafter, the curable resin composition for an anti-glare layer of the present invention and the anti-glare film formed by using the composition will be described in order.

<1. Curable Resin Composition for an Anti-Glare Layer>

The curable resin composition for an anti-glare layer of the present invention comprises:

(1) optically-transparent fine particles A having an average particle diameter of 1 μm or more and 10 μm or less;

(2) reactive inorganic fine particles B having an average particle diameter of 30 nm or more and 100 nm or less, wherein at least part of the particle surface is covered with an organic component, and each particle has reactive functional groups b introduced onto the surface covered by the organic component; and (3) a curable binder system comprising a binder component C and having curing reactivity in the system, wherein the binder component C has reactive functional groups c having cross-linking reactivity with the reactive functional groups b of the reactive inorganic fine particles B, wherein the haze value of a cured product of the curable resin composition for an anti-glare layer meets the relationships given by the following formulae I to III:

$$|Hz(hW_B+W_C)-Hz(W_B+W_C)|<|Hz(hW_B+W_C+W_A)-Hz(W_B+W_C+W_A)| \quad (I)$$

$$|Hz(hW_B)-Hz(W_B)|<2 \quad (II)$$

$$|Hz(hW_B+W_C)-Hz(W_B+W_C)|<2 \quad (III)$$

wherein each of $Hz(W_B)$, $Hz(hW_B)$, $Hz(W_B+W_C)$, $Hz(hW_B+W_C)$, $Hz(W_B+W_C+W_A)$ and $Hz(hW_B+W_C+W_A)$ refers to the haze value of each composition; each W in the parentheses refers to the weight of the reactive inorganic fine particles B, binder component C or optically-transparent fine particles A in each composition; and h is a constant of 1 or more.

According to the curable resin composition for an anti-glare layer of the present invention, the film strength of the concavo-convex layer formed by curing the composition can be increased because the reactive functional groups b of the reactive inorganic fine particles B contained in the curable binder system are cross-linked to the reactive functional groups c of the binder component C contained in the same.

The haze value of the cured product of the curable resin composition for an anti-glare layer of the present invention is preferably from 5 to 20%, more preferably from 9 to 15%. If the haze value is less than 5%, it is difficult to impart sufficient anti-glare properties to the anti-glare film or the like prepared by using the cured product of the curable resin composition for an anti-glare layer. If the haze value is 20% or more, the anti-glare properties of the anti-glare layer or the like becomes excess and may decrease the front contrast, therefore.

Hereinafter, the constituents of the curable resin composition for an anti-glare layer of the present invention will be described in order and detail.

In the present invention, (meth)acryloyl refers to acryloyl and/or methacryloyl; (meth)acrylate refers to acrylate and/or methacrylate; and (meth)acryl refers to acryl and/or methacryl. The light mentioned in the present specification includes not only electromagnetic waves having a wavelength in the visible or nonvisible region (such as ultraviolet rays) but also particle beams (such as electron beams) and radiation (a general term for electromagnetic waves and particle beams) or ionizing radiation.

The reactive functional groups b and reactive functional groups c of the present invention include photocurable functional groups and thermosetting functional groups. Photocurable functional groups refer to functional groups that develop polymerization reaction or cross-linking reaction by light radiation, thereby curing a coating. Examples thereof include those which can develop a reaction such as a polymerization reaction (such as a photo-radical polymerization, a photo-cationic polymerization and a photo-anionic polymerization), an addition-polymerization which proceeds via photo-dimerization, and a condensation polymerization. The thermosetting functional groups mentioned in the present specification refer to functional groups that develop polymerization reaction, cross-linking reaction or the like between the same kind of functional groups or with different kinds of functional groups by heating, thereby curing a coating. Examples of the thermosetting functional groups include a hydroxyl group, carboxyl group, amino group, epoxy group, isocyanate group and so on.

As the reactive functional groups b and reactive functional groups c used in the present invention, polymerizable unsaturated groups are suitably used especially from the viewpoint or increasing the hardness of the cured film. Preferred are photocurable unsaturated groups, and particularly preferred are ionizing radiation-curable unsaturated groups. Specific examples thereof include an ethylene double bond such as a (meth)acryloyl group, a vinyl group and an allyl group, and an epoxy group.

<1-1. Optically-Transparent Fine Particles A>

The optically-transparent fine particles A are fine particles that are contained to form concavoconvexes on a surface of the anti-glare layer to impart anti-glare properties to the anti-glare layer. Depending on the intended purpose, the optically-transparent fine particles A may be prepared by mixing one kind or two or more kinds of particles in combination for use, such as those comprising different components or having different shapes, particle size distributions, etc. It is preferable to use one to three kinds of particles, particularly preferably two to three kinds of particles. However, for the purpose other than forming concavoconvexes, more kinds of particles may be used.

One or more kinds of particles that are used as the optically-transparent fine particles A of the present invention may be of spherical shape, such as true spherical shape and spheroidal shape. The particles are more preferably of true spherical shape. The average particle diameter (μm) of each of the one or more kinds of particles used as the optically-transparent fine particles A is 1 μm or more and 10 μm or less, preferably 1 μm or more and 7 μm or less, and more preferably 2 μm or more and 5 μm or less. If the average particle diameter is less than 1 μm, it is difficult to impart a concavo-convex shape of a size that makes it possible to exhibit sufficient anti-glare properties to the surface of the anti-glare layer, even if such a concavo-convex shape can be imparted, it is necessary to greatly increase the added amount of the optically-transparent fine particles A, which leads to deterioration in the properties of the anti-glare layer. If the average particle diameter exceeds 10 μm, the surface shape of the anti-glare layer is roughen and may cause deterioration in the surface quality, or the surface haze is increased and may increase whiteness. The optically-transparent fine particles A may be aggregated particles. If they are aggregated particles, the secondary particle diameter of the particles is only needed to be in the above range.

Preferably, 80% or more (preferably 90% or more) of the optically-transparent fine particles A is in the range of each of the average particle diameter ±300 nm. As a result, the uniformity of concavo-convex shapes of the anti-glare layer can be excellent.

From the viewpoint of increasing the strength of the anti-glare layer, it is preferable to use inorganic fine particles as the optically-transparent fine particles A, and silica fine particles are particularly preferably used.

It is preferable that both of the optically-transparent fine particles A of the present invention and the reactive inorganic fine particles B that will be described below comprise silica, so that in the concavo-convex layer, the inorganic fine particles B can be easily aggregated on the surface of the optically-transparent fine particles A having a particle diameter larger than that of the inorganic fine particles B, thereby improving the internal scattering property (internal haze) of the concavo-convex layer.

As the inorganic fine particles, for example, there may be mentioned irregularly shaped silica and inorganic silica beads. As the irregularly shaped silica, it is preferable to use silica beads having excellent dispersibility and a particle diameter of 1 to 10 μm. To impart excellent dispersibility to the irregularly shaped silica without increasing the viscosity of a coating liquid for forming an anti-glare layer that will be described below in detail, it is preferable to use irregularly shaped silica hydrophobized by performing an organic treatment on the surface of the silica particles. Examples of the organic treatment include a method of chemically bonding a compound to the bead surface and a physical method of allowing a compound to permeate through the voids present in the composition forming beads, not chemically bonding the compound to the bead surface. Either method may be used. In general, a chemical treatment method utilizing active groups on the surface of silica, such as a hydroxyl group and a silanol group, is preferably used from the viewpoint of treatment efficiency. As the compound used in the treatment, there may be used a silane-based, siloxane-based or silazane-based material having high reactivity with the above active groups. For example, there may be mentioned a straight-chain alkyl monosubstituted silicone material such as methyltrichlorosilane, a branched alkyl monosubstituted silicone material, a straight-chain alkyl polysubstituted silicone compound such as di-n-butyldichlorosilane and ethyldimethylchlorosilane, and a branched alkyl polysubstituted silicone compound. A straight-chain or branched monosubstituted alkyl group, or polysubstituted siloxane material or silazane material may be efficiently used as well.

Depending on the necessary function, there may be used one having a hetero atom, unsaturated binding group, cyclic binding group, aromatic functional group or the like at the terminals or intermediate site of the alkyl chain thereof.

Since the alkyl groups contained in these compounds are hydrophobic, the surface of a material to be treated can be easily converted from hydrophilic to hydrophobic, thereby obtaining high affinity for a polymer material which has poor affinity when untreated.

From the viewpoint of increasing the strength of the anti-glare layer, it is preferable to use inorganic fine particles as the optically-transparent fine particles A, and silica fine particles are particularly preferably used.

It is preferable that both of the optically-transparent fine particles A of the present invention and inorganic fine particles that will be the core particles of the reactive inorganic fine particles B that will be described below comprise silica, so that in the concavo-convex layer, there is an increase in the affinity between the optically-transparent fine particles A and the reactive inorganic fine particles B, and the reactive inorganic fine particles B are thus aggregated on the surface of the optically-transparent fine particles A having a larger particle diameter, thereby improving the internal scattering property of the concavo-convex layer by the resultant aggregates.

The content of the optically-transparent fine particles A is preferably 1 part by weight or more and parts by weight or less with respect to the total amount of 100 parts by weight of the reactive inorganic fine particles B and the constituents of the curable binder system in the concavo-convex layer, which fine particles B and binder system will be described below. More preferably, the content is 2 parts by weight or more and 4 parts by weight or less. If the content is less than 1 part by weight, no sufficient anti-glare properties may be imparted. The content exceeding 5 parts by weight is not preferred because, if exceeding 5 parts by weight, a decrease in the front contrast of the film may not be prevented, which is attributed to an increase in internal haze.

Haze serves as an anti-glare property, and there are external haze and internal haze. External haze relates to the size and number of concavoconvexes on the surface of a film, while internal haze relates to the amount of difference between the refractive index of fine particles with anti-glare properties, such as the optically-transparent fine particles A, and the refractive index of a binder.

In the case of mixing two or more kinds of optically-transparent fine particles and using the mixture as the optically-transparent fine particles A, preferred are optically-transparent fine particles which satisfy the following formula (1):

$$0.25R_1(\text{preferably } 0.50R_1) \leqq R_2 \leqq 1.0R_1(\text{preferably } 0.75R_1) \quad \text{Formula (1)}$$

wherein $R_1$ (μm) is the average particle diameter of the first fine particles and $R_2$ (μm) is the average particle diameter of the second fine particles.

Because $R_2$ is $0.25R_1$ or more, easy dispersion in a coating liquid is provided, and no aggregation of the particles occurs. Also, in the drying process after coating, concavoconvexes of uniform shape can be formed with no influence of wind that blows upon floating. This relationship also occurs between the second fine particles and the third fine particles. Fine particles that are preferred as the third fine particles, $R_3$, are those which can meet the following relationship: $0.25R_2 \leqq R_3 \leqq 1.0R_2$.

When using two or more kinds of fine particles comprising different components as a mixture, it is preferable that, as mentioned above, the average particle diameters of the two or more kinds of fine particles are different from each other. However, those having the same average particle diameter are also preferably used.

<1-2. Reactive Inorganic Fine Particles B>

It is common to increase the abrasion resistance of an anti-glare layer by incorporating inorganic fine particles in the anti-glare layer. The abrasion resistance can be increased further by allowing inorganic fine particles having cross-linking reactivity to cross-link with a curable binder, thereby forming a cross-linking structure therebetween. The reactive inorganic fine particles B are inorganic fine particles wherein at least part of the surface of particles that will be core particles is covered with an organic component, and each particle has reactive functional groups b introduced onto the surface covered by the organic component. The reactive inorganic fine particles B include particles each of which has two or more inorganic fine particles as the core particle thereof. By decreasing the particle diameter, the reactive inorganic fine particles B can increase the number of cross-links in a matrix with respect to the content.

The concavo-convex layer of the present invention contains the reactive inorganic fine particles B for the purpose of increasing the hardness so as to have sufficient abrasion resistance. The reactive inorganic fine particles B may be those that are able to impart an additional function(s) to the concavo-convex layer, and they are appropriately selected for use depending on the intended purpose.

The average particle diameter of the reactive inorganic fine particles B of the present invention is 30 nm or more and 100 nm or less, preferably 30 nm or more and 70 nm or less, more preferably 40 nm or more and 60 nm or less. By setting the average particle diameter of the reactive inorganic fine particles B to 30 nm or more, abrasion resistance can be imparted to the concavo-convex layer; moreover, the diffusion coefficient of the inorganic fine particles B is decreased, thereby decreasing the number of the inorganic fine particles B that are present on the interface on the side opposite to the transparent substrate film side of the concavo-convex layer and in the vicinity of the interface. Also, by setting the average particle diameter of the reactive inorganic fine particles B to 100 nm or less, the number of cross-links in a matrix can be increased with respect to the content, thereby obtaining a concavo-convex layer with high strength.

Preferably, the inorganic fine particles B are monodisperse particles having a sharp particle size distribution, from the viewpoint of significantly increasing the hardness with keeping the restoration rate in the case of using a resin only, without deteriorating the transparency.

As the inorganic fine particles, for example, there may be mentioned metal oxide fine particles such as silica ($SiO_2$), aluminum oxide, zirconia, titania, zinc oxide, germanium oxide, indium oxide, tin oxide, indium tin oxide (ITO), antimony oxide and cerium oxide, and metal fluoride fine particles such as magnesium fluoride and sodium fluoride. There may be also used metal fine particles, metal sulfide fine particles, metal nitride fine particles or the like.

From the viewpoint of high hardness, silica or aluminum oxide is preferred. To make the concavo-convex layer a high refractive index layer relative to a layer adjacent to the antiglare layer, fine particles of zirconia, titania, antimony oxide or the like may be appropriately selected for use, because these particles provide a high refractive index when forming a film. Similarly, to make the concavo-convex layer a low refractive index layer relative to a layer adjacent to the antiglare layer, fine particles of fluoride such as magnesium fluoride and sodium fluoride may be appropriately selected for use, because these particles provide a low refractive index when forming a film. Furthermore, to impart antistatic properties and conductivity, indium tin oxide (ITO), tin oxide or the like may be appropriately selected for use. They may be used solely or in combination of two or more kinds.

Normally, the surface of inorganic fine particles has groups that cannot be present inside the inorganic fine particles as they are. In general, these groups on the surface are functional groups that are relatively reactive. For example, they are hydroxyl groups or oxy group in the case of metal oxides. In the case of metal sulfides, they are thiol groups or thio groups, for instance. In the case of nitrides, they are amino groups, amide groups or imide groups, for instance.

The reactive inorganic fine particles B used in the present invention are such that at least part of the particle surface is covered with an organic component, and each particle has reactive functional groups b introduced onto the surface covered by the organic component. The "organic component" here refers to a component containing a carbon. Embodiments in which at least part of the particle surface is covered with an organic component include, for example, an embodiment in which a compound containing an organic component such as a silane coupling agent reacts with hydroxyl groups present on the surface of the inorganic fine particles, thereby binding the organic component to part of the particle surface; an embodiment in which an organic component is attached to hydroxyl groups present on the surface of the inorganic fine particles by interaction such as hydrogen bonding; and an embodiment in which one or more inorganic fine particles are contained in each polymer particle.

It is preferable for the covering organic component to cover almost all over the particle surface from the viewpoint of preventing aggregation of the inorganic fine particles and increasing the film hardness by introducing large number of reactive functional groups onto the surface of the inorganic fine particles. From this viewpoint, in the reactive inorganic fine particles B, the organic component covering the reactive inorganic fine particles B is preferably contained in an amount of $1.00 \times 10^{-3}$ $g/m^2$ or more per unit area of the inorganic fine particles to be covered. In the embodiment in which the organic component is attached or bound to the surface of the inorganic fine particles, the organic component covering the reactive inorganic fine particles B is more preferably contained in the reactive inorganic fine particles B in an amount of $2.00 \times 10^{-3}$ $g/m^2$ or more per unit area of the inorganic fine particles to be covered, and particularly preferably in an amount of $3.50 \times 10^{-3}$ $g/m^2$ or more. In the embodiment in which the inorganic fine particles are contained in polymer particles, the organic component covering the reactive inorganic fine particles B is contained in the reactive inorganic fine particles B more preferably in an amount of $3.50 \times 10^{-3}$ $g/m^2$ or more per unit area of the inorganic fine particles to be covered, and particularly preferably in an amount of $5.50 \times 10^{-3}$ $g/m^2$ or more.

The amount of the covering organic component can be normally obtained as the constant amount of a weight loss (%) in the case of completely burning a dry powder in air, and by, for example, thermogravimetric analysis from room temperature to generally 800° C. in air.

The amount of the organic component per unit area is obtained by the following method: firstly, the organic component and inorganic component are measured for their weight by differential thermogravimetry (DTG); next, the volume of the whole inorganic component is calculated from the weight and the specific gravity of the inorganic fine particles used; on the assumption that the inorganic fine particles to be covered are true spherical, the volume per inorganic fine particle to be covered is calculated from the average particle diameter of the inorganic fine particles to be covered; the number of the inorganic fine particles to be covered is obtained from the volume of the whole inorganic component and the volume per inorganic fine particle to be covered; finally, the amount of the organic component per unit area of the inorganic fine particles to be covered is obtained by dividing the weight of the organic component per reactive inorganic fine particle B by the surface area per inorganic fine particle to be covered.

As the reactive functional groups b of the reactive inorganic fine particles B, polymerizable unsaturated groups are suitably used from the viewpoint of increasing the hardness of the cured film. Preferred are photocurable unsaturated groups, and particularly preferred are ionizing radiation-curable unsaturated groups. Specific examples thereof include an ethylene double bond such as a (meth)acryloyl group, a vinyl group and an allyl group, and an epoxy group.

As the method of preparing the reactive inorganic fine particles B in which at least part of the particle surface is covered with an organic component and each particle has reactive functional groups b introduced onto the surface covered by the organic component, a conventionally-known method may be appropriately selected for use depending on the kind of inorganic fine particles that will be the core particles and on the reactive functional groups to be introduced.

Especially in the present invention, it is preferred to appropriately select any of the following inorganic fine particles (i), (ii) and (iii) for use, from the viewpoint of allowing the covering organic component to be contained in the reactive inorganic fine particles B in an amount of $1.00 \times 10^{-3}$ g/m² or more per unit area of the inorganic fine particles to be covered, preventing aggregation of the inorganic fine particles and increasing the film hardness:

(i) inorganic fine particles having the reactive functional groups b on the surface thereof, which particles are obtained by dispersing inorganic fine particles in water and/or an organic solvent serving as a dispersion medium, in the presence of one or more kinds of surface modification compounds which have a molecular weight of 500 or more and are selected from the group consisting of a saturated or unsaturated carboxylic acid, an acid anhydride, acid chloride, ester and acid amide corresponding to the carboxylic acid, an amino acid, an imine, a nitrile, an isonitrile, an epoxy compound, an amine, a β-dicarbonyl compound, silane and a metallic compound having a functional group;

(ii) inorganic fine particles having the reactive functional groups b on the surface thereof, which particles are obtained by ejecting, into water through a hydrophilic porous membrane, a monomer in which inorganic fine particles having a particle diameter of 30 nm or more and 100 nm or less are dispersed in a hydrophobic vinyl monomer to prepare an aqueous dispersion comprising droplets of the monomer in which the inorganic fine particles are dispersed, and polymerizing the aqueous dispersion; and (iii) inorganic fine particles having the reactive functional groups b on the surface thereof, which particles are obtained by bonding metal oxide fine particles to a compound containing the reactive functional group b that will be introduced onto the inorganic fine particles, a group represented by the following chemical formula (1), and a silanol group or a group that is able to become a silanol group by hydrolysis:

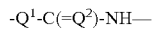  Chemical formula (1)

wherein $Q^1$ is NH, O (oxygen atom) or S (sulfur atom); and $Q^2$ is O or S.

Hereinafter, the reactive inorganic fine particles B which are suitably used in the present invention will be described in order.

(i) Inorganic fine particles having the reactive functional groups b on the surface thereof, which particles are obtained by dispersing inorganic fine particles in water and/or an organic solvent serving as a dispersion medium, in the presence of one or more kinds of surface modification compounds which have a molecular weight of 500 or more and are selected from the group consisting of a saturated or unsaturated acid, an acid anhydride, acid chloride, ester and acid amide corresponding to the carboxylic acid, an amino acid, an imine, a nitrile, an isonitrile, an epoxy compound, an amine, a β-dicarbonyl compound, silane and a metallic compound having a functional group.

Use of the reactive inorganic fine particles B (i) is advantageous in that the film strength can be increased even if the content of the organic component is small.

The surface modification compound used for the reactive inorganic fine particles B (i) has functional groups that can chemically bind to, upon dispersion, groups that are present on the surface of the inorganic fine particles, such as a carboxyl group, an acid anhydride group, an acid chloride group, an acid amide group, an ester group, an imino group, a nitrile group, an isonitrile group, a hydroxyl group, a thiol group, an epoxy group, a primary, secondary or tertiary amino group, a Si—OH group, a hydrolyzable residue of silane, or a C—H acid group such as a β-dicarbonyl compound. The chemical bonding here preferably includes covalent bonding, ionic bonding or coordination bonding, and hydrogen bonding. Coordination bonding is considered to be complex forming. For example, an acid-base reaction according to the Brønsted or Lewis definition, complex formation or esterification occurs between the functional groups of the surface modification compound and the groups present on the surface of the inorganic fine particles. The surface modification compound used for the reactive inorganic fine particles B (i) may be one kind of component solely or a mixture of two or more kinds of components.

In addition to at least one functional group (hereinafter referred to as first functional group) that can participate in chemical bonding with the groups that are present on the surface of the inorganic fine particles, the surface modification compound normally has molecular residues that impart, after the surface modification compound is combined, a new property to the inorganic fine particles via the functional group. The molecular residues or part of the molecular residues are hydrophobic or hydrophilic and, for example, can stabilize, compatibilize or activate the inorganic fine particles.

As the hydrophobic molecular residue, for example, there may be mentioned an alkyl, aryl, alkaryl, aralkyl or fluorine-containing alkyl group, all of which induce inactivation or repulsion. As the hydrophilic group, for example, there may be mentioned a hydroxy group, alkoxy group or polyester group.

The reactive functional groups b that are introduced onto the surface so that the reactive inorganic fine particles B can react with the binder component C, are appropriately selected depending on the binder component C. As the reactive functional groups b, polymerizable unsaturated groups are suitably used. Preferred are photocurable unsaturated groups, and particularly preferred are ionizing radiation-curable unsaturated groups. Specific examples thereof include an ethylene double bond such as a (meth)acryloyl group, a vinyl group and an allyl group, and an epoxy group.

In the case where the reactive functional groups b which are reactive with the binder component C are contained in the molecular residues of the surface modification compound, the reactive functional groups b that are reactive with the binder component C can be introduced onto the surface of the reactive inorganic fine particles B (i) by allowing the first functional group contained in the surface modification compound to react with the surface of the inorganic fine particles. For example, as a suitable one, there may be mentioned a surface modification compound having a polymerizable unsaturated group besides the first functional group.

Meanwhile, by allowing a second reactive functional group to be contained in the molecular residues of the surface modification compound and by the aid of the second reactive functional groups, the reactive functional groups b that are reactive with the binder component C may be introduced onto the surface of the reactive inorganic fine particles B (i). For example, it is preferable to introduce the reactive functional groups b that are reactive with the binder component C in such a manner that groups capable of hydrogen bonding (hydrogen bond-forming groups) such as a hydroxyl group and an oxy group are introduced as the second reactive functional groups so that the hydrogen bond-forming groups are introduced onto the surface of the inorganic fine particles and further react with hydrogen bond-forming groups of a different surface modification compound. That is, as a suitable example, there may be mentioned use of a compound having a hydrogen bond-forming group in combination with the reactive functional group b that are reactive with the binder component (such as polymerizable unsaturated groups) as the surface modification compound. Specific examples of the hydrogen bond-forming groups include functional groups such as a hydroxyl group, a carboxyl group, an epoxy group, a glycidyl group and an amide group, or one capable of having an amide bond. The amide bond here refers to one containing —NHC (O) or >NC(O)— in the binding unit thereof. As the hydrogen bond-forming group used in the surface modification compound of the present invention, a carboxyl group, hydroxyl group or amide group is particularly preferred.

The surface modification compound used for the reactive inorganic fine particles B (i) preferably has a molecular weight of 500 or less, more preferably 400 or less, particularly preferably 200 or less. Because of having such a low molecular weight, the surface modification compound is presumed to be able to rapidly cover the surface of the inorganic fine particles, so that the covered inorganic fine particles are prevented from aggregation.

The surface modification compound used for preparation of the reactive inorganic fine particles B (i) is preferably liquid in the reaction condition for surface modification, and it is preferable that the compound is soluble or at least can be emulsified in a dispersion medium. Especially, it is preferable that the surface modification compound can be dissolved in a dispersion medium to exist as molecules or molecular ions dispersed uniformly in the dispersion medium.

The saturated or unsaturated carboxylic acid has 1 to 24 carbon atoms. Examples thereof include formic acid, acetic acid, propionic acid, butyric acid, valeric acid, caproic acid, acrylic acid, methacrylic acid, crotonic acid, citric acid, adipic acid, succinic acid, glutaric acid, oxalic acid, maleic acid, fumaric acid, itaconic acid and stearic acid, as well as the corresponding acid anhydrides, chlorides, esters and amides such as caprolactam. Examples of the carboxylic acid include one having a carbon chain interrupted by an O-group, S-group or NH-group. Particularly preferred are, for example, an ether carboxylic acid such as monoether carboxylate and polyether carboxylate, and an acid hydride, ester and amide corresponding thereto (such as methoxyacetic acid, 3,6-dioxaheptanoic acid and 3,6,9-trioxadecanoic acid). Further, it is possible to introduce polymerizable unsaturated groups by using an unsaturated carboxylic acid.

An example of preferred amine is one having the general formula $Q_{3-n}NH_n$ (n=0, 1 or 2), wherein the residue Q independently represents an alkyl (such as methyl, ethyl, n-propyl, i-propyl and butyl) having 1 to 12 carbon atoms, more preferably 1 to 6 carbon atoms, particularly preferably 1 to 4 carbon atoms, and an aryl, alkaryl or aralkyl (such as phenyl, naphthyl, tolyl and benzyl) having 6 to 24 carbon atoms. Also, an example of preferred amine is polyalkyleneamine. Specific examples thereof include methylamine, dimethylamine, trimethylamine, ethylamine, aniline, N-methylaniline, diphenylamine, triphenylamine, toluidine, ethylenediamine and diethylenetriamine.

The β-dicarbonyl compound is preferably one having 4 to 12 carbon atoms, particularly preferably 5 to 8 carbon atoms, such as diketone (acetylacetone, etc.), 2,3-hexanedione, 3,5-heptanedione, acetoacetic acid, acetoacetic acid-$C_1$-$C_4$-alkyl ester (acetoacetic acid ethyl ester, etc.), diacetyl and acetonylacetone.

Examples of the amino acid include β-alanine, glycine, valine, amino caproic acid, leucine and isoleucine.

Preferred silane is hydrolyzable organosilane having at least one hydrolyzable group or hydroxy group and at least one nonhydrolyzable residue. Examples of the hydrolyzable group include a halogen, alkoxy group and acyloxy group. As the nonhydrolyzable residues, nonhydrolyzable residues having reactive functional groups b and/or having no reactive functional groups b is used. Alternatively, there may be used silane at least partly having fluorine-substituted organic residues.

The silane used here is not particularly limited and may be, for example, $CH_2=CHSi(OOCCH_3)_3$, $CH_2=CHSiCl_3$, $CH_2=CH-Si(OC_2H_5)_3$, $CH_2=CH-Si(OC_2H_4OCH_3)_3$, $CH_2=CH-CH_2-Si(OC_2H_5)_3$, $CH_2=CH-CH_2-Si(OOCCH_3)_3$, γ-glycidyloxypropyltrimethoxysilane (GPTS), γ-glycidyloxypropyldimethylchlorosilane, 3-aminopropyltrimethoxysilane (APTS), 3-aminopropyltriethoxysilane (APTES), N-(2-aminoethyl)-3-aminopropyltrimethoxysilane, N-[N'-(2'-aminoethyl)-2-aminoethyl]-3-aminopropyltrimethoxysilane, hydroxymethyltrimethoxysilane, 2-[methoxy(polyethyleneoxy)propyl]trimethoxysilane, bis-(hydroxyethyl)-3-aminopropyltriethoxysilane, N-hydroxyethyl-N-methylaminopropyltriethoxysilane, 3-(meth) acryloxypropyltriethoxysilane and 3-(meth) acryloxypropyltrimethoxysilane.

As the metallic compound having a functional group, there may be mentioned a metallic compound of a metal M selected from the primary groups III to V and/or the secondary groups II to IV of the periodical table of the elements. As such a metallic compound, for example, there may be mentioned zirconium alkoxide or titanium alkoxide and $M(OR)_4$ (M=Ti or Zr) wherein part of the OR group is replaced with a complexing agent such as a β-dicarbonyl compound or monocarboxylic acid. In the case of using a compound having a polymerizable unsaturated group (e.g., methacrylic acid) as the complexing agent, it is possible to introduce polymerizable unsaturated groups.

As the dispersion medium, water and/or an organic solvent is suitably used. An especially preferred dispersion medium is distilled (pure) water. As the organic solvent, a polar solvent, nonpolar solvent or aprotic solvent is preferred. Examples thereof include alcohols such as aliphatic alcohol having 1 to 6 carbon atoms (in particular, methanol, ethanol, n- and i-propanol and butanol); ketones such as acetone and butanone; esters such as ethyl acetate; ethers such as diethyl ether, tetrahydrofuran and tetrahydropyran; amides such as dimethylacetamide and dimethylformamide; sulfoxides and sulfones such as sulfolane and dimethylsulfoxide; and aliphatic (optionally halogenated) hydrocarbons such as pentane, hexane and cyclohexane. These dispersion media may be used as a mixture.

The dispersion medium preferably has a boiling point at which it can be easily removed by distillation (optionally under reduced pressure). Preferred as the dispersion medium is a solvent having a boiling point of 200° C. or less, particularly preferably 150° C. or less.

In preparation of the reactive inorganic fine particles B (i), the concentration of the dispersion medium is normally from 40 to 90 wt %, preferably from to 80 wt %, particularly preferably from 55 to 75 wt %. The rest of the dispersion is composed of untreated inorganic fine particles and the above surface modification compound. Herein, the weight ratio of the untreated inorganic fine particles to the surface modification compound is preferably from 100:1 to 4:1, more preferably from 50:1 to 8:1, particularly preferably from 25:1 to 10:1.

Preparation of the Reactive Inorganic Fine particles B (i) is preferably carried out at a temperature from room temperature (about 20° C.) to the boiling point of the dispersion medium. The dispersion temperature is particularly preferably from 50 to 100° C. The dispersion time particularly depends on the kind of raw materials used, and is normally few hours such as 1 to 24 hours.

(ii) Inorganic fine particles having reactive functional groups b on the surface thereof, which particles are obtained by ejecting, into water through a hydrophilic porous membrane, a monomer composition in which inorganic fine particles having a particle diameter of 30 nm or more and 100 nm or less are dispersed in a hydrophobic vinyl monomer to prepare an aqueous dispersion comprising droplets of the monomer in which the inorganic fine particles are dispersed, and polymerizing the aqueous dispersion Use of the reactive inorganic fine particles B (ii) is advantageous in that from the viewpoint of particle size distribution, monodispersity is further increased and it is possible to prevent appearance of irregular functions in the case of containing coarse particles.

The reactive inorganic fine particles B used in the present invention are inorganic fine particles wherein at least part of the particle surface is covered with an organic component, and each particle has reactive functional groups b introduced onto the surface covered by the organic component. Accordingly, in the hydrophobic vinyl monomer used in polymerization to produce the reactive inorganic fine particles B of type (ii), one having a desired reactive functional group or one having a reactive functional group that make it possible to introduce a desired reactive functional group later, are at least contained. For example, it may be such that after monomers preliminarily having carboxyl groups are used in the hydrophobic vinyl monomers and polymerized, the carboxyl groups are allowed to react with glycidyl methacrylate, thereby introducing polymerizable unsaturated groups.

Specific examples of the hydrophobic vinyl monomer include aromatic vinyl compounds such as styrene, vinyl toluene, α-methylstyrene and divinylbenzene; unsaturated carboxylic esters such as methyl (meth)acrylate, 2-hydroxyethyl (meth)acrylate, t-butyl (meth)acrylate, n-hexyl (meth)acrylate, isobutyl (meth)acrylate, cyclohexyl (meth)acrylate, 2-ethylhexyl (meth)acrylate, lauryl (meth)acrylate, stearyl (meth)acrylate, benzyl (meth)acrylate, mono or di(meth)acrylate of (poly)ethylene glycol, mono or di(meth)acrylate of (poly)propylene glycol, mono or di(meth)acrylate of 1,4-butanediol, and mono-, di- or tri-(meth)acrylate of trimethylolpropane; allyl compounds such as diallyl phthalate, diallylacrylamide, triallyl(iso)cyanurate and triallyltrimellitate; and (poly)oxyalkylene glycol di(meth)acrylate such as (poly)ethylene glycol di(meth)acrylate and (poly)propylene glycol di(meth)acrylate. Also included are conjugated diene compounds such as butadiene, isoprene and chloroprene, and reactive functional groups-containing monomers such as acrylic acid, methacrylic acid, itaconic acid, fumaric acid, glycidyl methacrylate, vinylpyridine, diethylaminoethyl acrylate, N-methylmethacrylamide and acrylonitrile. Among them, highly water-soluble monomers such as acrylic acid, methacrylic acid and itaconic acid may be used within a scope which does not affect the phenomenon that the aqueous solubility of the whole monomer is increased so that an oil-in-water monomer emulsion cannot be produced.

It is necessary for the inorganic fine particles used in (ii) to have a small particle diameter and excellent dispersibility in hydrophobic vinyl monomers. The particle diameter of the inorganic fine particles used here is 30 nm or more and 100 nm or less, preferably 30 nm or more and 70 nm or less, and more preferably 40 nm or more and 60 nm or less. When the inorganic fine particles have poor affinity for a hydrophobic vinyl monomer, it is preferable to preliminarily perform a surface treatment on the surface of the inorganic fine particles. A known method may be used for the surface treatment, such as a dispersant treatment to have a pigment dispersing agent adsorbed on the surface of an inorganic material, a coupling agent treatment using a silane coupling agent, titanate coupling agent or the like, or a polymer coating treatment by capsule polymerization or the like.

In (ii), to emulsify into water the hydrophobic vinyl monomer in which inorganic fine particles are dispersed, the monomer is ejected into water through a hydrophilic porous membrane. The pores of the porous membrane is required to have an average pore diameter from 0.01 to 5 μm, and the pore diameter of the pores is required to be uniform. In addition, it is necessary for the pores to pass through the membrane so as to connect both sides the membrane. The material of the membrane is preferably glass. More specifically, preferred is a porous glass (SPG: Shirasu Porous Glass) obtained in such a manner that a glass of the system $SiO_2$—$Al_2O_3$—$B_2O_3$—CaO, which is prepared by firing raw materials including volcanic ash (shirasu) as the main raw material, is subjected to a heat treatment to be microphase-separated, and the phase that is rich in boric acid is removed by dissolving the phase with acid.

In (ii), as a stabilizer for droplets of the monomer, a surfactant or water-soluble polymer is required to be present in the aqueous phase to which the hydrophobic vinyl monomer containing the inorganic fine particles will be ejected through the porous membrane. Without the stabilizer, the monomer droplets ejected through the membrane are integrated to each other, thereby obtaining a wide particle diameter distribution. As the preferable stabilizer, when the monomer droplets are about 1 μm or more, a water soluble polymer-based stabilizer such as polyvinyl alcohol, hydroxypropylcellulose and polyvinylpyrrolidone is preferred. It is also preferable to add a small amount of anionic surfactant or nonionic emulsifier thereto. For example, a combination of sodium lauryl sulfate as the emulsifier and 1-hexadecanol as the co-emulsifier is particularly preferred as the stabilizer used in (ii) because this combination is strongly adsorbed on the surface of the droplets and provides a great stabilizing effect.

In (ii), an oil-soluble radical initiator is mainly used to polymerize the aqueous dispersion of the emulsified monomer droplets containing the inorganic fine particles. Initiators that can be used as the oil-soluble radical initiator include, for example, an azo-based initiator such as azobisisobutyronitrile, aromatic peroxide such as benzoylperoxide and 2,4-dichlorobenzoylperoxide, aliphatic peroxide such as isobutylperoxide, diisopropyl peroxydicarbonate and di(2-ethylhexylperoxy) dicarbonate. Before emulsification, they may be preliminarily dissolved in the monomer phase for use. Also, a water-soluble radical polymerization inhibitor may be added thereto, such as hydroquinone and ferric chloride.

(iii) Inorganic fine particles having reactive functional groups b on the surface thereof, which particles are obtained by bonding metal oxide fine particles serving as the inorganic fine particles that will be core particles, to a compound containing the reactive functional group b that will be introduced onto the inorganic fine particles, a group represented by the following chemical formula (1), and a silanol group or a group that is able to become a silanol group by hydrolysis:

$$-Q^1-C(=Q^2)-NH—$$ Chemical formula (1)

wherein $Q^1$ is NH, O (oxygen atom) or S (sulfur atom); and $Q^2$ is O or S.

Use of the reactive inorganic fine particles B (iii) is advantageous in that from the viewpoint of increasing the amount of the organic component, the dispersibility of the inorganic fine particles and the strength of a film are further increased.

Firstly, the compound having the reactive functional group b that will be introduced onto the inorganic fine particles, a group represented by the above chemical formula (1), and a silanol group or a group that is able to become a silanol group by hydrolysis will be described. Hereinafter, this compound may be referred to as reactive functional group modified hydrolyzable silane.

In the reactive functional group modified hydrolyzable silane, the reactive functional groups that will be introduced onto the inorganic fine particles are not particularly limited if they are appropriately selected so as to react with the binder component C. The reactive functional group modified hydrolyzable silane is suitable to introduce the above-mentioned polymerizable unsaturated groups.

In the reactive functional group modified hydrolyzable silane, as the group represented by the above chemical formula (1), [-Q¹-C(=Q²)-NH—], there may be mentioned the following six kinds, in particular: [—O—C(=O)—NH—], [—O—C(=S)—NH—], [—S—C(=O)—NH—], [—NH—C(=O)—NH—], [—NH—C(=OS)—NH—] and [—S—C(=S)—NH—]. They may be used solely or in combination of two or more kinds. Especially from the viewpoint of thermal stability, it is preferable to use the [—O—C(=O)—NH—] group in combination with at least one of the [—O—C(=S)—NH—] and [—S—C(=O)—NH—] groups. It is considered that the group represented by the above chemical formula (1), [-Q¹-C(=Q²)-NH—], causes appropriate intermolecular cohesion by hydrogen bonding, and can impart properties such as excellent mechanical strength, adhesion to the substrate and heat resistance when forming a cured product.

As the group that is able to become a silanol group by hydrolysis, there may be mentioned groups having an alkoxy group, aryloxy group, acetoxy group, amino group, halogen atom or the like on a silicon atom. Preferred is an alkoxysilyl group or aryloxysilyl group. The silanol group or group that is able to become a silanol group by hydrolysis can be combined to the metal oxide fine particles by a condensation reaction that occurs after a condensation reaction or hydrolysis.

A preferred specific example of the reactive functional group modified hydrolyzable silane may be a compound represented by the following chemical formula (2):

[Chemical formula 2]

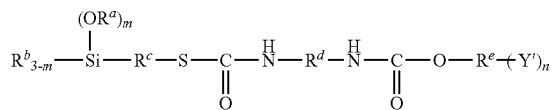

In the chemical formula (2), $R^a$ and $R^b$ may be the same or different from each other, and are a hydrogen atom or a $C_1$-$C_8$ alkyl or aryl group such as methyl, ethyl, propyl, butyl, octyl, phenyl and xylyl group; and m is 1, 2 or 3.

As the group represented by [$(R^aO)_mR^b_{3-m}$Si—], for example, there may be mentioned a trimethoxysilyl group, triethoxysilyl group, triphenoxysilyl group, methyldimethoxysilyl group and dimethylmethoxysilyl group. Among these groups, preferred are trimethoxysilyl and triethoxysilyl groups.

$R^c$ is a $C_1$-$C_{12}$ divalent organic group having an aliphatic or aromatic structure, and may contain a chain, branched or cyclic structure. As such an organic group, for example, there may be mentioned methylene, ethylene, propylene, butylene, hexamethylene, cyclohexylene, phenylene, xylylene and dodecamethylene. Among them, preferred are methylene, propylene, cyclohexylene and phenylene.

$R^d$ is a divalent organic group and is normally selected from divalent organic groups having a molecular weight of 14 to 10,000, preferably a molecular weight of 76 to 500. For example, there may be mentioned a chain polyalkylene group such as hexamethylene, octamethylene and dodecamethylene; an alicyclic or polycyclic divalent organic group such as cyclohexylene and norbornylene; a divalent aromatic group such as phenylene, naphthylene, biphenylene and polyphenylene; and alkyl group-substituted derivatives and aryl group-substituted derivatives thereof. These divalent organic groups may contain an atomic group that contains an element other than carbon and hydrogen atoms, and may further contain a polyether bond, a polyester bond, a polyamide bond, a polycarbonate bond, and a group represented by the chemical formula (1).

$R^e$ is a (n+1)-valent organic group and is preferably selected from a chain, branched or cyclic saturated or unsaturated hydrocarbon group.

Y' denotes a monovalent organic group having reactive functional group and may be the above-mentioned reactive functional group itself. For example, in the case of selecting the reactive functional groups b from polymerizable unsaturated groups, there may be mentioned a (meth)acryloyl(oxy) group, vinyl(oxy) group, propenyl(oxy) group, butadienyl (oxy) group, styryl(oxy) group, ethinyl(oxy) group, cinnamoyl(oxy) group, maleate group, (meth)acrylamide group, etc. Preferably, n is a positive integer of 1 to 20, more preferably 1 to 10, particularly preferably 1 to 5.

Synthesis of the reactive functional group modified hydrolyzable silane used in the present invention may be performed by the method disclosed in, for example, Japanese Patent Application Laid-Open No. H9-100111. That is, for example, to introduce polymerizable unsaturated groups, the synthesis may be performed by: (A) addition reaction between mercaptoalkoxysilane, a polyisocyanate compound and an active hydrogen group-containing polymerizable unsaturated compound that is reactive with an isocyanate group. The synthesis may be also performed by (B) direct reaction between an active hydrogen group-containing polymerizable unsaturated compound and a compound having an alkoxysilyl group and isocyanate group in a molecule thereof. Furthermore, the reactive functional group modified hydrolyzable silane may be directly synthesized by (C) addition reaction between a compound having a polymerizable unsaturated group and isocyanate group in a molecule thereof and mercaptoalkoxysilane or aminosilane.

In the production of the reactive inorganic fine particles B (iii), a method may be selected from the following: a method in which after the reactive functional group modified hydrolyzable silane is separately hydrolyzed, the resultant and inorganic fine particles are mixed together, followed by heating and stirring; a method in which the reactive functional group modified hydrolyzable silane is hydrolyzed in the presence of inorganic fine particles; and a method in which a surface treatment is performed on inorganic fine particles in the presence of other component such as a polyvalent unsaturated organic compound, a monovalent unsaturated organic compound and a radiation polymerization initiator. Preferred is the method in which the reactive functional group modified hydrolyzable silane is hydrolyzed in the presence of inorganic fine particles. In the production of the reactive inorganic fine particles B (iii), the production temperature is normally 20° C. or more and 150° C. or less, and the treating time is in the range from 5 minutes to 24 hours.

To accelerate the hydrolysis reaction, an acid, salt or base may be added as a catalyst. Suitable examples of the acid include an organic acid and unsaturated organic acid. Suitable examples of the base include a tertiary amine and quaternary ammonium hydroxide. The added amount of the acid base catalyst is from 0.001 to 1.0 wt %, preferably from 0.01 to 0.1 wt % with respect to the reactive functional group modified hydrolyzable silane.

As the reactive inorganic fine particles B, there may be used powder particles containing no dispersion medium; however, it is preferable to use a sol comprising fine particles dispersed in a solvent because the dispersion process can be omitted and high productivity can be obtained.

The content of the reactive inorganic fine particles B is preferably 5 parts by weight or more and 20 parts by weight or less, more preferably 7 parts by weight or more and 15 parts by weight or less, with respect to the total amount of 100 parts by weight of the reactive inorganic fine particles B and the constituents of the curable binder system in the concavo-convex layer. If the content is less than 5 parts by weight, the hardness of the concavo-convex layer surface may be insufficient. If more than 20 parts by weight, the filling rate is excessively increased, resulting in the possibility of decreasing the film strength.

The content of the reactive inorganic fine particles B is preferably from 7 to 1,000 parts by weight, more preferably from 80 to 750 parts by weight, particularly preferably from 150 to 500 parts by weight, with respect to the total amount of 100 parts by weight of the optically-transparent fine particles A. If the content is less than 70 parts by weight, no desired concavo-convex shape may be imparted to the concavo-convex layer of the anti-glare layer, resulting in the possibility of decreasing the anti-glare properties and failure to increase the film strength. On the other hand, if the content exceeds 1,000 parts by weight, the cost of the reactive inorganic fine particles B is increased; moreover, the inorganic fine particles B are likely to aggregate, resulting in the possibility of decreasing the contrast.

<1-3. Curable Binder System>

In the present specification, the constituents of the curable binder system refers to those which will be, besides the binder component C, matrix components of the concavo-convex layer after curing the curable binder system, such as a curable binder component other than the binder component C (if necessary), a polymer component and a polymerization initiator. The matrix components will be described hereinafter.

<1-3-1. Binder Component C>

In the curable resin composition for an anti-glare layer of the present invention, the binder component C has the reactive functional groups c that are cross-linkable with the reactive functional groups b of the reactive inorganic fine particles B. The reactive functional groups b are cross-linked to the reactive functional groups c, thereby forming a network structure. Also, the binder component C preferably has three or more reactive functional groups c to obtain sufficient crosslinkability. As the reactive functional groups c, polymerizable unsaturated groups are suitably used. Preferred are photocurable unsaturated groups, and particularly preferred are ionizing radiation-curable unsaturated groups. Specific examples thereof include an ethylene double bond such as a (meth)acryloyl group, a vinyl group and an allyl group, and an epoxy group.

The binder component C is preferably a curable organic resin, which is preferably an optically-transparent resin that can pass light through when formed into a coating film. Specific examples thereof are classified into three kinds of resins including ionizing radiation-curable resins which are curable upon exposure to ionizing radiation typified by ultraviolet light or electron beams, mixtures of ionizing radiation-curable resins with solvent-drying type resins (resins which are capable of forming a coating film just by drying a solvent for regulating a solid matter at the time of coating, such as thermoplastic resins) and thermosetting resins. Among them, preferred are ionizing radiation-curable resins.

Specific examples of ionizing radiation-curable resins include compounds having a radically polymerizable functional group such as a (meth)acrylate group. For example, there may be mentioned (meth)acrylate-based oligomers, prepolymers or monomers. More specifically, as (meth)acrylate-based oligomers or prepolymers, there may be listed oligomers or prepolymers of (meth)acrylic ester of polyfunctional compounds, such as polyester resins, polyether resins, acrylic resins, epoxy resins, urethane resins, alkyd resins, spiroacetal resins, polybutadiene resins, polythiol polyene resins, polyhydric alcohols, each of which having a relatively low molecular weight. Examples of (meth)acrylate-based monomers include ethyl (meth)acrylate, ethylhexyl (meth)acrylate, hexanediol (meth)acrylate, tripropylene glycol di(meth)acrylate, diethylene glycol di(meth)acrylate, 1,6-hexanediol di(meth)acrylate, neopentyl glycol di(meth)acrylate, trimethylolpropane tri(meth)acrylate, pentaerythritol tri(meth)acrylate and dipentaerythritol hexa(meth)acrylate.

Examples of compounds other than the (meth)acrylate-based compounds include monofunctional monomers such as styrene, methylstyrene and N-vinylpyrrolidone, polyfunctional monomers or compounds having a cationic polymerizable functional group such as an oligomer or prepolymer of, for example, a bisphenol type-epoxy compound, a novolac type-epoxy compound, aromatic vinyl ether or aliphatic vinyl ether.

When ionizing radiation-curable resins are used as an ultraviolet curable resin, a sensitizer may be added as a photopolymerization initiator or photopolymerization accelerator.

In the case of a radically polymerizable functional groups-containing resin system, specific examples of the photopolymerization initiator include acetophenones, benzophenones, Michler's benzoyl benzoate, α-amiloxime ester, tetramethylthiuram monosulfide, benzoins, benzoin methyl ether, thioxanthones, propiophenones, benzyls, acyl phosphine oxides and 1-hydroxy-cyclohexyl-phenyl-ketone, which may be used either solely or as a mixture of two or more. For example, 1-hydroxy-cyclohexyl-phenyl-ketone is available as Irgacure 184 (product name; manufactured by: Ciba Specialty Chemicals Inc.) Further, α-aminoalkylphenones are available as Irgacure 907 and Irgacure 369 (product names; manufactured by: Ciba Specialty Chemicals Inc.), for example.

In the case of a cationic polymerizable functional groups-containing resin system, as the photopolymerization initiator, an aromatic diazonium salt, an aromatic sulfonium salt, an aromatic iodonium salt, a metallocene compound, a benzoin sulfonate, etc. may be used either solely or as a mixture of two or more.

It is preferable to mix a photosensitizer, and specific examples thereof include n-butylamine, triethylamine, poly-n-butylphosphine and so on.

The amount of the photopolymerization initiator added is from 0.1 to 10 parts by weight based on 100 parts by weight of the ionizing radiation curable composition.

The solvent drying-type resin used as a mixture with the ionizing radiation-curable resin is mainly a thermoplastic resin. Commonly exemplified thermoplastic resins are usable. Coating defects of the coated face can be effectively prevented by adding the solvent drying-type resin. Specific examples of preferred thermoplastic resins include styrenic resins, (meth)acrylic resins, organic acid vinyl ester resins, vinyl ether resins, halogen-containing resins, olefinic resins (including alicyclic olefinic resins), polycarbonate resins, polyester resins, polyamide resins, thermoplastic polyurethane resins, polysulfone resins (such as polyether sulfone and polysulfone), polyphenylene ether resins (such as a polymer of 2,6-xylenol), cellulose derivatives (such as cellulose esters, cellulose carbamates and cellulose ethers), silicone resins (such as polydimethylsiloxane and polymethylphenylsiloxane) and rubbers or elastomers (such as diene-series rubbers including polybutadiene rubbers and polyisoprene rubbers, styrene-butadiene copolymers, acrylonitrile-butadiene copolymers, acrylic rubbers, urethane rubbers and silicone rubbers).

Specific examples of thermosetting resins include phenol resins, urea resins, diallyl phthalate resins, melamine resins, guanamine resins, unsaturated polyester resins, polyurethane resins, epoxy resins, aminoalkyd resins, melamine-urea co-condensation resins, silicon resins and polysiloxane resins. When the thermosetting resin is used, a curing agent such as a cross-linking agent and a polymerization initiator, a polymerization accelerator, a solvent, a viscosity modifier and the like may be further added if necessary.

<1-3-2. Other Components>

In a preferred embodiment of the present invention, preferably, a leveling agent such as a fluoro-type, silicone-type or other leveling agent is added to a coating solution that will be described below. The coating solution mixed with the leveling agent can impart stable coatability, slidability, anti-fouling properties and abrasion resistance to the surface of a coating film formed with the solution, at the time of applying the composition or drying the applied composition.

<1-4. Solvent>

Examples of the solvent include alcohols such as isopropyl alcohol, methanol, ethanol, butanol and isobutyl alcohol; ketones such as methyl ethyl ketone (MEK), methyl isobutyl ketone (MIBK) and cyclohexanone; esters such as methyl acetate, ethyl acetate and butyl acetate; halogenated hydrocarbons such as chloroform, methylene chloride and tetrachloroethane; aromatic hydrocarbons such as toluene and xylene, or a mixture thereof.

<1-5. Preparation of the Curable Resin Composition for an Anti-Glare Layer>

The curable resin composition for an anti-glare layer of the present invention can be prepared by, in accordance with a general preparation method, mixing the above components and performing a dispersion treatment on the mixture. Paint shaker or bead mill can be used for the mixing and dispersion. When the optically-transparent fine particles A and reactive inorganic fine particles B can be obtained in the state that they are dispersed in the solvent, the curable resin composition for an anti-glare layer can be prepared by adding other components including the curable binder system and solvent appropriately to the fine particles in the dispersion state, mixing the same and performing a dispersion treatment on the mixture.

<2. Anti-glare film>

The anti-glare film of the present invention is an anti-glare film comprising a transparent substrate film and an anti-glare layer which has a concavo-convex shape on the outermost surface thereof and is provided on the observer-side surface of the transparent substrate film, wherein the anti-glare layer comprises a single concavo-convex layer or has a laminated structure that comprises two or more layers including a concavo-convex layer and a surface shape modifying layer disposed on the observer side of the concavo-convex layer;

wherein the concavo-convex layer comprises a cured product of any of the curable resin compositions for an anti-glare layer of the present invention, and has a haze value that meets the relationships given by the following formulae I to III;

wherein the concavo-convex layer has a skin layer in the surface region thereof, which region including an interface on the side opposite to the transparent substrate film side of the concavo-convex layer and the vicinity of the interface, and the skin layer has a smaller average particle number of the reactive inorganic fine particles B than the region situated nearer the transparent substrate film in relation to the surface region; and wherein the average particle number of the reactive inorganic fine particles B per unit area of the cross-section of the skin layer in thickness direction is 80% or less of the average particle number of the reactive inorganic fine particles B per unit area of the cross-section of the concavo-convex layer in thickness direction:

$$|Hz(hW_B+W_C)-Hz(W_B+W_C)|<|Hz(hW_B+W_C+W_A)-Hz(W_B+W_C+W_A)| \quad (I)$$

$$|Hz(hW_B)-Hz(W_B)|<2 \quad (II)$$

$$|Hz(hW_B+W_C)-Hz(W_B+W_C)|<2 \quad (III)$$

wherein each of $Hz(W_B)$, $Hz(hW_B)$, $Hz(W_B+W_C)$, $Hz(hW_B+W_C)$, $Hz(W_B+W_C+W_A)$ and $Hz(hW_B+W_C+W_A)$ refers to the haze value of each composition; each W in the parentheses refers to the weight of the reactive inorganic fine particles B, binder component C or optically-transparent fine particles A in each composition; and h is a constant of 1 or more.

The anti-glare film of the present invention can increase the abrasion resistance of the whole film by having an anti-glare layer comprising the cured product of the curable resin composition for an anti-glare layer of the present invention on a transparent substrate film.

The content of the optically-transparent fine particles A is preferably 1 part by weight or more and parts by weight or less with respect to the total amount of 100 parts by weight of the reactive inorganic fine particles B and the constituents of the curable binder system in the concavo-convex layer; moreover, the layer thickness of convex portions of the concavo-convex layer is preferably equal to or less than the average particle diameter of the optically-transparent fine particles A+1.5 μm, more preferably equal to or less than the average particle diameter of the optically-transparent fine particles A+1.0 μm, and the layer thickness of concave portions of the concavo-convex layer is preferably smaller than the average particle diameter of the optically-transparent fine particles A.

When the layer thickness satisfies the above conditions, it is possible to obtain the minimum layer thickness that is effective for an increase in image contrast in a bright environment. Also, because of making the thickness of the anti-glare layer thinner and the resulting decrease in the content of the optically-transparent fine particles, it is allowed for the anti-glare film of the present invention to prevent a decrease in image contrast in a dark environment with keeping external scattering property (external haze).

Because of making the thickness of the anti-glare layer thinner and the resulting decrease in the content of the optically-transparent fine particles, there is a decrease in the internal haze of the anti-glare film. Because of this decrease in the internal haze, it is allowed for the anti-glare film of the present invention to suppress a decrease in the front contrast of a display panel provided with the anti-glare film.

Among two kinds of anti-glare films wherein the total of the external and internal hazes of the first anti-glare film is the same as that of the second anti-glare film and their external hazes are different from each other as with their internal hazes, the anti-glare film with a smaller internal haze is more and very effective in suppressing a decrease in the front contrast than the anti-glare film with a larger internal haze, even if the total of the external and internal hazes of the first anti-glare film is the same as that of the second anti-glare film. The front contrast increasing effect attributed to the decrease in internal haze is more and very effective when the anti-glare film is used in a display panel with a narrow viewing angle, than in a display panel with a wide viewing angle, the reason of which is not clear.

The viewing angle can be obtained by measuring a liquid crystal panel to which the anti-glare film of the present invention is attached, which film having a pressure-sensitive adhesive applied on the transparent substrate film-side surface thereof, by means of EZ Contrast manufactured by ELDIM.

Figure 4:
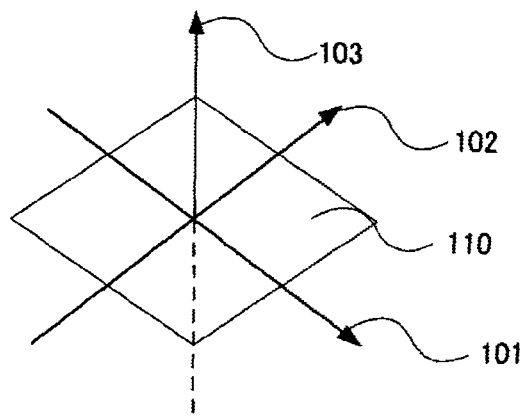
FIG. 4 is a perspective view schematically showing a display panel to which the anti-glare film is attached.
Figure 5:
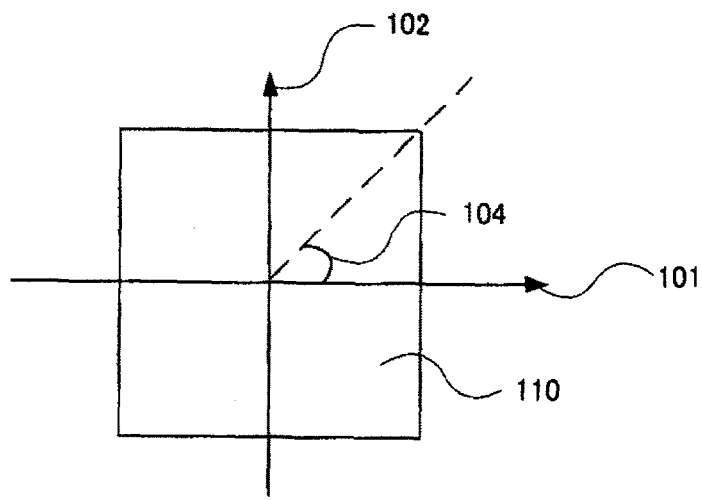
FIG. 5 is a front view schematically showing a display panel to which the anti-glare film is attached.

Hereinafter, the measurement of the viewing angle will be described with reference to figures As shown in FIG. 4, a display panel to which the anti-glare film is attached is arranged within X-Y plane, and the normal line of the display panel is defined as Z axis. Next, as shown in FIG. 5, an azimuthal angle is set in clockwise direction from X axis in the X-Y plane, and the direction of azimuthal angle 45° is determined.

Figure 6:
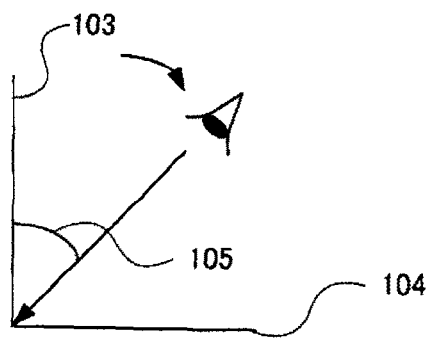
FIG. 6 is a schematic view schematically showing a polar angle in viewing angles.

Then, as shown in FIG. 6, at azimuthal angle 45°, a viewpoint is moved from the Z axis to X-Y plane until the contrast decreases to 150. In this case, the angle formed by the Z axis and viewpoint with respect to the display panel is a polar angle.

The larger the polar angle, the wider the view angle. That is, a film that can ensure a wide range of contrast when the display panel is seen from the front to side of the panel can provide a wide view angle. On the contrary, if the polar angle is small, the contrast decreases to a certain value (150) immediately after moving the viewpoint from the front, thereby the view angle is considered to be small.

Hereinafter, the layer structure of the anti-glare film of the present invention will be described.

Figure 7:
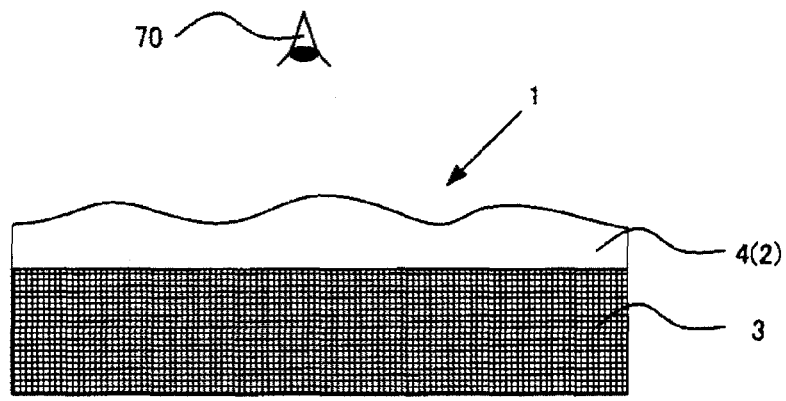
FIG. 7 is a sectional view schematically showing an example of the anti-glare film of the present invention.

FIG. 7 shows a sectional view of an embodiment of a basic layer structure of the anti-glare film according to the present invention. An anti-glare layer 2 is disposed on any one of the surfaces of a transparent substrate film 3, and the anti-glare layer 2 is always disposed on the observer 70-side surface of the anti-glare film.

The term "observer 70-side" or "observer 70 side" as used in the present invention refers to the surface that is directed to the observer 70 when the anti-glare film of the present invention is provided on an image display device. Also, the term "display device-side" or "display device side" as used in the present invention refers to the surface that is directed to an image display device when the anti-glare film of the present invention is provided on an image display device. In addition, the transparent substrate film 3 is not limited to one single layer and may comprise two or more layers.

The anti-glare layer 2 comprises at least a concavo-convex layer 4. In the present invention, the concavo-convex layer 4 is a layer which imparts a concavo-convex shape on the outermost surface of the anti-glare layer.

Figure 8:
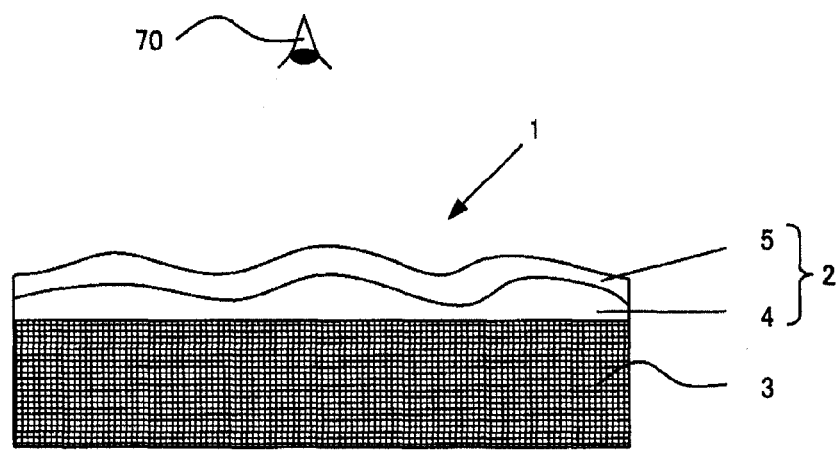
FIG. 8 is a sectional view schematically showing an example of the anti-glare film of the present invention.

The anti-glare film of the present invention can impart various functions required for image display devices. Consequently, it may have a laminated structure as shown in FIG. 8, in which the anti-glare layer 2 comprises two or more layers and has a surface shape modifying layer 5 on the observer 70-side surface of the concavo-convex layer 4. Even when the concavo-convex layer 4 has, for example, a concavo-convex shape with increased fineness or concavo-convex shape with concavoconvexes having an excessively large height difference for exhibiting appropriate anti-glare performance, the observer 70-side surface of the anti-glare layer 2 can be imparted with a smooth, gentle and desired concavo-convex shape and various functions by forming the surface shape modifying layer 5 on the concavo-convex layer 4.

The surface shape modifying layer 5 may further comprise an anti-static agent, refractive index modifier, anti-fouling agent, water repellent, oil repellent, anti-adhesive agent for fingerprint, curability enhancing agent and hardness modifier.

Figure 9:
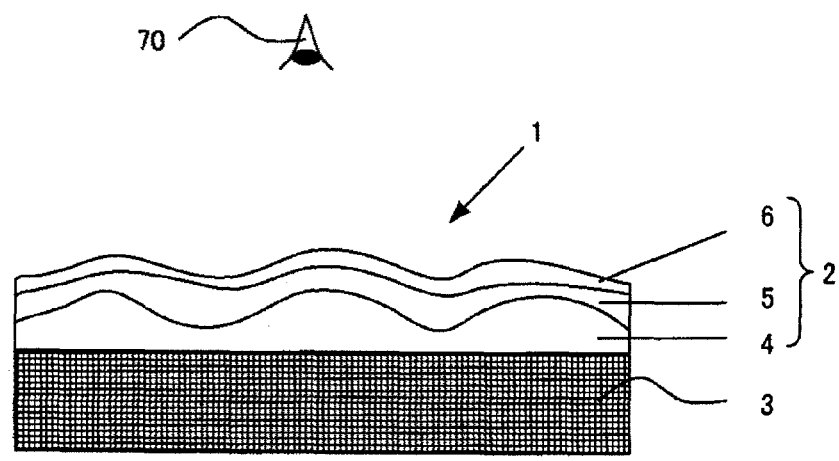
FIG. 9 is a sectional view schematically showing an example of the anti-glare film of the present invention.

The surface shape modifying layer 5 may also serve as a low refractive index layer to impart anti-reflection performance to the anti-glare layer. As shown in FIG. 9, the anti-glare layer 2 may comprise two or more layers and may further have a low refractive index layer 6 on the observer 70-side surface thereof, in addition to the surface shape modifying layer 5. This low refractive index layer 6 has a shape corresponding to the concavo-convex shape on the surface of the concavo-convex layer 4 or surface shape modifying layer 5, any of which layers serving as the substrate of the low refractive index layer 6, and the concavo-convex shape on the low refractive index layer surface becomes equivalent to that on the surface of a layer serving as the substrate of the low refractive index layer 6. In addition to the low refractive index layer 6, an optional layer may be further present on the observer 70-side surface of the anti-glare layer. The low refractive index layer 6 has a lower refractive index than those of the display device-side layers having the low refractive index layer 6 stacked thereon.

Hereinafter, the layers comprising the anti-glare film of the present invention will be described in order.

<2-1. Transparent Substrate Film>

No particular limitation is imposed on the materials of the transparent substrate film. General materials used in the anti-glare film can be used. For example, materials which mainly comprise cellulose acylate, cycloolefin polymer, acrylate-based polymer or polyester are preferable. The "mainly comprise" here means a component that has the highest content rate among the constituents of the substrate.

Specific examples of cellulose acylate include cellulose triacetate, cellulose diacetate and cellulose acetate butyrate. Examples of cycloolefin polymers include norbornene polymers, monocyclic olefin polymers, cyclic conjugated diene polymers and vinyl alicyclic hydrocarbon polymer resins. More specifically, there may be ZEONEX and ZEONOR (norbornene resin) manufactured by ZEON CORPORATION, SUMILITE FS 1700 manufactured by SUMITOMO BAKELITE CO., LTD., ARTON (modified norbornene resin) manufactured by JSR Corporation, APEL (cycloolefin copolymer) manufactured by MITSUI CHEMICALS, INC., Topas (cycloolefin copolymer) manufactured by Ticona, OZ 1000 Series of OPTOREZ (alicyclic acrylic resin) manufactured by Hitachi Chemical Company, Ltd., and so on. Specific examples of acrylate-based polymers include poly(methyl (meth)acrylate), poly(ethyl (meth)acrylate) and a methyl (meth)acrylate-butyl(meth)acrylate copolymer. Specific examples of polyester include polyethylene terephthalate and polyethylene naphthalate.

In the present invention, when the transparent substrate film is used in the form of a highly flexible thin film, the thickness is 20 µm or more and 300 µm or less, preferably 30 µm or more and 200 µm or less. When forming an anti-glare layer on the transparent substrate film, application of a coating material referred to as an anchoring agent or primer may be performed on the transparent substrate film to increase the adhesion of the transparent substrate film, besides a physical treatment such as a corona discharge treatment and an oxidation treatment.

<2-2. Anti-Glare Layer>

The anti-glare layer is a layer that is essential to the anti-glare film of the present invention and can be obtained by curing the above curable resin composition for an anti-glare layer or by curing the above curable resin composition for an anti-glare layer and the above curable resin composition for a surface shape modifying layer. The anti-glare layer is disposed on the observer-side surface of the transparent substrate film. The term "observer-side" as used herein refers to the surface that is directed to an observer when the anti-glare film of the present invention is disposed on a display (image display device). The anti-glare layer comprises one or more layers, and it has at least a concavo-convex layer. The outermost surface of the anti-glare layer has the concavo-convex shape.

In the present invention, a preliminarily prepared concavo-convex layer may be stacked on the surface of the above transparent substrate or the like. In this case, a concavo-convex layer prepared separately is usable.

The concavo-convex layer of the present invention is formed containing the optically-transparent fine particles A for imparting anti-glare properties, the reactive inorganic fine particles B for imparting abrasion resistance, and components that will form the matrix of the concavo-convex layer after curing the curable binder system, which components including essentially the binder component C for imparting adhesion to the substrate or an adjacent layer. Furthermore, if necessary, the concavo-convex layer is formed containing, for example, an additive such as an anti-static agent and a leveling agent, and an inorganic filler for regulating a refractive index, preventing shrinking by cross-links, and imparting high indentation strength.

<2-2-2. Preparation of Concavo-Convex Layer>

As an embodiment of the anti-glare film of the present invention, there may be mentioned an anti-glare film formed by the following method: as a coating liquid, a curable resin composition is prepared by using a photocurable binder system as the curable binder system and mixing optically-transparent fine particles A and reactive inorganic fine particles B with the photocurable binder system; the resulting coating liquid is applied onto the observer-side surface of the transparent substrate film, thereby forming a concavo-convex layer.

In this case, the optically-transparent fine particles A preferably comprise first fine particles and second fine particles, or first fine particles, second fine particles and third fine particles.

Methods usable for applying the coating liquid onto the transparent substrate film include, for example, coating methods such as roll coating, Mayer bar coating and gravure coating. After applying the coating liquid, the applied coating liquid is dried and cured by ultraviolet radiation. By quickly drying the curable resin composition for an anti-glare layer only for a few seconds after coating, the average particle number of the reactive inorganic fine particles B per unit area of the cross-section in thickness direction becomes small in the air interface on the side opposite to the transparent substrate film side of the concavo-convex layer and in the vicinity of the air interface (skin layer). Alternatively, a similar effect (skin layer) can be obtained by regulating the solid content concentration of the coating liquid to increase the liquid viscosity. Specific examples of ultraviolet sources include light sources such as ultra-high-pressure mercury lamps, high-pressure mercury lamps, low-pressure mercury lamps, carbon arc lamps, black light fluorescent lamps and metal halide lamps. Regarding the wavelength of the ultraviolet light, a wavelength range from 190 to 380 nm may be used. Specific examples of electron beam sources include various electron beam accelerators such as Cockcroft-Walton accelerators, Van de Graaff accelerators, resonance transformer accelerators, insulated core transformer accelerators, linear accelerators, Dynamitron accelerators and high-frequency accelerators.

By curing the constituents of the photocurable binder system, the reactive functional groups b of the reactive inorganic fine particles B and the reactive functional groups c of the binder component C, which are contained in the constituents of the photocurable binder system, are cross-linked to form a network structure. Also, the optically-transparent fine particles A in the constituents of the photocurable binder system are fixed to form a desired concavo-convex shape on the outermost surface of the concavo-convex layer.

In the case of forming a concavo-convex layer by applying a composition for a concavo-convex layer, from the viewpoint of excellent abrasion resistance and good adhesion between the concavo-convex layer and the surface shape modifying layer, it is preferable to cure the composition for a concavo-convex layer so as to obtain a gel fraction from 30% or more and 80% or less. The lower limit of the gel fraction is preferably 35% or more, more preferably 40% or more. The upper limit of the gel fraction is preferably 70% or less, more preferably 60% or less.

When the composition is, for example, an ultraviolet curable resin, the gel fraction can be obtained by the following method. At first, an ink comprising, among the components of the composition for a concavo-convex layer, components other than the optically-transparent fine particles A and the reactive inorganic fine particles B, such as a monomer, an oligomer, a polymer and an additive, is prepared as a sample. The ink is applied on 50 µm-thick PET substrates to a thickness of 5 µm. UV light is applied to the coated substrates in different irradiation conditions in which UV irradiation is changed in the range from 10 to 100 mJ at 10 mJ intervals, thereby forming samples. Each sample is cut into 10-cm squares. Three 10-cm squares are taken therefrom and measured for the total of their weight, which is referred to as weight M1. Then, sets of the three square samples are immersed in a solvent that is considered to dissolve a monomer (such as acetone, methyl ethyl ketone, methyl acetate, toluene and a mixture thereof; in the case of acrylate-based compositions, typical examples thereof include acetone and methyl ethyl ketone) for 12 hours or more. Then, the sets are taken out from the solvent and dried in an oven sufficiently (at 60° C. for two minutes). Each set is measured for the total weight of the dried square samples, which is referred to as weight M2. Next, a difference between the weight "M1", which is the total weight of the three squares before immersion, and the weight "M2", which is the total weight of the three dried square samples, is obtained and referred to as weight "ΔM". Finally, the gel fraction (%) at each irradiance level is calculated by the following formula:

Gel fraction (%)=100−Δ$M/M$1

In the anti-glare film of the present invention, the thickness of the concavo-convex layer is preferably from 0.5 μm or more and 13 μm or less, more preferably from 0.5 μm or more and 7 μm or less, so that the anti-glare film can be imparted with excellent physical properties such as hardness and scratch resistance, and the productivity of the anti-glare film can be also excellent. If the thickness is 0.5 μm or more, sufficient abrasion resistance can be imparted to the anti-glare film. If the thickness is 13 μm or less, it is possible to prevent the anti-glare film from cracking.

<2-3. Other Layers>

As described above, the anti-glare film of the present invention basically comprises a transparent substrate and anti-glare layer. However, considering the functions and applications of the anti-glare film, one or more layers that will be described below may be included in the anti-glare film of the present invention in addition to the concavo-convex layer of the present invention. Moreover, the anti-glare film may include a medium refractive index layer or high refractive index layer.

<2-3-1. Surface Shape Modifying Layer>

In the present invention, a surface shape modifying layer may be formed on the concavo-convex layer to regulate the concavo-convex shape on the surface of the concavo-convex layer. The surface shape modifying layer fills and seals fine concavoconvexes that are present along the concavo-convex shape of the concavo-convex layer on the scale of one-tenth or less of the concavo-convex scale (the profile peak height of the concavoconvexes and the distance between profile peaks of the concavoconvexes) in the surface roughness of the concavo-convex layer, thereby smoothing the surface of the concavoconvexes or regulating the distance between the profile peaks of the concavoconvexes, the height of the profile peaks, or the frequency (number) of the profile peaks. Furthermore, the surface shape modifying layer may be imparted with various functions such as a function of static charge prevention, refractive index regulation, increasing hardness and fouling prevention.

The thickness of the surface shape modifying layer (when dried) is preferably from 0.6 μm or more and 15 μm or less, more preferably from 3 μm or more and 8 μm or less. The thickness of the surface shape modifying layer is a value measured by the same method as that for measuring the thickness of the anti-glare layer by laser microscopy, SEM microscopy or TEM microscopy, which will be described below.

<2-3-1-1. Curable Resin Composition for a Surface Shape Modifying Layer>

The surface shape modifying layer may be formed by curing a curable resin composition for a surface shape modifying layer which appropriately contains, in addition to a binder component and if necessary, organic fine particles and inorganic fine particles such as silica.

The binder component (including a resin component such as a monomer and an oligomer) is preferably transparent. Specific examples thereof are classified into three kinds of resins: an ionizing radiation-curable resin which is curable upon exposure to ultraviolet light or electron beams, a mixture of an ionizing radiation-curable resin with a solvent drying-type resin, and a heat curable resin. Preferred as the binder component is an ionizing radiation-curable resin.

Specific examples of the ionizing radiation-curable resin include those described above in connection with the concavo-convex layer. A photopolymerization initiator, photopolymerization accelerator, photosensitizer, solvent-drying type resin and so on, which may be mixed with the ionizing radiation-curable resin if necessary, may be those as described above in connection with the concavo-convex layer.

The surface shape modifying layer may comprise organic or silica fine particles which regulate fluidity. Preferred is colloidal silica. Conventionally, an attempt to form a surface shape modifying layer for sealing fine concavoconvexes for smoothing leads to excess smoothing, resulting in a significant deterioration in the anti-glare properties of the anti-glare film. However, by forming a coating film with a composition containing the colloidal silica, it is possible to achieve both of anti-glare properties and black color reproduction in combination. Although it is not clear how such an effect is obtained, the reason of the effect is presumed as follows: excellent followability to the concavo-convex shape on a surface is imparted to a composition containing colloidal silica by regulating the fluidity of the composition; therefore, upon smoothing, the composition can impart moderate smoothness to fine concavoconvexes formed on a substrate of concavo-convex layer, which are completely sealed in the case of using the conventional surface shape modifying layer, leaving the concavoconvexes without completely sealing them.

In the present invention, the term "colloidal silica" refers to a colloidal solution comprising colloidal silica particles dispersed in water or an organic solvent. The colloidal silica is preferably fine particles having a particle size (diameter) from about 1 to 50 nm. The particle size of the colloidal silica in the present invention is preferably the average particle size measured by the BET method (average particle size calculated by measuring the surface area of particles by the BET method and converting the same assuming that the particles are all perfect spherical).

<2-3-1-2. Preparation Method of Surface Shape Modifying Layer>

Methods usable for applying the composition for a surface shape modifying layer include, for example, coating methods such as roll coating, Mayor bar coating and gravure coating. After applying the composition for a surface shape modifying layer, the applied composition is dried and cured by ultraviolet radiation. Specific examples of ultraviolet sources include light sources such as ultra-high-pressure mercury lamps, high-pressure mercury lamps, low-pressure mercury lamps, carbon arc lamps, black light fluorescent lamps and metal halide lamps. Regarding the wavelength of the ultraviolet light, a wavelength range from 190 to 380 nm may be used. Specific examples of electron beam sources include various electron beam accelerators such as Cockcroft-Walton accelerators, Van de Graaff accelerators, resonance transformer accelerators, insulated core transformer accelerators, linear accelerators, Dynamitron accelerators and high-frequency accelerators.

<2-3-2. Low Refractive Index Layer>

The low refractive index layer is a layer which serves, when external light (such as fluorescent light and natural light) is reflected on the surface of the anti-glare film, to decrease the reflectivity of the external light by the light interference effect which occurs in a multilayer film. In a preferred embodiment of the present invention, a low refractive index layer is formed on the anti-glare layer comprising one single layer (that is, on the observer-side surface of the concavo-convex layer) or on the anti-glare layer comprising two or more layers (that is, on the observer-side surface of the surface shape modifying layer). The low refractive index layer has a lower refractive index than that of a layer that is adjacent to the transparent substrate film-side surface of the low refractive index layer.

In accordance with a preferred embodiment of the present invention, it is preferable to have a constitution in which the refractive index of the concavo-convex layer or surface shape modifying layer adjacent to the low refractive index layer is 1.5 or more while the refractive index of the low refractive index layer is 1.45 or less, more preferably 1.42 or less.

Preferably, the low refractive index layer may be composed of any of the following: 1) a resin containing silica or magnesium fluoride, 2) a fluorine resin which is a resin having a low refractive index, 3) a fluorine resin containing silica or magnesium fluoride, and 4) a thin film of silica or magnesium fluoride. Resins that are other than fluorine resins and usable herein may be the same as those used to form the concavo-convex layer.

As the fluorine resin, there may be used a polymerizable compound having a fluorine atom at least in a molecule thereof or a polymer of the compound. The polymerizable compound is not particularly limited; however, preferred is a polymerizable compound having a curable and reactive group such as a functional group curable with ionizing radiation and a thermosetting polar group. Furthermore, a compound having these reactive groups in combination may be used. In contrast to this polymerizable compound, the polymer is one having no reactive groups as described above.

As the polymerizable compound having an ionizing radiation curable group, fluorine-containing monomers having an ethylenically unsaturated bond may be widely employed. More specifically, fluoroolefins (for example, fluoroethylene, vinylidene fluoride, tetrafluoroethylene, hexafluoropropylene, perfluorobutadiene, perfluoro-2,2-dimethyl-1,3-dioxole, etc.) can be exemplified. Examples of polymerizable compounds having a (meth)acryloyloxy group include (meth)acrylate compounds having a fluorine atom in a molecule thereof, such as 2,2,2-trifluoroethyl (meth)acrylate, 2,2,3,3,3-pentafluoropropyl (meth)acrylate, 2-(perfluorobutyl) ethyl(meth)acrylate, 2-(perfluorohexyl)ethyl(meth)acrylate, 2-(perfluorooctyl)ethyl(meth)acrylate, 2-(perfluorodecyl) ethyl(meth)acrylate, α-trifluoro methyl methacrylate and α-trifluoro ethyl methacrylate; and fluorine-containing polyfunctional (meth)acrylate compounds which have, in a molecule thereof, a C1-C14 fluoroalkyl, fluorocycloalkyl or fluoroalkylene group having at least three fluorine atoms, and at least two (meth)acryloyloxy groups.

As the thermosetting polar group, for example, hydrogen bond-forming groups such as a hydroxyl group, a carboxyl group, an amino group and an epoxy group, are preferred. These groups are superior in not only adhesion to a coating film but also in affinity for inorganic ultrafine particles such as silica. Examples of the polymerizable compound having a thermosetting polar group include a 4-fluoroethylene-perfluoroalkyl vinyl ether copolymer; a fluoroethylene-hydrocarbon vinyl ether copolymer; fluorine-modified products of various resins such as epoxy, polyurethane, cellulose, phenol and polyimide.

Examples of the polymerizable compound having an ionizing radiation curable group and a thermosetting polar group together include partly or fully fluorinated alkyl, alkenyl or aryl esters of acrylic acid or methacrylic acid, fully or partly fluorinated vinyl ethers, fully or partly fluorinated vinyl esters, and fully or partly fluorinated vinyl ketones.

The polymerizable compound or polymer having a fluorine atom may be used as a mixture with any of the resin components as described in connection with the curable resin composition for an anti-glare layer. Furthermore, a curing agent for curing reactive groups or the like, and/or various additives or solvents for improving coatability or imparting anti-fouling properties may be appropriately used.

<2-3-3. Anti-Fouling Layer>

In a preferred embodiment of the present invention, an anti-fouling layer may be provided to prevent the outermost surface of the low refractive index layer from contamination. Preferably, the anti-fouling layer is provided on one surface of the substrate film, which is opposite to the other surface on which the low refractive index layer is formed. The anti-fouling layer can further improve the anti-fouling properties and abrasion resistance of the anti-glare film.

Specific examples of anti-fouling agents include fluoro and/or silicon compounds which have low compatibility with the photocurable resin composition having a fluorine atom in a molecule thereof and are considered difficult to be added to the low refractive index layer, and fluoro and/or silicon compounds which are compatible with fine particles and the photocurable resin composition having a fluorine atom in a molecule thereof.

<2-4. Additives>

Each of the above layers may further have a different function and may be formed with, for example, a composition containing a function additional component such as an anti-static agent, a refractive index modifier, an anti-fouling agent and a hardness modifier. Among the above layers, the function additional component is preferably incorporated in the surface shape modifying layer.

<2-4-1. Anti-Static Agent (Electroconductive Agent)>

Dust adhesion to the surface of the optical laminate can be effectively prevented by incorporating an anti-static agent especially, among the above layers, in the surface shape modifying layer. Specific examples of the anti-static agent include various kinds of cationic compounds having a cationic group, such as a quaternary ammonium salt, a pyridinium salt and a primary, secondary or tertiary amino group; anionic compounds having an anionic group such as a sulfonic acid base, a sulfuric ester base, a phosphoric ester base and a phosphonic acid base; amphoteric compounds such as an amino acid-based amphoteric compound and an aminosulfuric ester-based amphoteric compound; nonionic compounds such as an amino alcohol-based nonionic compound, a glycerin-based nonionic compound and a polyethylene glycol-based nonionic compound; organometallic compounds such as alkoxides of tin and titanium; and metal chelate compounds such as acetylacetonate salts of the organometallic compounds. Furthermore, compounds produced by increasing the molecular weight of the above compounds may also be mentioned. In addition, as the anti-static agent, there may be used monomers or oligomers which contain a tertiary amino group, quaternary ammonium group or metallic chelate moiety and are polymerizable upon exposure to ionizing radiation, or polymerizable compounds including organometallic compounds such as a coupling agent having a functional group.

Also, electroconductive ultrafine particles are included in the examples of the anti-static agent. Specific examples of the electroconductive ultrafine particles include ultrafine particles of metal oxides. Such metal oxides include, for example, ZnO (refractive index 1.90; hereinafter, each of the numerical values within the parentheses refers to the refractive index), $CeO_2$ (1.95), $Sb_2O_2$ (1.71), $SnO_2$ (1.997), indium tin oxide (often abbreviated to ITO, 1.95), $In_2O_3$ (2.00), $Al_2O_3$ (1.63), antimony-doped tin oxide (abbreviated to ATO, 2.0) and aluminum-doped zinc oxide (abbreviated to AZO, 2.0) and so on. The average particle diameter of the electroconductive ultrafine particles is preferably from 0.1 nm to 0.1

μm. By setting the average particle diameter in this range, when dispersed in the binder, the electroconductive ultrafine particles A give a composition which is able to form a highly transparent film that causes almost no haze and has excellent total light transmittance.

<2-4-2. Refractive Index Modifier>

It is possible to control the anti-reflection properties of the anti-glare layer surface by adding a refractive index modifier to the anti-glare layer. Examples of the refractive index modifier include a low refractive index agent, medium refractive index agent and high refractive index agent.

<2-4-2-1. Low Refractive Index Agent>

The low refractive index agent has a lower refractive index than that of the anti-glare layer. In a preferred embodiment of the present invention, the anti-glare layer has a refractive index of 1.5 or more, and the low refractive index agent has a refractive index of less than 1.5, preferably 1.45 or less.

Specifically, low refractive index agents as described above in connection with the low refractive index layer may be preferably used. The surface shape modifying layer mixed with a low refractive index agent preferably has a thickness of more than 1 μm since this layer is the outermost layer and requires scratch resistance and hardness.

<2-4-2-2. High Refractive Index Agent/Medium Refractive Index Agent>

To increase the anti-reflection properties of the anti-glare layer further, a high refractive index agent or medium-refractive index agent may be added to the surface shape modifying layer. The refractive index of the high refractive index agent and medium refractive index agent may be set in the range from 1.46 to 2.00. The medium refractive index agent refers to one having a refractive index in the range from 1.46 to 1.80. The high refractive index agent refers to one having a refractive index in the range from 1.65 to 2.00.

As such high and medium refractive index agents, there may be mentioned fine particles. Specific examples thereof include zinc oxide (1.90), titania (2.3 to 2.7), ceria (1.95), tin-doped indium oxide (1.95), antimony-doped tin oxide (1.80), yttria (1.87) and zirconia (2.0).

<2-4-3. Leveling Agent>

A leveling agent may be added to the anti-glare layer. Preferred leveling agents include fluorine- or silicone-type leveling agents. The leveling agent allows the resin composition for an anti-glare layer to impart increased coatability, slidability, anti-fouling properties and abrasion resistance to a coating film formed by applying the composition or formed by applying and drying the resin composition.

<2-4-4. Hardness Modifier (Curability Enhancing Agent)>

A hardness modifier (curability enhancing agent) may be added to the anti-glare layer to impart abrasion resistance. Specific examples of such a hardness modifier include ionizing radiation-curable resins mixed with any one of the following polyfunctional (meth)acrylate prepolymers or tri- or more functional (meth)acrylate monomers solely, and ionizing radiation-curable resins mixed with two or more of the following polyfunctional (meth)acrylate prepolymers and tri- or more functional (meth)acrylate monomers in combination: polyfunctional (meth)acrylate prepolymers such as polyester (meth)acrylate, urethane (meth)acrylate and epoxy (meth)acrylate; and tri- or more functional (meth)acrylate monomers such as trimethylolpropane tri(meth)acrylate, pentaerythritol tetra(meth)acrylate and dipentaerythritol hexa(meth)acrylate.

The present invention is not limited by the aforementioned embodiments. The embodiments are examples, and any that has the substantially same essential features as the technical ideas described in claims of the present invention and exerts the same effects and advantages is included in the technical scope of the present invention.

EXAMPLES

Hereinafter, the present invention will be explained in detail by way of examples. The scope of the present invention is not restricted by these examples. In the Examples, all designations of "part" or "parts" are expressed on weight basis, unless otherwise specifically noted. The average film thickness refers to the average of film thicknesses measured at five points on the cross section of an anti-glare film shown in a TEM photograph.

Preparation Example 1-1

Preparation of Reactive Inorganic Fine Particles B (1-1)

(1) Removal of Surface Adsorbed Ions

Ion exchange was performed on an aqueous dispersion of colloidal silica of particle diameter of 90 nm (product name: SNOWTEX ZL; manufactured by Nissan Chemical Industries, Ltd.; pH 9 to 10) for 3 hours using 400 g of a cation-exchange resin (product name: DIAION SK1B; manufactured by: Mitsubishi Chemical Corporation). Next, ion exchange was performed thereon for 3 hours using 200 g of an anion-exchange resin (product name: DIAION SA20A; manufactured by: Mitsubishi Chemical Corporation) followed by washing, thereby obtaining an aqueous dispersion of silica fine particles having a solid content concentration of 20 wt %.

At this time, the $Na_2O$ content in the aqueous dispersion of silica fine particles was 7 ppm per the silica fine particles.

(2) Surface Treatment (Introduction of Monofunctional Monomer)

To 10 g of the aqueous dispersion of silica fine particles obtained by the above process (1), 150 mL of isopropanol, 4.0 g of 3,6,9-trioxa decanoate and 4.0 g of methacrylic acid were added and agitated for 30 minutes to mix well.

The resultant mixture was agitated while heating at 60° C. for 5 hours to obtain a silica fine particle dispersion liquid in which methacryloyl groups were introduced onto the surface of the silica fine particles. Distilled water and isopropanol contained in the obtained silica fine particle dispersion liquid were removed by means of a rotary evaporator until the amount of remaining water and isopropanol reached 0.1 wt %, carefully adding methyl ethyl ketone so as not to dry the dispersion liquid, thereby obtaining a methyl ethyl ketone liquid in which silica having a solid content of 50 wt % was dispersed.

The thus-obtained reactive inorganic fine particles B (1-1) were measured by means of a particle size analyzer (product name: Nanotrac; manufactured by Nikkiso Co., Ltd.) and found to have an average particle diameter of $d_{50}$=92 nm. As a result of measurement by the thermogravimetric method, the amount of the organic component covering the surface of the silica fine particle was $4.05 \times 10^{-3}$ $g/m^2$.

Preparation Example 1-2

Preparation of Reactive Inorganic Fine Particles B (1-2)

(1) Removal of Surface Adsorbed Ions

An aqueous dispersion liquid of silica fine particles was obtained similarly as in Preparation Example 1-1, from which particles surface adsorbed ions were removed.

(2) Surface Treatment (Introduction of Polyfunctional Monomer)

A surface treatment was performed similarly as in Preparation Example 1-1, except that methacrylic acid was changed to dipentaerythritol pentaacrylate (product name: SR399; manufactured by: Sartomer Company, Inc.)

The thus-obtained reactive inorganic fine particles B (1-2) were measured by means of the aforementioned particle size analyzer and found to have an average particle diameter of $d_{50}$=93 nm. As a result of measurement by the thermogravimetric method, the amount of the organic component covering the surface of the silica fine particles was $3.84 \times 10^{-3}$ g/m².

Preparation Example 2

Preparation of Reactive Inorganic Fine Particles B (2)

At first, 40 g of oily dispersion of ferrite magnetic material (product name: Ferricolloid; manufactured by: Taiho Industries Co., Ltd.; particle diameter: 40 nm), 94 g of styrene, 1 g of vinylbenzene, g of glycidyl methacrylate and 3 g of azobisisobutyronitrile were mixed together and then dispersed for 10 minutes while cooling, thereby obtaining a hydrophobic vinyl monomer in which inorganic fine particles were dispersed. A porous membrane was hydrophilized by immersing the membrane in 2N sulfuric acid at 70° C. for 2 hours and thoroughly washing the same with water. The membrane is a porous tube (product name: SPG; manufactured by Ise Chemicals Corporation; pore size: 0.3 µm) made to be porous in such a manner that a glass of the system $SiO_2$—$Al_2O_3$—$B_2O_3$—CaO is subjected to a heat treatment to be microphase-separated, and the phase that is rich in boric acid is removed by dissolving the phase with acid. Next, 10 g of sodium lauryl sulfate and 25.3 g of 1-hexadecanol were added to 2 L of water to prepare an aqueous solution. The solution was subjected to ultrasonic irradiation for 10 minutes to break down the gel structure thereof. The porous membrane was immersed in the resultant aqueous solution and, under ultrasonic irradiation, subjected to decompression and deaeration to remove air bubbles inside the porous glass. Then, the aqueous solution was run inside the porous glass tube at a flow rate of 200 mL/min, while a hydrophobic vinyl monomer having inorganic fine particles dispersed therein was run outside the porous glass tube at a pressure of 1.3 kg/cm². Because of the presence of micro droplets of an emulsified hydrophobic vinyl monomer phase, the color of the aqueous phase that was flow out from the inside of the porous glass tube was white. The thus-obtained aqueous dispersion of droplets of the hydrophobic vinyl monomer having inorganic fine particles dispersed therein, of 1 L was agitated at 70° C. for 8 hours for polymerization reaction, thereby obtaining magnetic material-containing polymer particles (reactive inorganic fine particles B (2)). As a result of measurement with the aforementioned particle size analyzer, the reactive inorganic fine particles B (2) thus obtained was found to have an average particle diameter of $d_{50}$=63 nm. As a result of measurement by the thermogravimetric method, the amount of the organic component covering the surface of the particles was $5.35 \times 10^{-3}$ g/m².

Preparation Example 3

Preparation of Reactive Inorganic Fine Particles B (3)

In dried air, 20.6 parts of isophorone diisocyanate was dropped into a solution at 50° C. for 1 hour while stirring, which solution containing 7.8 parts of mercaptopropyl trimethoxy silane and 0.2 part of dibutyltin dilaurate, and then agitated at 60° C. for hours. Therein, 71.4 parts of pentaerythritol triacrylate was dropped at 30° C. for 1 hour and then agitated while heating at 60° C. for 3 hours, thereby obtaining a compound (1).

A mixed solution was agitated at 60° C. for 4 hours under nitrogen flow, which solution comprising 88.5 parts of methanol silica sol (product name; manufactured by: Nissan Chemical Industries, Ltd.; a methanol solvent colloidal silica dispersion liquid having a number average particle diameter of 0.050 µm and a silica concentration of 30%) (solid content: 26.6 parts), 8.5 parts of the above synthesized compound (1) and 0.01 part of p-methoxyphenol. Next, as a compound (2), 3 parts of methyltrimethoxysilane was added to this mixed solution and agitated at 60° C. for 1 hour. Then, 9 parts of orthoformic acid methyl ester was added thereto and further agitated for 1 hour while heating at the same temperature, thereby obtaining crosslinkable inorganic fine particles. The thus-obtained reactive inorganic fine particles B (3) were measured by means of the aforementioned particle size analyzer and found to have an average particle diameter of $d_{50}$=63 nm. As a result of measurement by the thermogravimetric method, the amount of the organic component covering the surface of the particles was $7.08 \times 10^{-3}$ g/m².

<Reference Experiment 1>

On one side of a transparent substrate film, which is a triacetylcellulose film having a thickness of 80 µm, an "anti-glare layer coating liquid" of the composition described below (the content rate of optically-transparent fine particles A was 3%) was applied to be 3.5 g/m² by Mayor bar coating. After drying the solvent in the coated liquid by evaporation, with the use of a UV irradiation device of 80 W/cm, ultraviolet irradiation was performed on the coated film twice at a rate of 10 m/min while keeping an oxygen concentration of 0.1% or less. Thus, an anti-glare film having an average film thickness of 2.1 µm was obtained.

Herein, the content rate of the optically-transparent fine particles A refers to the rate (percentage) of the content of the optically-transparent fine particles A with respect to the total amount of the reactive inorganic fine particles B and the curable binder system.

"Anti-Glare Layer Coating Liquid"
  Pentaerythritol triacrylate (PETA) (product name: PET-30; manufactured by: NIPPON KAYAKU CO., LTD.): 42.5 parts by weight
  Photo polymerization initiator (product name: Irgacure 184; manufactured by: Chiba Specialty Chemicals, Inc.): 2 parts by weight
  Silicone (leveling agent): 1 part by weight
  Silica (optically-transparent fine particles A) (average particle diameter: 3.5 µm): 1.5 parts by weight
  Toluene: 34 parts by weight In the same manner as the production of the antiglare film described above, "anti-glare layer coating liquids" were prepared to have a content rate of the optically-transparent fine particles A of 0%, 5%, 7%, 10% and 15%, and anti-glare films were obtained using these liquids.

<Reference Experiment 2>

On one side of a transparent substrate film, which is a triacetylcellulose film having a thickness of 80 µm, an "anti-glare layer coating liquid" of the composition described below was applied to be 3.5 g/m² by Mayor bar coating, which composition including the reactive inorganic fine particles B (1-1) produced in the Preparation Example 1-1 (the content rate of the reactive inorganic fine particles B (1-1) was 5%; and the content rate of optically-transparent fine particles A was 3%). After drying the solvent in the coated liquid by evaporation, with the use of a UV irradiation device of 80 W/cm, ultraviolet irradiation was performed on the coated film twice at a rate of 10 m/min while keeping an oxygen concentration of 0.1% or less. Thus, an anti-glare film having an average film thickness of 2.1 μm was obtained.

Herein, the content rate of the reactive inorganic fine particles B refers to the rate (percentage) of the content of the reactive inorganic fine particles B with respect to the total amount of the reactive inorganic fine particles B and the curable binder system.

"Anti-Glare Layer Coating Liquid"
  Pentaerythritol triacrylate (PETA) (product name: PET-30; manufactured by: NIPPON KAYAKU CO., LTD.): 42.5 parts by weight
  Photo polymerization initiator (product name: Irgacure 184; manufactured by: Chiba Specialty Chemicals, Inc.): 2 parts by weight
  Silicone (leveling agent): 1 part by weight
  Reactive inorganic fine particles B (1-1) (average particle diameter: 92 nm): 2.5 parts by weight
  Silica (optically-transparent fine particles A) (average particle diameter: 3.5 μm): 1.5 parts by weight
  Toluene: 34 parts by weight In the same manner as the production of the antiglare film described above, "anti-glare layer coating liquids" were prepared to have a content rate of the optically-transparent fine particles A of 0%, 5%, 7%, 10% and 15%, and anti-glare films were obtained using these liquids.

<Reference Experiment 3>
An anti-glare film was obtained similarly as in Reference Experiment 2, except that the anti-glare layer coating liquid was prepared to have a content rate of the reactive inorganic fine particles B (1-1) obtained in Preparation Example 1-1 of 10%.

<Reference Experiment 4>
An anti-glare film was obtained similarly as in Reference Experiment 2, except that the anti-glare layer coating liquid was prepared to have a content rate of the reactive inorganic fine particles B (1-1) obtained in Preparation Example 1-1 of 15%.

<Reference Experiment 5>
An anti-glare film was obtained similarly as in Reference Experiment 2, except that the anti-glare layer coating liquid was prepared to have a content rate of the reactive inorganic fine particles B (1-1) obtained in Preparation Example 1-1 of 20%.

<Reference Experiment 6>
An anti-glare film was obtained similarly as in Reference Experiment 2, except that the anti-glare layer coating liquid was prepared to have a content rate of the reactive inorganic fine particles B (1-1) obtained in Preparation Example 1-1 of 25%.

<Reference Experiment 7>
An anti-glare film was obtained similarly as in Reference Experiment 2, except that the anti-glare layer coating liquid was prepared to have a content rate of the reactive inorganic fine particles B (1-1) obtained in Preparation Example 1-1 of 30%.

<Evaluation Method>
The haze value of the outer most surface of each sample anti-glare film obtained in each of the above Reference Experiments was measured in accordance with JIS K 7105 (1981) "Testing Methods for Optical Properties of Plastics". The results are shown in Table 1.

Example 1

On one side of a transparent substrate film, which is a triacetylcellulose film having a thickness of 80 μm, an "anti-glare layer coating liquid" of the composition described below was applied to be 3.5 g/m² by Mayor bar coating, which composition including the reactive inorganic fine particles B (1-1) produced in the Preparation Example 1-1 (the content rate of the reactive inorganic fine particles B (1-1) was 5%; and the content rate of optically-transparent fine particles A was 7%). After drying the solvent in the coated liquid by evaporation, with the use of a UV irradiation device of 80 W/cm, ultraviolet irradiation was performed on the coated film twice at a rate of 10 m/min while keeping an oxygen concentration of 0.1% or less. Thus, an anti-glare film having an average film thickness of 2.1 μm was obtained.

"Anti-Glare Layer Coating Liquid"
  Pentaerythritol triacrylate (PETA) (product name: PET-30; manufactured by: NIPPON KAYAKU CO., LTD.): 42.5 parts by weight
  Photo polymerization initiator (product name: Irgacure 184; manufactured by: Chiba Specialty Chemicals, Inc.): 2 parts by weight
  Silicone (leveling agent): 1 part by weight
  Reactive inorganic fine particles B (1-1) (average particle diameter: 92 nm): 2.5 parts by weight
  Silica (optically-transparent fine particles A) (average particle diameter: 3.5 μm): 3.5 parts by weight
  Toluene: 34 parts by weight Example 2

An anti-glare film was obtained similarly as in Example 1, except that in the production of the anti-glare film, the anti-glare layer coating liquid was prepared to have a content rate of the reactive inorganic fine particles B (1-1) obtained in Preparation Example 1-1 of 10%.

Example 3

An anti-glare film was obtained similarly as in Example 1, except that in the production of the anti-glare film, the anti-glare layer coating liquid was prepared to have a content rate of the reactive inorganic fine particles B (1-1) obtained in Preparation Example 1-1 of 15%.

Example 4

An anti-glare film was obtained similarly as in Example 1, except that in the production of the anti-glare film, the anti-glare layer coating liquid was prepared to have a content rate of the reactive inorganic fine particles B (1-1) obtained in Preparation Example 1-1 of 30%.

Example 5

An anti-glare film was obtained similarly as in Example 1, except that in the production of the anti-glare film, the anti-glare layer coating liquid was prepared to have a content rate of the reactive inorganic fine particles B (1-1) obtained in Preparation Example 1-1 of 50%.

Example 6

An anti-glare film was obtained similarly as in Example 3, except that in the production of the anti-glare film, pentaerythritol triacrylate (PETA) and dipentaerythritol hexaacrylate (DPHA) were used as the binder component C.

Example 7

An anti-glare film was obtained similarly as in Example 3, except that in the production of the anti-glare film, pentaerythritol triacrylate (PETA), dipentaerythritol hexaacrylate (DPHA) and urethane (UA) were used as the binder component C.

Example 8

An anti-glare film was obtained similarly as in Example 3, except that in the production of the anti-glare film, the reactive inorganic fine particles B (1-2) obtained in Preparation Example 1-2 were used, and the average layer thickness of the anti-glare layer was changed to 3.5 μm.

Example 9

An anti-glare film was obtained similarly as in Example 3, except that in the production of the anti-glare film, the reactive inorganic fine particles B (2) obtained in Preparation Example 2 were used, and the average layer thickness of the anti-glare layer was changed to 3.5 μm.

Example 10

An anti-glare film was obtained similarly as in Example 3, except that in the production of the anti-glare film, the reactive inorganic fine particles B (3) obtained in Preparation Example 3 were used, and the average layer thickness of the anti-glare layer was changed to 3.5 μm.

Example 11

An anti-glare film was obtained similarly as in Example 3, except that in the production of the anti-glare film, a cycloolefin polymer (COP) film having a thickness of 80 μm was used, as the transparent substrate film.

Example 12

An anti-glare film was obtained similarly as in Example 3, except that in the production of the anti-glare film, a polyethylene terephthalate (PET) film having a thickness of 80 μm was used as the transparent substrate film.

Example 13

An anti-glare film was obtained similarly as in Example 3, except that in the production of the anti-glare film, an acrylic resin film having a thickness of 80 μm was used as the transparent substrate film.

Example 14

An anti-glare film was obtained similarly as in Example 3, except that in the production of the anti-glare film, optically-transparent fine particles A comprising polymethylmethacrylate (PMMA) and styrene as main components and having an average particle diameter of 7.5 μm were used; the anti-glare layer coating liquid was prepared to have a content rate of the optically-transparent fine particles A of 10%; and the average layer thickness of the anti-glare layer was changed to 12 μm.

Example 15

An anti-glare film was obtained similarly as in Example 3, except that in the production of the anti-glare film, optically-transparent fine particles A comprising polymethylmethacrylate (PMMA) as the main component and having an average particle diameter of 5.2 μm were used; as the binder component C, pentaerythritol triacrylate (PETA) and urethane (UA) were used; the anti-glare layer coating liquid was prepared to have a content rate of the optically-transparent fine particles A of 10%; and the average layer thickness of the anti-glare layer was changed to 20 μm.

Example 16

An anti-glare film was obtained similarly as in Example 3, except that in the production of the anti-glare film, optically-transparent fine particles A comprising polymethylmethacrylate (PMMA) and ethylene glycol dimethacrylate (EtGDMA) as main components and having an average particle diameter of 10 μm were used; as the binder component C, pentaerythritol triacrylate (PETA) and urethane (UA) were used; the anti-glare layer coating liquid was prepared to have a content rate of the optically-transparent fine particles A of 12%; and the average layer thickness of the anti-glare layer was changed to 20 μm.

Example 17

An anti-glare film was obtained similarly as in Example 3, except that in the production of the anti-glare film, the reactive inorganic fine particles B (1-2) obtained in Preparation Example 1-2 were used as the reactive inorganic fine particles B, and the average particle diameter was changed to $d_{50}$=60 nm.

Example 18

An anti-glare film was obtained similarly as in Example 3, except that in the production of the anti-glare film, the content rate of the reactive inorganic fine particles B (1-1) was changed to 1%.

Example 19

An anti-glare film was obtained similarly as in Example 3, except that in the production of the anti-glare film, the amount of the organic component covering the surface of the reactive inorganic fine particles B (1-1) was changed to $0.80 \times 10^{-3}$ g/m².

Example 20

An anti-glare film was obtained similarly as in Example 3, except that in the production of the anti-glare film, the optically-transparent fine particles A comprising polymethylmethacrylate (PMMA) as the main component and having an average particle diameter of 5.2 μm were used, and the average layer thickness of the anti-glare layer was changed to 35 μm.

Example 21

An anti-glare film was obtained similarly as in Example 3, except that in the production of the anti-glare film, the average layer thickness of the anti-glare layer was changed to 0.4 μm.

Example 22

An anti-glare film was obtained similarly as in Example 3, except that in the production of the anti-glare film, the reactive inorganic fine particles B (3) obtained in Preparation Example 3 were used, and the average particle diameter of the reactive inorganic fine particles B (3) was changed to 42 μm.

Example 23

An anti-glare film was obtained similarly as in Example 3, except that in the production of the anti-glare film, the reactive inorganic fine particles B (3) obtained in Preparation Example 3 were used, and the average particle diameter of the reactive inorganic fine particles B (3) was changed to 63 μm.

Example 24

An anti-glare film was obtained similarly as in Example 3, except that in the production of the anti-glare film, the reactive inorganic fine particles B (3) obtained in Preparation Example 3 were used, and the average particle diameter of the reactive inorganic fine particles B (3) was changed to 44 μm.

Example 25

An anti-glare film was obtained similarly as in Example 3, except that in the production of the anti-glare film, the reactive inorganic fine particles B (3) obtained in Preparation Example 3 were used, and the average particle diameter of the reactive inorganic fine particles B (3) was changed to 92 μm.

Example 26

An anti-glare film was obtained similarly as in Example 3, except that in the production of the anti-glare film, the reactive inorganic fine particles B (3) which were obtained in Preparation Example 3 and had an average particle diameter of 63 μm were used; the anti-glare layer coating liquid was prepared to have a content rate of the reactive inorganic fine particles B of 10%; silica fine particles having an average particle diameter of 2 μm were used as the optically-transparent fine particles A; the content rate of the optically-transparent fine particles A was changed to 4%; the layer thickness of the concave portions was changed to 0.8 μm; and the layer thickness of the convex portions was changed to 4 μm.

Example 27

An anti-glare film was obtained similarly as in Example 3, except that in the production of the anti-glare film, the reactive inorganic fine particles B (3) which were obtained in Preparation Example 3 and had an average particle diameter of 63 μm were used; the anti-glare layer coating liquid was prepared to have a content rate of the reactive inorganic fine particles B of 10%; silica fine particles having an average particle diameter of 3.5 μm were used as the optically-transparent fine particles A; the content rate of the optically-transparent fine particles A was changed to 4%; the layer thickness of the concave portions was changed to 1.2 μm; and the layer thickness of the convex portions was changed to 4.5 μm.

Example 28

An anti-glare film was obtained similarly as in Example 3, except that in the production of the anti-glare film, the reactive inorganic fine particles B (3) which were obtained in Preparation Example 3 and had an average particle diameter of 63 μm were used; the anti-glare layer coating liquid was prepared to have a content rate of the reactive inorganic fine particles B of 10%; silica fine particles having an average particle diameter of 2 μm were used as the optically-transparent fine particles A; the content rate of the optically-transparent fine particles A was changed to 6.5%; the layer thickness of the concave portions was changed to 0.6 μm; and the layer thickness of the convex portions was changed to 4.5 μm.

Example 29

An anti-glare film was obtained similarly as in Example 3, except that in the production of the anti-glare film, the reactive inorganic fine particles B (3) which were obtained in Preparation Example 3 and had an average particle diameter of 63 μm were used; the anti-glare layer coating liquid was prepared to have a content rate of the reactive inorganic fine particles B of 10%; silica fine particles having an average particle diameter of 3.5 μm were used as the optically-transparent fine particles A; the content rate of the optically-transparent fine particles A was changed to 6.5%; the layer thickness of the concave portions was changed to 1.3 μm; and the layer thickness of the convex portions was changed to 5.5 μm.

Example 30

An anti-glare film was obtained similarly as in Example 2, except that in the production of the anti-glare film, the reactive inorganic fine particles B (3) which were obtained in Preparation Example 3 and had an average particle diameter of 63 μm were used; silica fine particles having an average particle diameter of 2.3 μm were used as the optically-transparent fine particles A; the content rate of the optically-transparent fine particles A was changed to 3.5%; and the layer thickness of the convex portions was changed to 2.5 μm.

Example 31

An anti-glare film was obtained similarly as in Example 30, except that in the production of the anti-glare film, the content rate of the optically-transparent fine particles A was changed to 4.0%.

Example 32

An anti-glare film was obtained similarly as in Example 30, except that in the production of the anti-glare film, the content rate of the optically-transparent fine particles A was changed to 4.5%.

Example 33

An anti-glare film was obtained similarly as in Example 30, except that in the production of the anti-glare film, the layer thickness of the convex portions was changed to 2.3 μm.

Example 34

An anti-glare film was obtained similarly as in Example 30, except that in the production of the anti-glare film, the layer thickness of the convex portions was changed to 2.8 μm.

Example 35

An anti-glare film was obtained similarly as in Example 30, except that in the production of the anti-glare film, the external haze was changed to 9.0%.

Example 36

An anti-glare film was obtained similarly as in Example 31, except that in the production of the anti-glare film, the external haze was changed to 9.0%.

Example 37

An anti-glare film was obtained similarly as in Example 32, except that in the production of the anti-glare film, the external haze was changed to 9.0%.

Example 38

Figure 10:
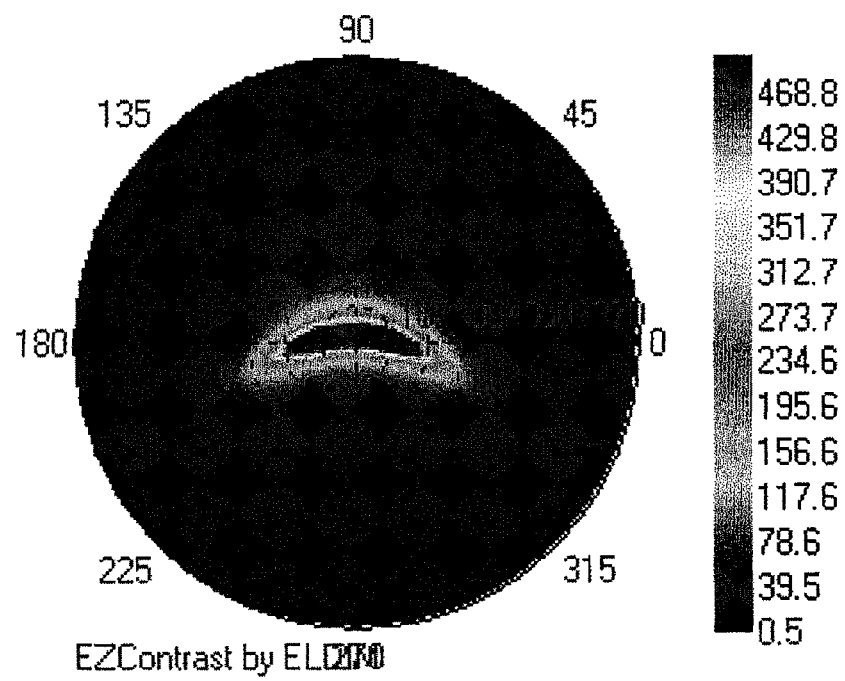
FIG. 10 is a view showing the contrast viewing angles of the liquid crystal panel used in Evaluation (7) and Example 38.

The anti-glare film obtained in Example 30 was attached onto a liquid crystal panel with an adhesive, thereby obtaining a display. This liquid crystal panel had the following front contrast and a contrast viewing angle as shown in FIG. 10:
Liquid crystal mode: TN (Twisted Nematic)
Front contrast: 1, 100:1
Contrast viewing angle: FIG. 10

Example 39

A display was obtained similarly as in Example 38, except that an anti-glare film having an external haze of 9.5% was used.

Example 40

A display was obtained similarly as in Example 38, except that an anti-glare film having an external haze of 7.5% was used.

Example 41

A display was obtained similarly as in Example 38, except that an anti-glare film having an external haze of 5.5% was used.

Example 42

Figure 11:
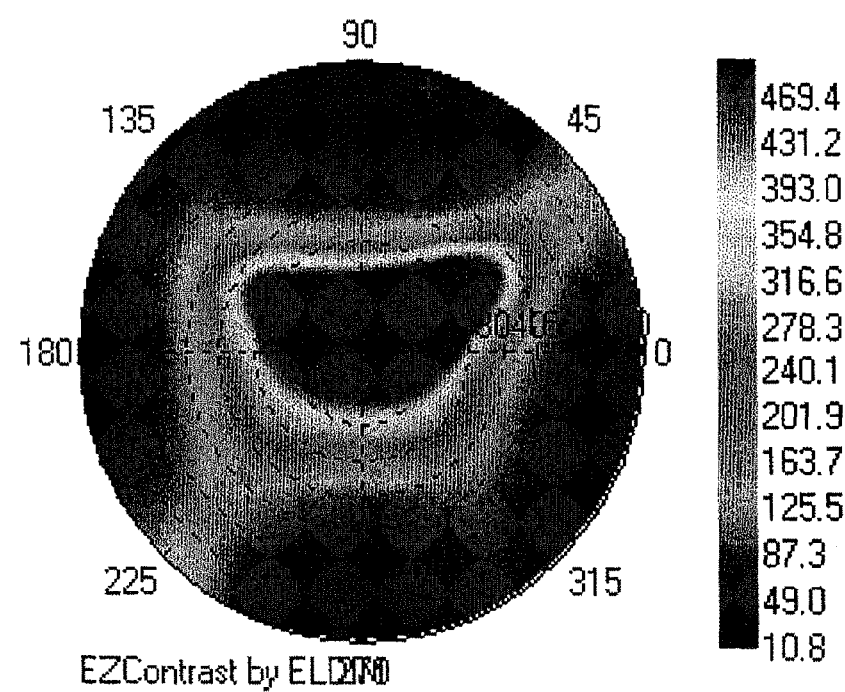
FIG. 11 is a view showing the contrast viewing angles of the liquid crystal panel used in Example 42.

A display was obtained similarly as in Example 38, except that a liquid crystal panel having the following front contrast and a contrast viewing angle as shown in FIG. 11 was used:
Liquid crystal mode: TN (Twisted Nematic)
Front contrast: 750:1
Contrast viewing angle: FIG. 11

Example 43

A display was obtained similarly as in Example 42, except that an anti-glare film having an external haze of 7.5% was used.

Example 44

Figure 12:
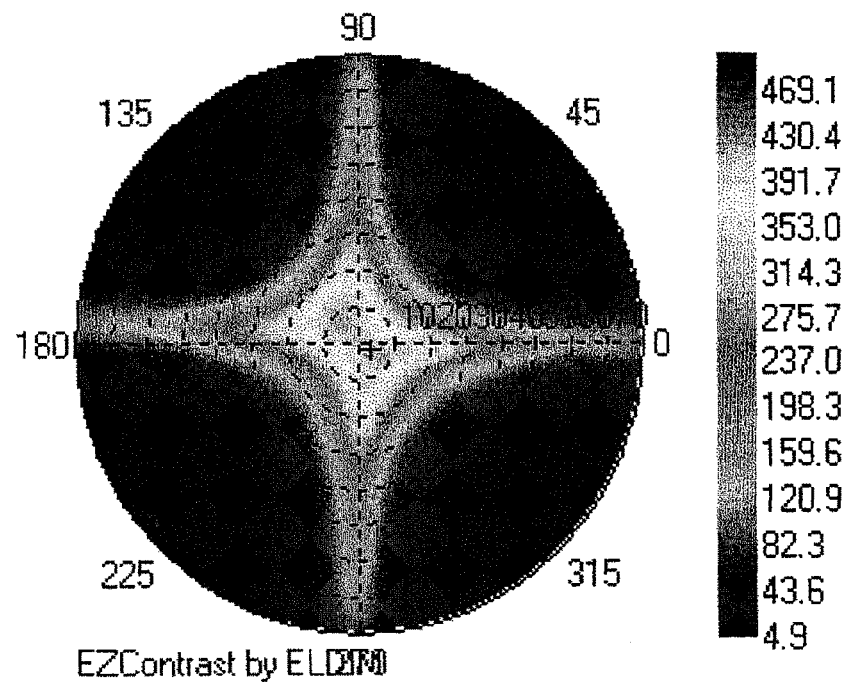
FIG. 12 is a view showing the contrast viewing angles of the liquid crystal panel used in Example 44.

A display was obtained similarly as in Example 38, except that a liquid crystal panel having the following front contrast and a contrast viewing angle as shown in FIG. 12 was used:
Liquid crystal mode: IPS (In Plane Switching)
Front contrast: 350:1
Contrast viewing angle: FIG. 12

Example 45

A display was obtained similarly as in Example 44, except that an anti-glare film having an external haze of 7.5% was used.

Example 46

Figure 13:
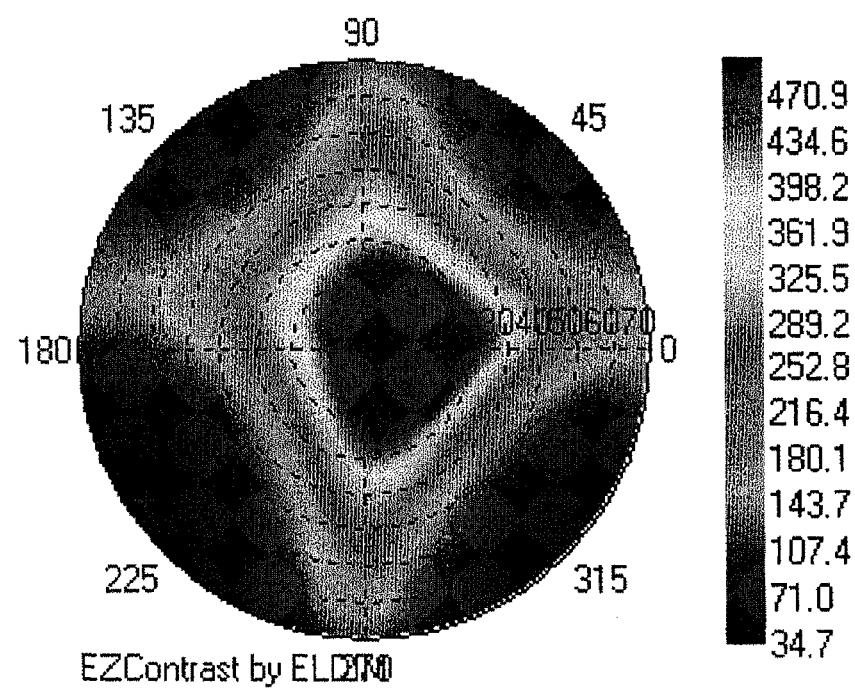
FIG. 13 is a view showing the contrast viewing angles of the liquid crystal panel used in Example 46.
Figure 14:
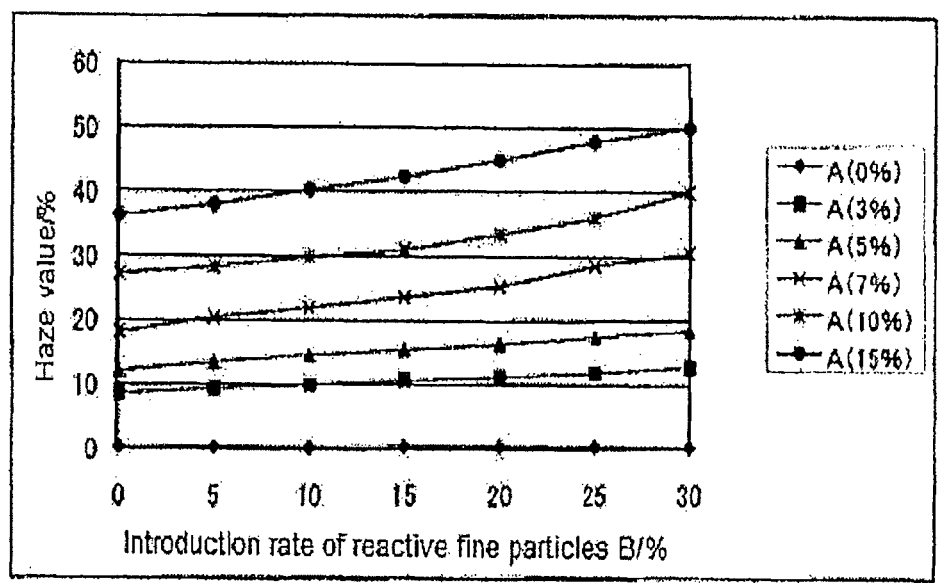
FIG. 14 is a graphical depiction of the data shown in Table 1, illustrating the haze value vs. the introduction rate of reactive fine particles.

A display was obtained similarly as in Example 38, except that a liquid crystal panel having the following front contrast and a contrast viewing angle as shown in FIG. 13 was used:
Liquid crystal mode: IPS (In Plane Switching)
Front contrast: 600:1
Contrast viewing angle: FIG. 13

Example 47

A display was obtained similarly as in Example 46, except that an anti-glare film having an external haze of 7.5% was used.

Comparative Example 1

An anti-glare film was obtained similarly as in Example 3, except that in the production of the anti-glare film, the optically-transparent fine particles A were not contained, and the average layer thickness of the anti-glare layer was changed to 6.2 µm.

Comparative Example 2

An anti-glare film was obtained similarly as in Example 3, except that in the production of the anti-glare film, the reactive inorganic fine particles B were not contained.

Comparative Example 3

An anti-glare film was obtained similarly as in Example 3, except that in the production of the anti-glare film, silica fine particles were used instead of the reactive inorganic fine particles B, which silica fine particles were prepared in the same manner as in Preparation Example 1-1 but no surface treatment was performed after the aqueous dispersion colloidal silica of particle diameter of 90 nm (product name: SNOWTEX ZL; manufactured by Nissan Chemical Industries, Ltd.; pH 9 to 10) was subjected to removal of surface adsorbed ions.

Comparative Example 4

An anti-glare film was obtained similarly as in Example 3, except that in the production of the anti-glare film, the average particle diameter of the reactive inorganic fine particles B (1-1) was changed to 10 nm.

Comparative Example 5

An anti-glare film was obtained similarly as in Example 3, except that in the production of the anti-glare film, the reactive inorganic fine particles B (3) obtained in Preparation Example 3 were used, and the average particle diameter of the reactive inorganic fine particles B (3) was changed to 20 µm.

Comparative Example 6

An anti-glare film was obtained similarly as in Example 3, except that in the production of the anti-glare film, the content rate of the reactive inorganic fine particles B was changed to 0%; silica fine particles having an average particle diameter of 2 µm were used as the optically-transparent fine particles A; the anti-glare layer coating liquid was prepared to have a content rate of the optically-transparent fine particles A of 7.5%; the layer thickness of the concave portions was changed to 2.2 µm; and the layer thickness of the convex portions was changed to 5.8 µm.

Comparative Example 7

An anti-glare film was obtained similarly as in Example 3, except that in the production of the anti-glare film, the content rate of the reactive inorganic fine particles B was changed to 0%; silica fine particles having an average particle diameter of 2 µm were used as the optically-transparent fine particles A; the anti-glare layer coating liquid was prepared to have a content rate of the optically-transparent fine particles A of 10%; the layer thickness of the concave portions was changed to 2.0 µm, and the layer thickness of the convex portions was changed to 5.5 µm.

Comparative Example 8

An anti-glare film was obtained similarly as in Example 30, except that in the production of the anti-glare film, the content rate of the optically-transparent fine particles A was changed to 10.0%; the content rate of the reactive inorganic fine particles B was changed to 0%; and the layer thickness of the convex portions was changed to 4.2 µm.

Comparative Example 9

An anti-glare film was obtained similarly as in Comparative Example 8, except that in the production of the anti-glare film, the external haze was changed to 9.0%.

Comparative Example 10

A display was obtained similarly as in Example 38, except that an anti-glare film having an introduction rate of the optically-transparent fine particles A of 10%, an introduction rate of the reactive inorganic fine particles of 0%, a layer thickness of the convex portions of 4.2 µm, an internal haze of 1.2%, and an external haze of 4.5%, was used.

Comparative Example 11

A display was obtained similarly as in Comparative Example 10, except that an anti-glare film having an external haze of 12.5% was used.

Comparative Example 12

A display was obtained similarly as in Comparative Example 10, except that an anti-glare film having an external haze of 23.5% was used.

Comparative Example 13

A display was obtained similarly as in Example 42, except that an anti-glare film having an internal haze of 1.2%, an external haze of 12.5%, and a layer thickness of the convex portions of 4.2 µm, was used.

Comparative Example 14

A display was obtained similarly as in Example 44, except that an anti-glare film having an internal haze of 1.2%, an external haze of 12.5%, and a layer thickness of the convex portions of 4.2 µm.

Comparative Example 15

A display was obtained similarly as in Example 46, except that an anti-glare film having an internal haze of 1.2%, an external haze of 12.5%, and a layer thickness of the convex portions of 4.2 µm.

<Evaluation Method>

The above Examples 1 to 21 and Comparative Examples 1 to 4 were evaluated on the following items (1) to (4). The results are shown in Table 2. In Tables 2 to 4, "C" in "A/(B+C)" and "B/(B+C)" means curable binder system.

(1) Pencil Hardness Test

Pencil hardness tests were conducted by the test method in accordance with JIS K5600 using pencils of different hardness with a load of 500 g. Scratches were visually observed. A sample was graded pass if no scratches were made by four or five lines among five drawn lines. The evaluation results in Table 2 mean (number of lines with no scratches)/(five lines).

(2) Steel Wool Test

In this test, the surface of the anti-glare films was rubbed by steel wool #0000 with a load of 500 g for 20 times to check if scratches were made on the surface.

Evaluation ○: No scratches were made
Evaluation x: Scratches were made (3) Haze

The haze value of the outermost surface of the anti-glare films was measured in accordance with JIS K 7105 (1981) "Testing Methods for Optical Properties of Plastics".

(4) Crack Resistance

Crack resistance was evaluated in such a manner that the anti-glare films cut into the size of 10×2 cm were each wound around a cylinder having a curvature so that the anti-glare layer-side surface of the films faces outside and measured for the curvature diameter at which cracking occurs.

(Evaluation Criteria)
Evaluation ○: Within 10 mm
Evaluation Δ: 10 to 20 mm
Evaluation x: 20 mm or more The above Examples 22 to 25 and Comparative Example 5 were evaluated on the following items (5) and (6). The results are shown in Table 3.

(5) Dispersibility Evaluation

Using a SEM photograph, the number of the reactive inorganic fine particles B present in a 1 µm-wide region on the cross-section of the concavo-convex layer in thickness direction was divided by the area of the 1 µm-wide region of the concavo-convex layer, thereby obtaining the average particle number per unit area of the cross-section of the concavo-convex layer in thickness direction. Similarly, using a SEM photograph, the number of the reactive inorganic fine particles B present in a 1 µm-wide region on the cross-section of the skin layer in thickness direction was divided by the area of the 1 µm-wide region of the skin layer, thereby obtaining the average particle number per unit area of the cross-section of the skin layer in thickness direction. The value obtained by dividing the average particle number per unit area of the cross-section of the skin layer in thickness direction by the average particle number per unit area of the cross-section of the concavo-convex layer in thickness direction was multiplied by 100, thereby obtaining the ratio of the average particle number of the skin layer (%).

(6) Saponification Resistance Test

The obtained anti-glare films having a size twice as large as A4 size were each immersed in 200 cc of a 2N sodium hydroxide aqueous solution at 60° C. for 2 minutes and then washed by pure water to perform a saponification treatment. Next, the sodium hydroxide aqueous solution was collected after the saponification treatment and concentrated by heating at 100° C., followed by addition of pure water and further nitric acid, thereby making the solution acid. The content of silicon (Si) in the sodium hydroxide aqueous solution was measured by ICP emission spectrometric analysis.
(Evaluation Criteria)

Evaluation ◉: The Si content in the sodium hydroxide aqueous solution was less than 2.0 μg/g.

Evaluation ○: The Si content in the sodium hydroxide aqueous solution was 2.0 μg/g to 8.0 μg/g.

Evaluation x: The Si content in the sodium hydroxide aqueous solution was more than 8.0 μg/g.

The above Examples 26 to 29 and Comparative Examples 6 and 7 were evaluated on the above item (3) and the following item (7). The results are shown on Table 4.

(7) Measurement of Front Contrast (C/R) Decreasing Rate

A liquid crystal panel having the following liquid crystal mode, front contrast and contrast viewing angle shown in FIG. 10 was measured for the luminance when displaying black and also when displaying white, in the state in which no anti-glare film was attached to the panel (glare), thereby calculating a contrast. The panel was measured for the same but in the state in which the anti-glare film was attached thereto with an adhesive (display), thereby calculating a contrast. Then, using these contrasts, the front contrast decreasing rate of the "display" with respect to the "glare" was calculated. For the luminance measurement, BM-5A luminance meter manufactured by TOPCON TECHNOHOUSE CORPORATION was used.

Liquid crystal mode: TN (Twisted Nematic)
Front contrast: 750:1
Contrast viewing angle: FIG. 10

The above Examples 30 to 37 and Comparative Examples 8 and 9 were evaluated on the above items (1), (3) and (7). The results are shown in Table 5.

The anti-glare films used in the above Examples to 47 and Comparative Examples 10 to 15 were evaluated on the above item (3). The liquid crystal panels used in and displays obtained in the above Examples 38 to 47 and Comparative Examples 10 to 15 were evaluated on the following (7'), (8) and (9). The results are shown in Table 6.

(7') Measurement of Front Contrast (C/R) Decreasing Rate

The liquid crystal panel was measured for the luminance when displaying black and also when displaying white, in the state in which no anti-glare film was attached thereto (glare), thereby calculating a contrast. The panel was measured for the same but in the state in which the anti-glare film was attached thereto (display), thereby calculating a contrast. Then, using these contrasts, the front contrast decreasing rate of the "display" with respect to the "glare" was calculated. For the luminance measurement, BM-5A luminance meter manufactured by TOPCON TECHNOHOUSE CORPORATION was used.

(8) Measurement of Surface Condition (Glare)

The display was visually evaluated when displaying green.

Evaluation ○: No change was observed before and after the attachment of the anti-glare film.

Evaluation Δ: The display having the anti-glare film attached thereto glared partly.

Evaluation x: The whole of the display having the anti-glare film attached thereto glared.

(9) Measurement of Contrast (C/R) Viewing Angle

The polar angle was changed from the front of the display (on the normal line of display), wherein the contrast is maximum, to the direction of azimuthal angle 45° with EZ Contrast manufactured by ELDIM, thereby measuring the polar angle at which the contrast decreased to 150.

TABLE 1

|  | Content rate of reactive | Content rate of optically-transparent fine particles A (%) | | | | | |
|---|---|---|---|---|---|---|---|
| Reference Experiment | inorganic fine particles B (%) | A (0%) | A (3%) | A (5%) | A (7%) | A (10%) | A (15%) |
| 1 | 0 | 0.3 | 8.7 | 12.2 | 18.2 | 27.3 | 36.4 |
| 2 | 5 | 0.3 | 9.4 | 13.5 | 20.4 | 28.4 | 38.1 |
| 3 | 10 | 0.2 | 10 | 14.6 | 22 | 29.9 | 40.4 |
| 4 | 15 | 0.35 | 10.6 | 15.4 | 23.6 | 31 | 42.4 |
| 5 | 20 | 0.3 | 11.1 | 16.2 | 25.3 | 33.4 | 45 |
| 6 | 25 | 0.25 | 11.8 | 17.3 | 28.5 | 36 | 47.8 |
| 7 | 30 | 0.2 | 12.6 | 18.4 | 30.4 | 40 | 50 |

TABLE 2

| | | Optically-transparent fine particles A | | | Reactive inorganic fine particles B | | | |
|---|---|---|---|---|---|---|---|---|
| | Transparent substrate | Particle diameter (μm) | Main component | Content rate *1 A/(B + C) (%) | Production method | Particle diameter (nm) | Content of organic component | Content rate *1 B/(B + C) (%) |
| Example | | | | | | | | |
| 1 | TAC | 3.5 | Si | 7 | 1-1 | 92 | $4.05 \times 10^{-3}$ | 5 |
| 2 | TAC | 3.5 | Si | 7 | 1-1 | 92 | $4.05 \times 10^{-3}$ | 10 |
| 3 | TAC | 3.5 | Si | 7 | 1-1 | 92 | $4.05 \times 10^{-3}$ | 15 |
| 4 | TAC | 3.5 | Si | 7 | 1-1 | 92 | $4.05 \times 10^{-3}$ | 30 |
| 5 | TAC | 3.5 | Si | 7 | 1-1 | 92 | $4.05 \times 10^{-3}$ | 50 |
| 6 | TAC | 3.5 | Si | 7 | 1-1 | 92 | $4.05 \times 10^{-3}$ | 15 |
| 7 | TAC | 3.5 | Si | 7 | 1-1 | 92 | $4.05 \times 10^{-3}$ | 15 |
| 8 | TAC | 3.5 | Si | 7 | 1-2 | 93 | $3.84 \times 10^{-3}$ | 15 |
| 9 | TAC | 3.5 | Si | 7 | 2 | 63 | $5.35 \times 10^{-3}$ | 15 |
| 10 | TAC | 3.5 | Si | 7 | 3 | 63 | $7.08 \times 10^{-3}$ | 15 |
| 11 | COP | 3.5 | Si | 7 | 1-1 | 92 | $4.05 \times 10^{-3}$ | 15 |
| 12 | PET | 3.5 | Si | 7 | 1-1 | 92 | $4.05 \times 10^{-3}$ | 15 |

TABLE 2-continued

| | | | | | | | | |
|---|---|---|---|---|---|---|---|---|
| 13 | Acrylic resin | 3.5 | Si | 7 | 1-1 | 92 | $4.05 \times 10^{-3}$ | 15 |
| 14 | TAC | 7.5 | PMMA/styrene | 10 | 1-1 | 92 | $4.05 \times 10^{-3}$ | 15 |
| 15 | TAC | 5.2 | PMMA | 10 | 1-1 | 92 | $4.05 \times 10^{-3}$ | 15 |
| 16 | TAC | 10 | PMMA/EtGDMA | 12 | 1-1 | 92 | $4.05 \times 10^{-3}$ | 15 |
| 17 | TAC | 3.5 | Si | 7 | 1-2 | 60 | $3.75 \times 10^{-3}$ | 15 |
| 18 | TAC | 3.5 | Si | 7 | 1-1 | 92 | $4.05 \times 10^{-3}$ | 1 |
| 19 | TAC | 3.5 | Si | 7 | 1-1 | 92 | $0.80 \times 10^{-3}$ | 15 |
| 20 | TAC | 5.2 | PMMA | 7 | 1-1 | 92 | $4.05 \times 10^{-3}$ | 15 |
| 21 | TAC | 3.5 | Si | 7 | 1-1 | 92 | $4.05 \times 10^{-3}$ | 15 |
| Comparative Example | | | | | | | | |
| 1 | TAC | — | — | — | 1-1 | 92 | $4.05 \times 10^{-3}$ | 15 |
| 2 | TAC | 3.5 | Si | 7 | — | — | — | — |
| 3 | TAC | 3.5 | Si | 7 | 1-1 | 90 | — | 15 |
| 4 | COP | 3.5 | Si | 7 | 1-1 | 10 | $3.56 \times 10^{-3}$ | 15 |

| | Binder component C | Average film thickness (μm) | Pencil hardness *2 3H | Pencil hardness *2 4H | Steel wool abrasion resistance 500 g | Haze value (%) | Crack resistance |
|---|---|---|---|---|---|---|---|
| Example | | | | | | | |
| 1 | PETA | 2.1 | 5/5 | 1/5 | ○ | 20 | ○ |
| 2 | PETA | 2.1 | 5/5 | 3/5 | ○ | 22 | ○ |
| 3 | PETA | 2.1 | 5/5 | 3/5 | ○ | 24 | ○ |
| 4 | PETA | 2.1 | 5/5 | 2/5 | ○ | 30 | ○ |
| 5 | PETA | 2.1 | 5/5 | 1/5 | ○ | 52 | ○ |
| 6 | PETA/DPHA | 2.1 | 5/5 | 3/5 | ○ | 25 | ○ |
| 7 | PETA/DPHA/UA | 2.1 | 5/5 | 4/5 | ○ | 25 | ○ |
| 8 | PETA | 3.5 | 5/5 | 3/5 | ○ | 25 | ○ |
| 9 | PETA | 3.5 | 5/5 | 3/5 | ○ | 25 | ○ |
| 10 | PETA | 3.5 | 5/5 | 3/5 | ○ | 25 | ○ |
| 11 | PETA | 2.1 | 5/5 | 3/5 | ○ | 25 | ○ |
| 12 | PETA | 2.1 | 5/5 | 4/5 | ○ | 25 | ○ |
| 13 | PETA | 2.1 | 5/5 | 3/5 | ○ | 25 | ○ |
| 14 | PETA | 12 | 5/5 | 3/5 | ○ | 25 | ○ |
| 15 | PETA/UA | 20 | 5/5 | 3/5 | ○ | 25 | Δ |
| 16 | PETA/UA | 20 | 5/5 | 3/5 | ○ | 25 | Δ |
| 17 | PETA | 2.1 | 5/5 | 3/5 | ○ | 25 | ○ |
| 18 | PETA | 2.1 | 5/5 | 1/5 | ○ | 18 | ○ |
| 19 | PETA | 2.1 | 5/5 | 1/5 | ○ | 25 | ○ |
| 20 | PETA | 35 | 5/5 | 3/5 | ○ | 25 | X |
| 21 | PETA | 0.4 | 5/5 | 1/5 | ○ | 35 | ○ |
| Comparative Example | | | | | | | |
| 1 | PETA | 6.2 | 5/5 | 0/5 | X | 0.3 | ○ |
| 2 | PETA | 2.1 | 0/5 | 0/5 | ○ | 32 | ○ |
| 3 | PETA | 2.1 | 0/5 | 0/5 | ○ | 28 | ○ |
| 4 | PETA | 2.1 | 2/5 | 0/5 | ○ | 25 | ○ |

*1: "C" in A/(B + C) and B/(B + C) means curable binder system.
*2: The evaluation results of pencil hardness mean (number of lines with no scratches)/(five lines)

TABLE 3

| | Reactive inorganic fine particles B | | | | | | | |
|---|---|---|---|---|---|---|---|---|
| | Production method | Particle diameter (nm) | Content of organic component (g/m²) | Content rate* of B/(B + C) (%) | Average number of particles in concavo-convex layer (particles/μm²) | Average number of particles in skin layer (particles/μm²) | Average number of particles in skin layer (%) | Amount of Si in eluate (μg/g) | Saponification resistance |
| Example 22 | 3 | 42 | $4.21 \times 10^{-3}$ | 15 | 142 | 104 | 73 | 2.3 | ○ |
| Example 23 | 3 | 63 | $5.35 \times 10^{-3}$ | 15 | 437 | 262 | 60 | 1.9 | ◎ |
| Example 24 | 3 | 44 | $4.87 \times 10^{-3}$ | 15 | 296 | 231 | 78 | 2.1 | ○ |
| Example 25 | 3 | 92 | $4.05 \times 10^{-3}$ | 15 | 129 | 62 | 48 | 1.6 | ◎ |
| Comparative Example 5 | 3 | 20 | $5.21 \times 10^{-3}$ | 15 | 550 | 825 | 150 | 12.1 | X |

*"C" in A/(B + C) and B/(B + C) means curable binder system.

TABLE 4

| | Optically-transparent fine particles A | | | Reactive inorganic fine particles B | | | Layer thickness of convex portions (μm) | Layer thickness of concave portions (μm) | Haze (%) | C/R decreasing rate |
|---|---|---|---|---|---|---|---|---|---|---|
| | Main component | Particle diameter (μm) | Content rate* of A/(B + C) (%) | Production method | Particle diameter (nm) | Content rate* of B/(B + C) (%) | | | | |
| Example 26 | Si | 2 | 4 | 3 | 63 | 10 | 4 | 0.8 | 12.3 | 27% |
| Example 27 | Si | 3.5 | 4 | 3 | 63 | 10 | 4.5 | 1.2 | 13.5 | 27% |
| Example 28 | Si | 2 | 6.5 | 3 | 63 | 10 | 4.5 | 0.6 | 22.1 | 32% |
| Example 29 | Si | 3.5 | 6.5 | 3 | 63 | 10 | 5.5 | 1.3 | 23.1 | 32% |
| Comparative Example 6 | Si | 2 | 7.5 | — | — | 0 | 5.8 | 2.2 | 12.5 | 35% |
| Comparative Example 7 | Si | 2 | 10 | — | — | 0 | 5.5 | 2.0 | 23.1 | 45% |

*"C" in A/(B + C) and B/(B + C) means curable binder system.

TABLE 5

| | Optically-transparent fine particles A | | | Reactive inorganic fine particles B | | | | Layer thickness of convex portions (μm) | Pencil hardness | Internal haze (%) | Haze (%) | C/R decreasing rate (%) |
|---|---|---|---|---|---|---|---|---|---|---|---|---|
| | Main component | Particle diameter (μm) | Introduction rate of A/(B + C) (%) | Main component | Production method | Particle diameter (nm) | Introduction rate of B/(B + C) (%) | | | | | |
| Example 30 | Si | 2.3 | 3.5 | Si | 3 | 63 | 10 | 2.5 | 3H | 0.6 | 12.5 | 31 |
| Example 31 | Si | 2.3 | 4 | Si | 3 | 63 | 10 | 2.5 | 3H | 0.7 | 12.5 | 33 |
| Example 32 | Si | 2.3 | 4.5 | Si | 3 | 63 | 10 | 2.5 | 3H | 0.8 | 12.5 | 35 |
| Example 33 | Si | 2.3 | 3.5 | Si | 3 | 63 | 10 | 2.3 | 3H | 0.5 | 12.5 | 29 |
| Example 34 | Si | 2.3 | 3.5 | Si | 3 | 63 | 10 | 2.8 | 3H | 0.8 | 12.5 | 35 |
| Example 35 | Si | 2.3 | 3.5 | Si | 3 | 63 | 10 | 2.5 | 3H | 0.6 | 9.0 | 25 |
| Example 36 | Si | 2.3 | 4 | Si | 3 | 63 | 10 | 2.5 | 3H | 0.7 | 9.0 | 27 |
| Example 37 | Si | 2.3 | 4.5 | Si | 3 | 63 | 10 | 2.5 | 3H | 0.8 | 9.0 | 28 |
| Comparative Example 8 | Si | 2.3 | 10 | Si | 3 | 63 | 0 | 4.2 | 3H | 1.2 | 12.5 | 37 |
| Comparative Example 9 | Si | 2.3 | 10 | Si | 3 | 63 | 0 | 4.2 | 3H | 1.1 | 9.0 | 33 |

TABLE 6

| | Optically-transparent fine particles A | | | Reactive inorganic fine particles B | | | | Layer thickness of convex portions (μm) |
|---|---|---|---|---|---|---|---|---|
| | Main component | Particle diameter (μm) | Introduction rate of A/(B + C) (%) | Main component | Production method | Particle diameter (nm) | Introduction rate of B/(B + C) (%) | |
| Example 38 | Si | 2.3 | 3.5 | Si | 3 | 63 | 10 | 2.5 |
| Example 39 | Si | 2.3 | 3.5 | Si | 3 | 63 | 10 | 2.5 |
| Example 40 | Si | 2.3 | 3.5 | Si | 3 | 63 | 10 | 2.5 |
| Example 41 | Si | 2.3 | 3.5 | Si | 3 | 63 | 10 | 2.5 |
| Comparative Example 10 | Si | 2.3 | 10 | Si | 3 | 63 | 0 | 4.2 |
| Comparative Example 11 | Si | 2.3 | 10 | Si | 3 | 63 | 0 | 4.2 |
| Comparative Example 12 | Si | 2.3 | 10 | Si | 3 | 63 | 0 | 4.2 |
| Example 42 | Si | 2.3 | 3.5 | Si | 3 | 63 | 10 | 2.5 |
| Example 43 | Si | 2.3 | 3.5 | Si | 3 | 63 | 10 | 2.5 |
| Comparative Example 13 | Si | 2.3 | 10 | Si | 3 | 63 | 0 | 4.2 |
| Example 44 | Si | 2.3 | 3.5 | Si | 3 | 63 | 10 | 2.5 |
| Example 45 | Si | 2.3 | 3.5 | Si | 3 | 63 | 10 | 2.5 |
| Comparative Example 14 | Si | 2.3 | 10 | Si | 3 | 63 | 0 | 4.2 |
| Example 46 | Si | 2.3 | 3.5 | Si | 3 | 63 | 10 | 2.5 |
| Example 47 | Si | 2.3 | 3.5 | Si | 3 | 63 | 10 | 2.5 |
| Comparative Example 15 | Si | 2.3 | 10 | Si | 3 | 63 | 0 | 4.2 |

TABLE 6-continued

|  | Internal haze (%) | Haze (%) | C/R decreasing rate (%) | Glare | Liquid crystal mode | Contrast viewing angle | Polar angle ** |
|---|---|---|---|---|---|---|---|
| Example 38 | 0.6 | 12.5 | 31 | ○ | TN | FIG. 10 | 15° |
| Example 39 | 0.6 | 9.5 | 26 | ○ | TN | FIG. 10 | 15° |
| Example 40 | 0.6 | 7.5 | 22 | Δ | TN | FIG. 10 | 15° |
| Example 41 | 0.6 | 5.5 | 15 | Δ | TN | FIG. 10 | 15° |
| Comparative Example 10 | 1.2 | 4.5 | 18 | X | TN | FIG. 10 | 15° |
| Comparative Example 11 | 1.2 | 12.5 | 37 | ○ | TN | FIG. 10 | 15° |
| Comparative Example 12 | 1.4 | 23.5 | 50 | ○ | TN | FIG. 10 | 15° |
| Example 42 | 0.6 | 12.5 | 5 | ○ | TN | FIG. 11 | 80° |
| Example 43 | 0.6 | 7.5 | 2 | Δ | TN | FIG. 11 | 80° |
| Comparative Example 13 | 1.2 | 12.5 | 7 | ○ | TN | FIG. 11 | 80° |
| Example 44 | 0.6 | 12.5 | 12 | ○ | IPS | FIG. 12 | 30° |
| Example 45 | 0.6 | 7.5 | 9 | Δ | IPS | FIG. 12 | 30° |
| Comparative Example 14 | 1.2 | 12.5 | 15 | ○ | IPS | FIG. 12 | 30° |
| Example 46 | 0.6 | 12.5 | 8 | ○ | IPS | FIG. 13 | 50° |
| Example 47 | 0.6 | 7.5 | 5 | Δ | IPS | FIG. 13 | 50° |
| Comparative Example 15 | 1.2 | 12.5 | 10 | ○ | IPS | FIG. 13 | 50° |

** Polar angle at which C/R is 150 (azimuthal angle 45°) when anti-glare film is used

The invention claimed is:

1. A curable resin composition for an anti-glare layer comprising:
   (1) optically-transparent fine particles A having an average particle diameter of 1 μm or more and 10 μm or less;
   (2) reactive inorganic fine particles B having an average particle diameter of 30 nm or more and 100 nm or less, wherein at least part of the particle surface is covered with an organic component, and each particle has reactive functional groups b introduced onto the surface covered by the organic component; and
   (3) a curable binder system comprising a binder component C and having curing reactivity in the system, wherein the binder component C has reactive functional groups c having cross-linking reactivity with the reactive functional groups b of the reactive inorganic fine particles B,
   wherein the haze value of a cured product of the curable resin composition for an anti-glare layer meets the relationships given by the following formulae I to III:

$$|Hz(hW_B+W_C)-Hz(W_B+W_C)|<|Hz(hW_B+W_C+W_A)-Hz(W_B+W_C+W_A)| \quad (I)$$

$$|Hz(hW_B)-Hz(W_B)|<2 \quad (II)$$

$$|Hz(hW_B+W_C)-Hz(W_B+W_C)|<2 \quad (III)$$

wherein each of $Hz(W_B)$, $Hz(hW_B)$, $Hz(W_B+W_C)$, $Hz(hW_B+W_C)$, $Hz(W_B+W_C+W_A)$ and $Hz(hW_B+W_C+W_A)$ refers to the haze value of each composition; each W in the parentheses refers to the weight of the reactive inorganic fine particles B, binder component C or optically-transparent fine particles A in each composition; and h is a constant of 1 or more.

2. The curable resin composition for an anti-glare layer according to claim 1, wherein the haze value of the cured product is from 5 to 20%.

3. The curable resin composition for an anti-glare layer according to claim 1, wherein the content of the reactive inorganic fine particles B is from 5 to 20 parts by weight with respect to the total amount of 100 parts by weight of the reactive inorganic fine particles B and the constituents of the curable binder system.

4. The curable resin composition for an anti-glare layer according to claim 1, wherein the content of the optically-transparent fine particles A is 1 part by weight or more and 5 parts by weight or less with respect to the total amount of 100 parts by weight of the reactive inorganic fine particles B and the constituents of the curable binder system.

5. The curable resin composition for an anti-glare layer according to claim 1, wherein the organic component covering the reactive inorganic fine particles B is contained in an amount of $1.00 \times 10^{-3}$ g/m² or more per unit area of the inorganic fine particles to be covered.

6. The curable resin composition for an anti-glare layer according to claim 1, wherein the reactive functional groups b of the reactive inorganic fine particles B and the reactive functional groups c of the binder component C are polymerizable unsaturated groups.

7. The curable resin composition for an anti-glare layer according to claim 1, wherein the reactive inorganic fine particles B are obtained by dispersing inorganic fine particles in water and/or an organic solvent serving as a dispersion medium, in the presence of one or more kinds of surface modification compounds which have a molecular weight of 500 or more and are selected from the group consisting of a saturated or unsaturated carboxylic acid, an acid anhydride, acid chloride, ester and acid amide corresponding to the carboxylic acid, an amino acid, an imine, a nitrile, an isonitrile, an epoxy compound, an amine, a β-dicarbonyl compound, silane and a metallic compound having a functional group.

8. The curable resin composition for an anti-glare layer according to claim 7, wherein the surface modification compound is a compound having at least one kind of hydrogen bond-forming groups.

9. The curable resin composition for an anti-glare layer according to claim 7, wherein at least one kind of the surface modification compounds has at least one kind of polymerizable unsaturated groups that will be the reactive functional groups b.

10. The curable resin composition for an anti-glare layer according to claim 1, wherein the reactive inorganic fine particles B are obtained by ejecting, into water through a hydrophilic porous membrane, a monomer composition in which inorganic fine particles having a particle diameter of 30 nm or more and 100 nm or less are dispersed in a hydrophobic vinyl monomer to prepare an aqueous dispersion comprising droplets of the monomer in which the inorganic fine particles are dispersed, and polymerizing the aqueous dispersion.

11. The curable resin composition for an anti-glare layer according to claim 1, wherein the reactive inorganic fine particles B are obtained by bonding metal oxide fine particles to a compound containing the reactive functional group b that will be introduced onto the surface of the inorganic fine particles to be covered, a group represented by the following chemical formula (1), and a silanol group or a group that is able to become a silanol group by hydrolysis:

$$-Q^1-C(=Q^2)-NH-  \quad \text{Chemical formula (1)}$$

wherein $Q^1$ is NH, O (oxygen atom) or S (sulfur atom); and $Q^2$ is O or S.

12. The curable resin composition for an anti-glare layer according to claim 1, wherein the binder component C is a compound having three or more reactive functional groups c.

13. The curable resin composition for an anti-glare layer according to claim 1, wherein the optically-transparent fine particles A and the reactive inorganic fine particles B comprise silica.

14. An anti-glare film comprising a transparent substrate film and an anti-glare layer which has a concavo-convex shape on the outermost surface thereof and is provided on the observer-side surface of the transparent substrate film,
  wherein the anti-glare layer comprises a single concavo-convex layer or has a laminated structure that comprises two or more layers including a concavo-convex layer and a surface shape modifying layer disposed on the observer side of the concavo-convex layer,
  wherein the concavo-convex layer comprises a cured product of the curable resin composition for an anti-glare layer defined by claim 1, and has a haze value that meets the relationships given by the following formulae I to III;
  wherein the concavo-convex layer has a skin layer in the surface region thereof, which region including an interface on the side opposite to the transparent substrate film side of the concavo-convex layer and the vicinity of the interface, and the skin layer has a smaller average particle number of the reactive inorganic fine particles B than the region situated nearer the transparent substrate film in relation to the surface region; and
  wherein the average particle number of the reactive inorganic fine particles B per unit area of the cross-section of the skin layer in thickness direction is 80% or less of the average particle number of the reactive inorganic fine particles B per unit area of the cross-section of the concavo-convex layer in thickness direction:

$$|Hz(hW_B+W_C)-Hz(W_B+W_C)|<|Hz(hW_B+W_C+W_A)-Hz(W_B+W_C+W_A)| \quad \text{(I)}$$

$$|Hz(hW_B)-Hz(W_B)|<2 \quad \text{(II)}$$

$$|Hz(hW_B+W_C)-Hz(W_B+W_C)|<2 \quad \text{(III)}$$

wherein each of $Hz(W_B)$, $Hz(hW_B)$, $Hz(W_B+W_C)$, $Hz(hW_B+W_C)$, $Hz(W_B+W_C+W_A)$ and $Hz(hW_B+W_C+W_A)$ refers to the haze value of each composition; each W in the parentheses refers to the weight of the reactive inorganic fine particles B, binder component C or optically-transparent fine particles A in each composition; and h is a constant of 1 or more.

15. The anti-glare film according to claim 14, wherein the thickness of the skin layer, which is from the interface on the side opposite to the transparent substrate film side of the skin layer, is five times the average particle diameter of the reactive inorganic fine particles B.

16. The anti-glare film according to claim 14, wherein the average interparticle distance between the reactive inorganic fine particles B is 30 nm or more in the region situated nearer the transparent substrate film in relation to the skin layer, and the reactive inorganic fine particles B are uniformly dispersed in at least part of the region, which part is adjacent to the transparent substrate film.

17. The anti-glare film according to claim 14, wherein the transparent substrate film mainly comprises a cellulose acylate, a cycloolefin polymer, an acrylate polymer or a polyester.

18. The anti-glare film according to claim 14, wherein the anti-glare layer shows a hardness of 3H or more on the pencil hardness test defined in JIS K5600-5-4 (1999) conducted with a load of 500 g.

19. The anti-glare film according to claim 14, wherein the content of the optically-transparent fine particles A is 1 part by weight or more and 5 parts by weight or less with respect to the total amount of 100 parts by weight of the reactive inorganic fine particles B and the constituents of the curable binder system in the concavo-convex layer; the layer thickness of convex portions of the concavo-convex layer is equal to or less than the average particle diameter of the optically-transparent fine particles A+1.5 µm; and the layer thickness of concave portions of the concavo-convex layer is smaller than the average particle diameter of the optically-transparent fine particles A.

20. The anti-glare film according to claim 14, wherein the anti-glare layer has a steel wool resistance at which the anti-glare layer has no scratches on a steel wool test with a load of 500 g or less.

21. The anti-glare film according to claim 14, wherein the thickness of the concavo-convex layer is from 0.5 to 13 µm.

* * * * *